(12) United States Patent
Wada

(10) Patent No.: US 7,300,960 B2
(45) Date of Patent: Nov. 27, 2007

(54) EXPANDABLE POLYPROPYLENE RESIN PARTICLE AND MOLDED OBJECT OBTAINED THEREFROM BY IN-MOLD MOLDING

(75) Inventor: Toru Wada, Mie (JP)

(73) Assignee: JSP Corporation, Tokyo (JP)

( * ) Notice: Subject to any disclaimer, the term of this patent is extended or adjusted under 35 U.S.C. 154(b) by 215 days.

(21) Appl. No.: 10/507,681

(22) PCT Filed: May 8, 2003

(86) PCT No.: PCT/JP03/05794

§ 371 (c)(1),
(2), (4) Date: Sep. 22, 2004

(87) PCT Pub. No.: WO03/095539

PCT Pub. Date: Nov. 20, 2003

(65) Prior Publication Data

US 2005/0113473 A1 May 26, 2005

(30) Foreign Application Priority Data

| May 13, 2002 | (JP) | 2002-137536 |
| Sep. 2, 2002 | (JP) | 2002-256785 |
| Sep. 30, 2002 | (JP) | 2002-286899 |
| Nov. 13, 2002 | (JP) | 2002-329886 |
| Dec. 17, 2002 | (JP) | 2002-365604 |
| Dec. 17, 2002 | (JP) | 2002-365619 |
| Jan. 15, 2003 | (JP) | 2003-007497 |

(51) Int. Cl.
*C08J 9/16* (2006.01)
*C08J 9/22* (2006.01)
*C08L 23/10* (2006.01)

(52) U.S. Cl. .................. 521/56; 521/59; 521/134; 521/142; 521/143

(58) Field of Classification Search ............. 521/56, 521/59, 134, 142, 143
See application file for complete search history.

(56) References Cited

U.S. PATENT DOCUMENTS

| 3,953,558 A | 4/1976 | Hatano et al. |
| 4,379,859 A | 4/1983 | Hirosawa et al. |
| 4,440,703 A | 4/1984 | Akiyama et al. |
| 4,464,484 A | 8/1984 | Yoshimura et al. |
| 4,602,082 A | 7/1986 | Akiyama et al. |
| 4,617,323 A | 10/1986 | Kuwabara et al. |
| 4,695,593 A | 9/1987 | Kuwabara et al. |
| 4,704,239 A | 11/1987 | Yoshimura et al. |
| 4,711,287 A | 12/1987 | Kuwabara et al. |
| 4,777,000 A | 10/1988 | Kuwabara et al. |
| 4,840,973 A | 6/1989 | Kuwabara et al. |
| 5,032,620 A | 7/1991 | Arai et al. |
| 5,468,781 A | 11/1995 | Sugano et al. |
| 5,716,998 A | 2/1998 | Munakata et al. |
| 5,747,549 A | 5/1998 | Tsurugai et al. |
| 6,034,144 A | 3/2000 | Shioya et al. |
| 6,051,617 A | 4/2000 | Sasaki et al. |
| 6,077,875 A | 6/2000 | Sasaki et al. |
| 6,150,427 A | 11/2000 | Ito et al. |
| 6,174,930 B1 | 1/2001 | Agarwal et al. |
| 6,313,184 B1 | 11/2001 | Sasaki et al. |
| 6,355,696 B1 | 3/2002 | Yamaguchi et al. |
| 6,451,419 B1 | 9/2002 | Tsurugai et al. |

FOREIGN PATENT DOCUMENTS

| EP | 0 790 275 A1 | 8/1997 |
| EP | 0 928 806 A1 | 7/1999 |
| JP | 4-272942 | 9/1992 |
| JP | 6-240041 | 8/1994 |
| JP | 7-118323 | * 5/1995 |
| JP | 10-045938 | 2/1998 |
| JP | 2001-172452 | 6/2001 |
| JP | 2002-275325 | 9/2002 |
| WO | 99/28374 | 6/1999 |
| WO | WO 01/32758 A1 | 5/2001 |

OTHER PUBLICATIONS

Udo Stehling, et al., "ansa-Zirconocene Polymerization Catalysts with Annelated Ring Ligands-Effects on Catalytic Activity and Polymer Chain Length", ORGANOMETALLICS, vol. 13, pp. 964-970. Sep. 27, 1993.

* cited by examiner

Primary Examiner—Irina S Zemel
(74) Attorney, Agent, or Firm—Oblon, Spivak, McClelland, Maier & Neustadt, P.C.

(57) ABSTRACT

A specific relationship must be met in case of:
(a) a structural unit derived from propylene is present in 100 to 85 mole %, and a structural unit derived from ethylene and/or alpha-olefin with 4 to 20 carbons is present in 0 to 15 mole %;
(b) a content of a position irregularity unit based on 2,1-insertion of a propylene monomer unit in all propylene insertions, which is measured by 13C-NMR, is 0.5% to 2.0% and a content of a position irregularity unit based on 1,3-insertion of propylene monomer unit in all propylene insertions, which is measured by 13C-NMR, is 0.005% to 0.4%; and
(c) a water vapor transmission rate is Y [g/m$^2$/24 hr] as film and a melting point Tm[° C.] shows specific relationship.

24 Claims, 6 Drawing Sheets shock absorber
1
15 ions, which is measured by 13C-NMR, is 0.5% to
EXPANDABLE POLYPROPYLENE RESIN PARTICLE AND MOLDED OBJECT OBTAINED THEREFROM BY IN-MOLD MOLDING

TECHNICAL FIELD

A first associated invention of the present application relates to a polypropylene based resin expanded particle having its significantly uniform foam diameter and capable of obtaining a molded article with its superior surface appearance or the like, and a molded article using the particle.

BACKGROUND ART

A molded article derived from a polypropylene based resin expanded particle has its superior chemical resistance, shock resistance, and compression strain recovery properties or the like as compared with a molded article derived from a polystyrene based resin expanded particle. Thus, this molded article is suitably used as a bumper core material for automobiles or the like or a variety of packaging materials.

As the above polypropylene based resin, from an aspect of foaming characteristics, there is employed a propylene-alpha-olefin random copolymer obtained by primarily copolymerizing alpha-olefin such as ethylene or 1-butene or the like with propylene. These are polymerized by employing a so called Ziegler-Natta catalyst which consists of titanium chloride and alkyl aluminum.

In recent years, there is provided a proposal in which polypropylene having a syndiotactic structure obtained by employing a so called metallocene based catalyst is employed for a substrate of a foamed article (JP 1992-224832 Unexamined Patent Publication (Kokai)). By this proposal, it is possible to produce a foamed article with a propylene homopolymer.

However, there has been a problem that polypropylene having a syndiotactic structure has a low melting point as compared with polypropylene having an isotatic structure, and is inferior thereto in mechanical properties.

Further, in JP1994-240041 Unexamined Patent Publication (Kokai) (Patent Document 1), there is proposed a polypropylene based resin expanded particle in which an isotactic polypropylene based resin polymerized by employing a metallocene based polymer catalyst is obtained as a base resin.

In this case, although the present invention is characterized in that the foam diameters of foam particles are comparatively uniform, the uniformity is not always sufficient, and further improvement has been desired.

Therefore, the object of the first associated invention of the present application is to provide a polypropylene based resin expanded particle capable of obtaining a molded article with its significantly uniform foam diameters, and having its superior surface appearance and mechanical properties; and a molded article thereof.

DISCLOSURE OF THE INVENTION

According to the first aspect of the first associated invention, there is provided a polypropylene resin expanded particle characterized by comprising a polypropylene based polymer having the following requirements (a) to (c) as a base resin:

(a) a structural unit derived from propylene is present in 100 to 85 mole %, and a structural unit derived from ethylene and/or alpha-olefin with 4 to 20 carbons is present in 0 to 15 mole %;

(b) a content of a position irregularity unit based on 2,1-insertion of a propylene monomer unit in all propylene insertions, which is measured by 13C-NMR, is 0.5% to 2.0% and a content of a position irregularity unit based on 1,3-insertion of propylene monomer unit in all propylene insertions, which is measured by 13C-NMR, is 0.005% to 0.4%; and (c) in the case where a melting point is defined as Tm [° C.], and where a water vapor transmission rate when made into a film is defined as Y [g/m²/24 hr], Tm and Y meet the following formula (1)

$$(-0.20) \cdot Tm + 35 \leq Y \leq (-0.33) \cdot Tm + 60 \qquad \text{Formula (1)}.$$

In the present invention, a propylene based polymer having the above requirements (a) to (c) is provided as a base resin, and thus, there can be provided a polypropylene based resin expanded particle having its significantly uniform foam diameter. In addition, there can be provided a polypropylene based resin expanded particle capable of obtaining a molded article which is superior in mechanical properties such as surface appearance, compression strength, and tensile strength.

According to the second aspect of the present invention, there is provided a molded article, made by molding polypropylene resin expanded particles in a mold and having density of 0.5 g/cm³ to 0.008 g/cm³, wherein the polypropylene resin expanded particles are the ones claimed in any of claims 1 to 4. (claim 5).

In this case, as the above described polypropylene based resin expanded particle, one claimed in any of claims 1 to 4 is employed and molded, and the molded article has the above density.

Therefore, the molded article is superior in surface appearance such as smoothness or gloss properties, and is superior in mechanical properties such as compression strength or tensile strength.

If the density of the molded article is greater than 0.5 g/cm³, the preferred characteristics of a foamed article such as light weight properties, shock absorption properties, or heat resistance are not sufficiently provided, and there is a danger that cost efficiency is lowered because of low foaming magnificence.

On the other hand, if the density is smaller than 0.008 g/cm³, there is a tendency that the closed cell ratio is lowered, and there is a danger that mechanical properties such as bending strength or compression strength are insufficient.

Therefore, the above molded article is suitable for a packages, a toy, automobile parts, a helmet, a core material, or a cushioning packaging material and the like.

In the first aspect of the present invention (claim 1), a description of requirement (a) will be given firstly with respect to a polypropylene based polymer employed as the above base resin.

The above described requirement (a) is a propylene homopolymer (100%) or an copolymer consisting of propylene with ethylene and/or alpha-olefin with 4 to 20 carbons.

As for ethylene and/or alpha-olefin with 4 to 20 carbons as a comonomer copolymerized with the above propylene, there can be specifically exemplified ethylene, 1-butene, 1-pentene, 1-hexene, 1-octene, 4-methyl-1-butene or the like.

The above polypropylene based polymer can be obtained by using a so called metallocene based catalyst, for example.

In addition, in the present invention, a polypropylene based resin obtained by employing monomers in copolymerizing with propylene, which has been hardly polymerized by a conventional Ziegler-Natta catalyst, can be employed as a base resin for producing the expanded particle.

As these monomers, there can be exemplified one or two kinds of a cyclic olefin such as cyclopentene, norbornene, 1,4,5,8-dimetano-1,2,3,4,4a,8,8a,5-octahydronaphtalene; non-conjugate diene such as 5-methyl-1,4-hexadiene, 7-methuyl-1, or 6-octadiene; and an aromatic unsaturated compound such as styrene or divinyl benzene.

The propylene based polymer for use in the present invention is a propylene based (co)polymer resin which contains 85 mole % to 100 mole % of a structural unit derived from propylene contained in the propylene based polymer. In addition, it is required that the structural unit derived from ethylene and/or alpha-olefin with 4 to 20 carbons is contained at a content of 0 mole % to 15 mole %.

In the case where the structural unit of comonomer is beyond the above range, the mechanical properties such as bending strength or tensile strength of a base resin are greatly lowered, and a target expanded particle and a molded article derived therefrom is not obtained.

Next, as shown in the above requirement (b), the above propylene based monomer is 0.5% to 2.0% at a content of a position irregularity unit based on 2,1-insertion of a propylene monomer unit in all propylene insertions measured in 13C-NMR, and a content of a position irregularity unit based on 1,3-insertion of propylene monomer unit is 0.005% to 0.4%.

With respect to 0.5% to 2.0% of the former, there is a problem that an advantageous effect of uniform foam diameter in the expanded particle is small if the diameter is less than 0.5%, and there is a problem that, if 2.0% is exceeded, the mechanical properties of the base resin, for example, bending strength or tensile strength, is lowered. Thus, there is a problem that the strength of particle strength and the molded article derived therefrom are lowered.

In addition, with respect to 0.005% to 0.4% of the latter, there is a problem that, if the content is less than 0.005%, an advantageous effect of uniform foam diameter in the expanded particle is small, and there is a problem that, if 0.4% is exceeded, the mechanical properties of the base resin, for example, bending strength or tensile strength, is lowered, and thus, there is a problem that the expanded particle and the molded article derived therefrom is lowered.

Here, the structural unit derived from propylene contained in a propylene based polymer and/or the fraction of the structural unit derived from alpha-olefin with 4 to 20 carbons, and the isotactic triad fraction described later are values measured by employing a 13C-NMR technique.

A 13C-NMR spectrum measuring technique is as follows, for example. That is, a sample of 350 mg to 500 mg was put into an NMR sample tube of 10 mm in diameter; a solvent was completely dissolved by employing a mixture of about 0.5 ml of deuterated benzene for locking and about 2.0 ml of o-dichlorobenzene; and then, measurement was carried out under a proton complete de-coupling condition at 130° C.

Under a measurement condition, a flip angle of 65 deg, a pulse interval of 5T1 or more (provided if T1 is the longest value in a spin lattice relaxation time of a methyl group) was selected. In a propylene polymer, the spin lattice relaxation time of the methylene group and methine group is shorter than that of the methyl group, and thus, the recovery of magnetization of all carbons is 99% or more under the measurement condition.

Although the detection sensitivity of a position irregularity unit under the 13C-NMR technique is generally about 0.01%, the sensitivity can be enhanced by increasing the scanning time.

In addition, a chemical shift in the above measurement is set as follows. A peak of a methyl group of a third unit of 5 chains of a propylene head-to-tail unit which is identical in a direction of methyl branch was set at 21.8 ppm, and a chemical shift of another carbon peak was set with this peak being a reference.

When this reference is employed, a peak based on a methyl group in a second unit of three chains of the propylene unit indicated by PPP[mm] in the following formula [chemical formula 1] appears in the range of 21.3 to 22.2 ppm; a peak based on a methyl group in a second unit of the three chains of the propylene unit indicated by PPP[mm] appears in the range of 20.5 ppm to 21.3 ppm; and a peak based on a methyl group in a second unit of the three chains of the propylene unit indicated by PPP[rr] appears in the range of 19.7 ppm to 20.5 ppm.

Here, PPP[mm], PPP[mr], and PPP[rr] are indicated respectively as shown below.

[Chemical Formula 1]

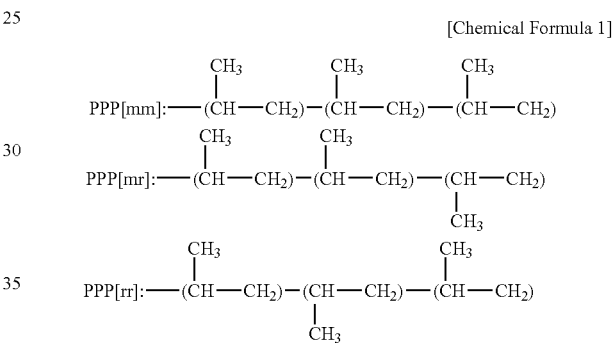

Further, the propylene polymer of the present invention contains a specific amount of the following partial structures (I) and (II) which includes a position irregularity unit based on 2,1-insertion and 1,3-insertion of propylene.

[Chemical Formula 2]

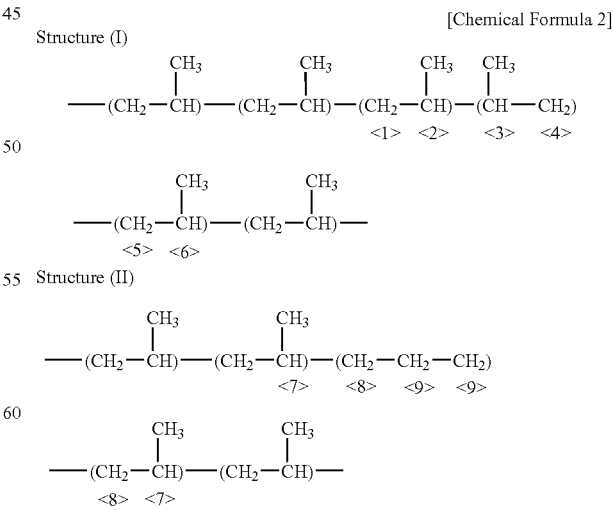

Such a partial structure is considered to be produced by the position irregularity which takes place during polymerization of propylene in the case where reaction has been carried out by employing a metallocene based catalyst, for example.

That is, a propylene monomer, in general, reacts in a fashion in which a methylene carbon is bonded with a metal portion in a catalyst, i.e., under "1,2-insertion". Rarely, "2,1-insertion" or "1,3-insertion" may take place. "2,1-insertion" is a reaction format in which an adding direction is reversed from "1,2-insertion", and a structural unit represented by the above partial structure (I) is formed in a polymer chain.

In addition, "1,3-insertion" means propylene monomers are taken in a polymer chain with their C-1 and C-3, and as a result, a straight chain shaped structural unit, i.e., the above partial structure (II) is generated.

The mm fraction in all the polymer chains of the propylene polymer according to the present invention is represented by the following mathematical formula 1. It should be noted that in partial structure (II), as a result of 1,3-insertion, a methyl group derived from a propylene monomer disappears by one.

[Mathematical Formula 1]

$$mm(\%) = \frac{\text{area of methyl group } (21.1 \sim 21.8 \text{ ppm}) - 3 \times \frac{(A\langle 1\rangle + A\langle 2\rangle + A\langle 3\rangle + A\langle 4\rangle + A\langle 5\rangle + A\langle 6\rangle)}{6}}{\Sigma ICH_3 - 4 \times \frac{(A\langle 1\rangle + A\langle 2\rangle + A\langle 3\rangle + A\langle 4\rangle + A\langle 5\rangle + A\langle 6\rangle)}{6} - \frac{(A\langle 7\rangle + A\langle 8\rangle + A\langle 9\rangle)}{3}}$$

In this formula, $\Sigma ICH_3$ indicates an area of all methyl groups (all the peaks of 19 ppm to 22 ppm of chemical shift). In addition, A<1>, A<2>, A<3>, A<4>, A<5>, A<6>, A<7>, A<8>, and A<9> are areas of peaks of 42.3 ppm, 35.9 ppm, 38.6 ppm, 30.6 ppm, 36.0 ppm, 31.5 ppm, 31.0 ppm, 37.2 ppm, and 27.4 ppm, respectively, and indicate contents of carbons indicated by partial structures (I) and (II).

In addition, a rate of 2,1-inserted propylene with respect to all the propylene insertions and a rate of 1,3-inserted propylene were calculated in accordance with the following mathematical formula 2.

[Mathematical Formula 2]

a content of 2,1-inserted propylene (%) =

$$\frac{(A\langle 1\rangle + A\langle 2\rangle + A\langle 3\rangle + A\langle 4\rangle + A\langle 5\rangle + A\langle 6\rangle)/6}{\text{sum of integral value of } 27 \sim 48 \text{ ppm}} \times 1000 \times \frac{1}{5}$$

a content of 1,3-inserted propylene (%) =

$$\frac{(A\langle 7\rangle + A\langle 8\rangle + A\langle 9\rangle)/6}{\text{sum of integral value of } 27 \sim 48 \text{ ppm}} \times 1000 \times \frac{1}{5}$$

Next, with respect to requirement (c), there is shown a relationship between water vapor transmission rate and a melting point in the case where a propylene based polymer as a base resin is used as a film.

That is, according to the propylene polymer of the present invention, in the case where a melting point of the polymer is Tm[° C.] and the water vapor transmission rate is Y [g/m²/24 hr] when the polymer is formed into a film, Tm and Y meet the following relational formula (1).

$$(-0.20) \cdot Tm + 35 \leq Y \leq (-0.33) \cdot Tm + 60 \qquad \text{Formula (1)}$$

The above water vapor transmission rate can be measured by JIS K7129 "Stream Transparency Testing Method of Plastic Film and sheet". In the case where a value Y of water vapor transmission rate is in the above range, the size of foams in expanded particles become extremely uniform.

In the case where the value Y exceeds the value of formula (1) and in the case where it is lower than the range of formula (1), the non-uniformity of the diameters of foams in expanded particles increases. As a result, there can only be obtained an expanded particle with inferior which mechanical properties when molding is effected in a molded article.

Although this reason is not clear, it is presumed that a balance between impregnation and escape of a blowing agent is associated when an expanded particle is produced by discharging it in a low pressure atmosphere; and this balance becomes preferable in the case where a propylene based polymer is employed such that the melting point (Tm) and water vapor transmission rate (Y) meets a relationship of formula (1).

The polypropylene based expanded particle according to the present invention is employed as a material for obtaining a molded article by filling the particle in a mold, heating the filled particle, and foaming it.

Next, it is preferable that the above polypropylene based polymer further has the following requirement (d) (claim 2):

(d) An isotactic triad fraction of a propylene unit chain part which consists of a head-to-tail linkage measured by 13C-NMR is 97% or more.

In this case, there can be attained an advantageous effect that the uniformity of the size of foams contained in the expanded particles is further improved.

That is, apart from the above described requirements (a) to (c), a propylene based polymer as the above base resin is employed the one whose isotactic triad fraction (i.e., a rate of three propylene unit in which propylene units are bonded with each other in a head-to-tail manner and the direction of methyl branch in the propylene unit is identical, out of the arbitrary three propylene unit in the polymer chains) measured by 13C-NMR (nuclear magnetic resonance technique), is 97% or more.

Hereinafter, the isotactic triad fraction is described as an mm fraction. In the case where the mm fraction is less than 97%, there is a danger that the mechanical properties of a base resin are lowered, and the mechanical properties of a molded article consisting of a expanded resin particle derived by using this resin are lowered as well.

Further preferably, the mm fraction is 98% or more.

It is preferable that the above propylene based polymer further has the following requirement (e) (claim 3):

(e) a melt flow rate is 0.5 g/10 minutes to 100 g/10 minutes.

In this case, there can be attained an advantageous effect that the expanded particles can be produced while they maintain productivity which is useful in commercial production, and the physical properties of a molded article consisting of the derived foam particles are excellent.

If the above melt flow rate (MFR) is less than 0.5 g/10 minutes, there is a danger that the productivity of expanded particles, in particular, productivity under the melting and kneading process described later is lowered. In addition, in the case where the MFR exceeds 100 g/10 minutes described above, there is a danger that dynamic properties such as compression strength and tensile strength of a molding element derived by employing the foam particles obtained as a product are lowered. Preferably, the melt flow rate is 1.0 g/10 minutes to 50 g/10 minutes, and is further 1.0 g/10 minutes to 30 g/10 minutes.

Next, it is preferable that the above polypropylene resin expanded particle contains a blowing agent which meets the following requirement (f) (claim 4):

(f) in the case where a critical temperature of the blowing agent is defined as Tc [° C.], Tc meets the following formula (2)

$$-90 \leq Tc \leq 400 \qquad \text{Formula (2).}$$

In this case, there is a tendency that the foam diameters of the obtained expanded particles are uniform. As a result, the dynamic properties of a molded article obtained by employing such foam particles are improved. If Tc is lower than −90° C., the non-uniformity of the foam diameters of the obtained foam particles becomes significant. Although this reason is not clear it is estimated that low Tc results in sudden foaming.

On the other hand, if Tc is higher than 400° C., there is a danger that it is very difficult to obtain an expanded particle of 0.1 g/cm$^3$ or less in density, for example.

Specific example of the above blowing agents are as follows. A substance name is followed by critical temperature for each substance (° C.). There are exemplified: straight-chain or cyclic aliphatic hydrocarbons or analogues such as methane (−82); ethane (32); propane (97); butane (152); isobutane (135); pentane (197); hexane (235); cyclopentane (239); or cyclohexane (280); halogenated hydrocarbons such as dichlorodifluoromethane (112) trichloromonofluoromethane (198); and inorganic gas such as carbon dioxide (31).

In addition, among from the blowing agent which meets the following formula (2), in the case where the following formula (3) is met, there is an advantage that special facilities or equipment are not required especially when these blowing agents are handled.

$$0 \leq Tc \leq 300 \qquad \text{Formula (3)}$$

Further, in the case where the following formula (4) is met, there is an advantageous effect that, apart from the engineering effectiveness described previously, the foam diameters of the expanded particles obtained are very uniform.

$$30 \leq Tc \leq 200 \qquad \text{Formula (4)}$$

The above blowing agent may be used alone, or in combination of the two or more.

In addition, another polymer component or additive can be mixed with the above described propylene based polymer (base resin) without departing from the advantageous effect of the present invention.

The other polymer components described above include: for example, an ethylene based resin such as linear low density polyethylene which is a copolymer of ethylene and alpha-olefin (4 or more carbons), high density polyethylene, and low density polyethylene; a polybutene resin; an ethylene-propylene based rubber; an ethylene-propylene-diene based rubber; a styrene based thermoplastic elastomer such as a hydrogenated block copolymer obtained by saturating at least part of an ethylenic based double bond of styrene-diene block copolymer, or styrene-diene block copolymer; and a modified polymer of these resin, elastomer, or rubber, by grafting of acrylic acid type monomer. In the present invention, these resins, elastomer, rubber or a modified polymer thereof can be used independently or two or more thereof can be used in combination.

As the above described additives, a variety of additives such as a nucleating agent, a coloring agent, an antistatic agent; a lubricating agent can be added. These additives are usually added altogether during melting and kneading described later, and are contained in resin particles.

The above nucleating agents includes organic nucleating agents such as carbon, phosphate based nucleating agent, phenol based nucleus agent, or amine based nucleus agent as well as inorganic compounds such as talc, calcium carbonate, silica, titanium oxide, gypsum, zeolite, borax, or aluminum hydroxide. The amount of a variety of these additives is 15 wt. % or less with respect to 100 wt. % of a base resin of the present invention, is preferably 8 wt. % or less, and further preferably 5 wt. % or less, which is different depending on its purpose of addition.

Although mixing of the above other component to the base resin can be carried out where the polypropylene base resin is in a fluid state or solid state, in general, melting and kneading is used. That is, for example, the above base resin and the other components or the like are kneaded at a desired temperature by using a variety of kneading machines such as a roll, a screw, a Banbury mixer, a kneader; a blender; or a mill. After kneading, the product is granulated into an appropriate size of particles suitable to production of expanded particles.

In addition, it is preferable to employ a method in which, after melting and kneading has been carried out in an extruder, a kneading substance is extruded in a standard from a die having small holes at a tip end of the extruder, and is cut in a predetermined weight or size by a cutter provided with a pulling machine, thereby obtaining a resin particle.

In general, expanded particles can be produced smoothly without a problem when the weight of one resin particle is from 0.1 mg to 20 mg. If the weight of one resin particle is in the range of 0.2 mg to 10 mg and if a deviation in weight between particles is small, the expanded particles are easily produced. Then, the density distribution of expanded particles obtained is small, and the filling properties of the expanded resin particles into the mold or the like are improved.

As a method for obtaining expanded particles, there can be used a method for performing heating and foaming after a volatile blowing agent has been impregnated in resin particles; more specifically, any of the methods described in JP 1974-2183 Examined Patent Publication (Kokoku); JP 1981-1344 Examined Patent Publication (Kokoku); DE 1285722 Unexamined Patent Publication (Kokai); and DE2107683Unexamined Patent Publication (Kokai); or the like.

After the blowing agent has been impregnated in resin particles, in the case where heating and foaming are carried out, resin particles are put into a pressure vessel which can be closed and released, together with a volatile blowing agent; heating is carried out at or above the softening temperature of the base resin, and the volatile blowing agent is impregnated in the resin particles. Then, after the contents within the vessel are discharged from the sealed container into a low pressure atmosphere, and drying is carried out. In this manner, expanded particles are obtained.

It is preferable that the polypropylene based resin expanded particles of the present invention have two or more endothermic peaks in a DSC curve obtained by means of differential scanning calorimetry (the DSC curve obtained when 2 mg to 4 mg of expanded particles are heated from 20° C. to 200° C. at a rate of 10° C. by means of differential scanning calorimeter). This phenomenon arises when a part derived from the above base resin forms an inherent endothermic peak and an endothermic peak at a higher temperature than the former.

The expanded particles of which two or more endothermic peaks appear on the DSC curve are obtained by controlling a condition when the above resin particles are foamed, more specifically, by controlling the temperature, the pressure, or a time and the like when discharging is carried out into a low pressure atmosphere.

In a method for producing expanded particles by discharging the contents of vessel into a low pressure atmosphere when a decomposition type blowing agent is kneaded in advance in resin particles, it is possible to obtain the above expanded particles even if no blowing agent is added into a pressure vessel.

As the above mentioned decomposition type blowing agent, any agent can be used as long as it is decomposed at a foaming temperature of resin particles and generates a gas. Specifically, sodium bicarbonate, ammonium carbonate, an azide compound, an azo compound and the like can be exemplified.

In addition, during heating or foaming, it is preferable that water or alcohol and the like is used as a dispersion medium for resin particles. Further, it is preferable to use independently or in combination of two or more: sparingly water soluble inorganic substance such as aluminum oxide, tricalcium phosphate, magnesium pyrophosphate, zinc oxide, or kaolin; water soluble polymeric protective colloid such as polyvinyl pyrrolidone, polyvinyl alcohol, or methyl cellulose; and anionic surface active agent such as sodium dodecyl benzene sulfonate, or sodium alkane sulfonate so that resin particles are uniformly dispersed in a dispersion medium.

When resin particles are discharged into a low pressure atmosphere, it is preferable to maintain the pressure in the vessel to be constant by introducing inorganic gas or volatile blowing agent similar to the above from the outside in order to facilitate the discharging of the beads.

Next the polypropylene based resin foam particles of the present invention are molded by using a mold under various conditions. For example, after the polypropylene based resin expanded particles have been filled into a mold cavity which consists of a pair of protrusive and recessed molds at an atmospheric pressure or under pressure reduction, the cavity is compressed so that the volume is reduced by 5% to 70%. After that a hot medium such as steam is introduced into the cavity so as to heat and fuse the polypropylene based resin expanded particles (for example, JP1971-38359 Examined Patent Publication (Kokoku)).

In addition, there is a pressure aging method in which the resin particles are first treated with a volatile blowing agent or one or more inorganic gases to enhance a secondary expanding force of the resin particles; then filling the foam resin particles into a mold cavity at an atmospheric pressure or under reduced pressure while maintaining the secondary foaming force; and then, introducing a hot medium into the mold cavity to heat and fuse the expanded resin particles (for example, JP 1976-22951 Examined Patent Publication (Kokoku)).

In addition, there is a compression filling technique in which the mold cavity pressurized at an atmospheric pressure or higher by a compressive gas filled with the expanded particles which have been pressurized at or above the pressure of the cavity, followed by introducing a hot medium such as steam into the cavity to heat and fuse the expanded resin particles (for example, JP 1992-46217 Examined Patent Publication (Kokoku)).

Further, there is a normal pressure filling technique for filling expanded resin particles into a cavity which consists of a pair of protrusive and recessed metal die at an atmospheric pressure or under reduced pressure by using the expanded particles with high secondary expanded force obtained under a specific conditions, followed by introducing a hot medium such as steam into the cavity to heat and fuse the foam resin particles (for example, refer to JP 1994-49795 Examined Patent Publication (Kokoku)). Furthermore, molding can be performed by a combination of the above methods (for example, refer to JP 1994-22919 Examined Patent Publication (Kokoku)).

Furthermore, a film can be laminated on the above foam molded article as required. The film to be laminated is not limited in particular, and, for example, there is employed: a polystyrene film such as OPS (bi-axially oriented polystyrene sheet), heat resistant OPS, or HIPS; a polypropylene film such as CPP (a non-oriented polypropylene film), OPP (a bi-axially oriented polypropylene film) or a polyethylene film; or a polyester film and the like.

Moreover, although there is no limitation to thickness of a film to be laminated, in general, a film having a thickness of 15 micron to 150 micron is employed. Printing may be applied on these films as required. In addition, lamination may be carried out at the same time when expanded particles are molded to be heated and fused. Further, lamination may be carried out on molded element. Lamination can also be carried out by employing a hot melt adhesive as required.

The description of the first associated invention has now been completed.

[Second Associated Invention]

Now, the second associated invention will be described here.

The second associated invention of the present application relates to a polypropylene resin expanded particle which has significantly uniform foam diameter, which exhibits excellent fusion properties, which is capable of lowering a molding temperature for obtaining a molded article, and moreover, which is capable of producing an molded article having an excellent surface appearance or the like, and a molded article using the particle.

A resin expanded particle has a low thermal conductivity owing to its closed cell structure. Thus, this particle is widely used as raw material in obtaining molded articles such as heat insulation materials, cushioning materials, or various core materials. In addition, as a thermoplastic resin constituting the above resin expanded particle, in general, there are used polyethylene, polypropylene, polystyrene or the like.

Among the above described thermoplastic resins, there is an advantage that an expanded molded article obtained by using a resin expanded particle obtained by using a resin having crystalline properties, i.e., polyethylene or polypropylene is excellent in chemical resistance or heat resistance, as compared with a molded article obtained by using a polystyrene resin expanded particle.

However, in the case of a high melting point resin represented by a polypropylene resin, since a melting point is as high as 135° C. or above, a high pressure steam exceeding 0.2 MPaG (hereinafter, referred to as G: Gauge pressure) is required as a pressure for fusing the resin expanded particles during molding in a mold.

Thus, there is a disadvantage that the molding cost increases, and moreover, a molding cycle is extended. In addition, in the case of the resin expanded particle made of the above described high melting point resin, molding cannot be performed in a molding machine for expandable polystyrene. Thus, a molding machine that has a high pressure steam control system and a high mold closing pressure is required.

On the other hand, in the case of a polyethylene resin, since a melting point is as low as 125° C. or below, it is sufficient if the steam pressure for fusing the resin expanded particles has a low pressure of less than 0.2 MPaG. Thus, there is provided an advantage that molding can be performed even by a molding machine for expandable polystyrene with almost no change of specification.

However, an expanded molded article of a polyethylenic resin is low in heat resistance, since a base resin has a low melting point. Particularly, for a molded article having high expansion ratio, energy absorption performance is small. Therefore, the expanded molded article of the polyethylene resin can be generally used only at low expansion ratio, as compared with another expanded molded articles of other thermoplastic resins.

In order to solve various problems as described above, in JP 1998-77359 Unexamined Patent Publication (Kokai), there is proposed a resin expanded particle having a specific structure, the resin expanded particle comprising a core layer in an expanded state comprising a crystalline thermoplastic resin and a coat layer comprising an ethylene polymer which is substantially in a non-expanded state.

In this case, a resin expanded particle exhibiting excellent fusion properties can be obtained even when the heated steam pressure in molding is low. However, the mechanical strength of a molded article obtained is not sufficient, and further improvement has been desired.

Patent Document 2
JP 1998-77359 Unexamined Patent Publication (Kokai) (pages 2 to 4).

Therefore the object of the second associated invention of the present invention is to provide a polypropylene resin expanded particle which has significantly uniform foam diameters and which is capable of obtaining, even if molding is performed with a general-purpose molding machine with a low mold closing pressure, a molded article excellent in surface appearance, mechanical properties, fusion between expanded particles, and in heat resistance; and a molded article thereof.

The first aspect of the second associated invention is a polypropylene resin expanded particle characterized by comprising:

a core layer in an expanded state comprising of a crystalline thermoplastic resin; and a coat layer comprising of a thermoplastic resin covering the above core layer, wherein the above core layer is a propylene polymer having the following requirements (a) to (c):

(a) a structural unit derived from propylene is present in 100 to 85 mole %, and a structural unit derived from ethylene and/or alpha-olefin with 4 to 20 carbons is present in 0 to 15 mole %;

(b) a content of a position irregularity unit based on 2,1-insertion of a propylene monomer unit in all propylene insertions, which is measured by 13C-NMR, is 0.5% to 2.0%, and a content of a position irregularity unit based on 1,3-insertion of propylene monomer unit in all propylene insertions, which is measured by 13C-NMR, is 0.005% to 0.4%; and (c) in the case where a melting point is defined as Tm [° C.], and where a water vapor transmission rate when made into a film is defined as Y [g/m$^2$/24 hr], Tm and Y meet the following formula (1)

$(-0.20)\cdot Tm+35 \leq Y \leq (-0.33)\cdot Tm+60$    Formula (1). (claim 6)

The above resin expanded particle of the first invention of the second associated invention is comprised of: a core layer comprising the propylene polymer having the above described requirements (a) to (c) as a base resin; and a coat layer coating the core layer.

Therefore, the above resin expanded particle can exhibit significantly uniform foam diameters and is capable of obtaining, even if molding is performed with a general-purpose molding machine with a low mold closing pressure, a molded article excellent in surface appearance, mechanical properties, and fusion between expanded particles, and in heat resistance.

The second aspect of the second associated invention is a molded, made by molding polypropylene resin expanded particles in a mold and having density of 0.5 g/cm$^3$ to 0.008 g/cm$^3$, wherein the above polypropylene resin expanded particles are the one which is described in the above first invention of the second associated invention (claim 6). (claim 12).

In this case, as the above described polypropylene resin expanded particle, that of the first invention of the second associated invention is used, and thus, a molded article has the above density.

Therefore, the molded article is excellent in surface appearance such as smoothness or glossiness, and is excellent in mechanical properties such as compression strength or tensile strength.

If the density of the molded article is greater than 0.5 g/cm$^3$, there is a possibility that preferred characteristics of an expanded article such as weight reduction, shock absorption properties or heat resistance are not sufficiently provided, and cost efficiency is lowered because of a low expansion ratio.

On the other hand, if the density is smaller than 0.008 g/cm$^3$, there is a possibility that the closed cell ratio is prone to decrease, and mechanical properties such as bending strength and compression strength or the like are insufficient.

Therefore, the above described molded article is suitable for, for example, packages, toys, automobile parts, helmet core materials, and cushioning packaging materials or the like.

The polypropylene resin expanded particle of the second associated invention has a complex structure formed of a core layer and a coat layer.

In the first invention of the second associated invention (claim 6), first, requirement (a) will be described with respect to a propylene polymer for a base resin of the above core layer is provided.

The base resin used here means a substrate resin component constituting the core layer. The core layer is made of the above base resin, other polymer components which is added according to need, and additives such as catalyst neutralizing agent, lubricating agent, nucleating agent, and any other resin additive.

The above described requirement (a) is a propylene homopolymer (100%) or a copolymer of propylene and ethylene and/or alpha-olefin of 4 to 20 carbons.

As ethylene and/or alpha-olefin with 4 to 20 carbons, of comonomers, which are copolymerized with propylene, there can be specifically exemplified: ethylene, 1-butene, 1-pentene, 1-hexene, 1-octene, or 4-methyl-1-butene and the like.

The above polypropylene polymer can be obtained by using a so-called metallocene catalyst, for example.

In addition, in the first invention of the second associated invention, a polypropylene based resin obtained by employing monomers which has been hardly polymerized by a conventional Ziegler-Natta catalyst, in copolymerizing with propylene, can be employed as a base resin for producing an expanded particle.

As these monomers, there can be exemplified one or more kinds of cyclic olefin such as cyclopentene, norbornene, 1,4,5,8-dimethano-1,2,3,4,4a,8,8a,5-octahydronaphthalene; non-conjugate diene such as 5-methyl-1,4-hexadiene, 7-methyl-1,6-octadiene; and an aromatic unsaturated compound such as styrene or divinylbenzene.

The propylene polymer for use in the first invention of the second associated invention is a propylene based (co)polymer resin which contains 85 mol % to 100 mol % of the structural unit derived from propylene contained in the propylene polymer. In addition, it is required that the structural unit derived from ethylene and/or alpha-olefin with 4 to 20 carbons is contained at a content of 0 mol % to 15 mol %.

In the case where the structural unit of a comonomer is beyond the above range, the mechanical properties such as bending strength or tensile strength of the core layer are greatly lowered, and the target expanded particle and a molded article derived therefrom cannot be obtained.

Next, as shown in the above requirement (b), the above propylene polymer has 0.5% to 2.0% at a content of a position irregularity unit based on 2,1-insertion of a propylene monomer unit in all propylene insertions measured by 13C-NMR, and a content of position irregularity unit based on 1,3-insertion of propylene monomer unit is 0.005% to 0.4%.

With respect to 0.5% to 2.0% of the former, there is a problem that the advantageous effect of uniform foam diameter in expanded particles is small if the content is less than 0.5%, and there is a problem that if 2.0% is exceeded, the mechanical properties of the base resin, for example, bending strength or tensile strength, is lowered. Thus, there is a problem that the strength of expanded particles and the molded article derived therefrom are lowered.

In addition, with respect to 0.005% to 0.4% of the latter, there is a problem that if the content is less than 0.005%, an advantageous effect of uniform foam diameter in the expanded particles is small, and there is a problem that, if 0.4% is exceeded, the mechanical properties of the base resin, for example, bending strength or tensile strength, is lowered, and thus, there is a problem that the expanded particles and the molded article derived therefrom is lowered.

Here, the contents of the structural unit derived from propylene in the propylene polymer, the content of the structural unit derived from ethylene and/or alpha-olefin with 4 to 20 carbons in the above propylene polymer, and the isotactic triad fraction described later are measured by employing a 13C-NMR technique.

For the 13C-NMR spectrum measurement technique, refer to the above first associated invention.

Further, the propylene polymer of the second associated invention contains a specific amount of the above chemical formula 2 partial structures (I) and (II) which includes a position irregularity unit based on 2,1-insertion of propylene and 1,3-insertion. (refer to the first associated invention).

The mm fraction in all polymer chains of the propylene polymer according to the second associated invention is expressed by the above mathematical formula 1 (refer to the first associated invention).

The mm fraction in all polymer chains of the propylene polymer according to the first invention of the second associated invention is represented by the following mathematical formula 1. It should be noted that in partial structure (II), as a result of 1,3-insertion, a methyl group derived from a propylene monomer disappears by one.

In addition, a content of 2,1-inserted propylene and a content of 1,3-inserted propylene with respect to all propylene insertions are calculated by the above mathematical formula 2 (refer to the first associated invention).

Next, with respect to requirement (c), a relationship between water vapor transmission rate and a melting point in the case where a propylene polymer as a base resin has been made into a film is shown.

That is, according to the propylene polymer in the first invention of the second associated invention, in the case where a melting point of the polymer is defined as Tm [° C.] and the water vapor transmission rate when the polymer is molded into a film is defined as Y [g/m$^2$/24 hr], Tm and Y satisfy the following relational formula (1).

$$(-0.20) \cdot Tm + 35 \leq Y \leq (-0.33) \cdot Tm + 60 \qquad \text{Formula (1)}$$

The above water vapor transmission rate can be measured in accordance with JIS K7129 "Testing methods for Water Vapor Transmission Rate of Plastic Film and Sheeting". In the case where a value Y of water vapor transmission rate is within the above range, the foam diameter in expanded particles is extremely uniform.

In the case where the value Y exceeds a range of formula (1) and in the case where it is lower than the range of formula (1), the non-uniformity of size of foams in expanded particles increases. As a result, there can be only be obtained an expanded particle with inferior mechanical properties when molding is effected in a molded article.

Although this reason is not clear, it is presumed that a balance between impregnation and escape of a blowing agent is associated when an expanded particle is produced by discharging it in a low pressure atmosphere; and this balance becomes preferable in the case where a propylene polymer is employed such that the melting point (Tm) and water vapor transmission rate (Y) meets a relationship of formula (1).

Next, it is preferable that a thermoplastic resin forming a coat layer in the first invention of the second associated invention be made of a polyolefin based resin or a polystyrene based resin. In this case, advantageous effect in which physical properties of the molded article are excellent can be obtained. As a polyolefin resin, it is particularly preferable that homopolymer of ethylene or propylene be used or copolymer of them be used.

In addition, it is preferable that the coat layer be in a non-expanded state or be substantially in a non-expanded state. In this case, there can be attained advantageous effect that a molded article with excellent fusion between expanded particles is obtained.

The polypropylene resin expanded particle according to the first invention of the second associated invention is foamed and hot-fused by charging it in a mold and heating, and is used as a material for obtaining a molded article.

Next, it is preferable that the above coat layer be characterized in that the above coat layer comprises of an olefin polymer in which a melting point is lower than that of a thermoplastic resin forming the above core, or an olefin polymer which shows substantially no melting point (claim 7). In this case, there is advantageous effect that a molded article can be obtained at a lower temperature.

As an olefin polymer with a lower melting point than a thermoplastic resin for the core layer, there can be exemplified: high pressure low density polyethylene, linear low density polyethylene, linear very low density polyethylene; copolymer of ethylene with vinyl acetate, unsaturated carboxylic acids or unsaturated carboxylic acid esters, and the like; or a propylene copolymer with ethylene or alpha-olefin or analogous.

In addition, as the above olefin polymer which shows substantially no melting point, for example, there can be exemplified a rubber or elastomer such as an ethylene-propylene rubber, an ethylene-propylene-diene rubber, an ethylene-acrylic rubber; chlorinated polyethylene rubber; chlorosulfonated polyethylene rubber, and the like. These rubbers or elastomer can be used alone or in combination of the two or more.

Next, it is preferable that the above propylene polymer characterized in that a propylene polymer of a core layer further has the following requirement (d)(claim 8):

(d) an isotactic triad fraction at a propylene unit chain part which has a head-to-tail linkage, which is measured by 13C-NMR, is 97% or more.

In this case, there can be obtained advantageous effect that the uniformity of the size of foams in the expanded particles is further improved.

That is, as the propylene polymer of the base resin for the above core layer, there is used propylene polymer in which the isotactic triad fraction (that is, a rate of three propylene unit in which propylene units are bonded with each other in a head-to-tail manner, of arbitrary three propylene unit in the polymer chains, and the direction of methyl branch in the propylene unit is identical) measured by 13C-NMR (nuclear magnetic resonance technique), is 97% or more in addition to the already described requirements (a) to (c).

Hereinafter, the isotactic triad fraction is described as an mm fraction. In the case where the mm fraction is less than 97%, there is a danger that the mechanical properties of the base resin is lowered, and the mechanical properties of a molded article composed of resin expanded particles derived by using this resin are lowered as well.

Further preferably, the mm fraction is 98% or more.

Next, it is preferable that the propylene polymer for the core layer characterized in that a propylene polymer of the above core layer further has the following requirement (e) (claim 9):

(e) a melt flow rate is 0.5 g/10 minutes to 100 g/10 minutes.

In this case, there can be obtained advantageous effect that expanded particles can be produced while maintaining productivity which is useful in commercial production, and dynamic properties of a molded article composed of the obtained expanded particles are excellent.

If the above melt flow rate (MFR) is less than 0.5 g/10 minutes, there is a danger that the productivity of the expanded particles under the melting and kneading process described later is lowered. In addition, in the case where the MFR exceeds 100 g/10 minutes described above, there is a danger that dynamic properties such as compression strength or tensile strength of a molded article derived by employing the expanded particles obtained as a product are lowered. Preferably, the melt flow rate is 1.0 g/10 minutes to 50 g/10 minutes, and is further 1.0 g/10 minutes to 30 g/10 minutes.

Next, it is preferable that the above coat layer be characterized in that the above coat layer is a composition in which a resin identical to a core layer is blended by 1 part by weight to 100 parts by weight per 100 parts by weight of an olefin polymer (claim 10).

According to such a composition, the adhesion properties of the core layer and coat layer is improved. As a result, strong fusion among expanded particles in a molded article can be obtained by using the above polypropylene resin expanded particles. As a result, the strength or the like of the molded article is improved.

In the case of blending less than 1 part by weight, there is a possibility that advantageous effect of improving the degree of fusion among expanded particles become insufficient. On the other hand, if the 100 parts by weight described above is exceeded, there is a possibility that the steam pressure required for molding becomes higher. Further preferably, the above rate is 2 parts by weight to 50 parts by weight. Furthermore preferably, the rate is 3 parts by weight to 10 parts by weight.

Next, it is preferable that the above polypropylene resin expanded particles characterized in that the above polypropylene resin expanded particle is foamed by using a blowing agent which meets the following requirement (f) (claim 11).

(f) in the case where a critical temperature of the above blowing agent is defined as Tc [° C.], Tc meets the following formula (2):

$$-90°C. \leq Tc \leq 400° C. \qquad \text{Formula (2)}$$

In this case, there is a tendency that the foam diameters of expanded particles are uniform. As a result, the dynamic properties of a molded article obtained by employing such expanded particles are improved. If Tc is lower than −90° C., the non-uniformity of foam diameters of the expanded particles becomes significant. Although the reason is not clear, it is estimated that low Tc results in sudden foaming.

On the other hand, if Tc is higher than 400° C., there is a danger that it is very difficult to obtain an expanded particle of 0.1 g/cm³ or less in density, for example.

For a specific example of the above blowing agent, refer to the first associated invention.

In addition, among from the blowing agent which meets the above formula (2), in the case where the following formula (3) is met, there is an advantage that special facilities or equipment are not required especially when these blowing agents are handled.

$$0° C. \leq Tc \leq 300° C. \qquad \text{Formula (3)}$$

Further, in the case where the following formula (4) is met, there is advantageous effect that, apart from the engineering effectiveness described previously, the foam diameters of the expanded particles obtained are very uniform.

$$30°\text{C.} \leq Tc \leq 200°\text{C.} \quad \text{Formula (4)}$$

The above blowing agent may be used alone or in combination of the two or more.

In addition, other polymer components or additives can be mixed with the above propylene polymer as the base resin according to the second associated invention within the range in which advantageous effect of the second associated invention is not degraded.

Although mixture of the other component with a propylene polymer as a base resin can be carried out where the polypropylene base resin is in a fluid state or solid state, in general, melting and kneading is used. That is, for example, the above base resins and the other components or the like are kneaded at a desired temperature by using variety of kneading machines such as a roll, a screw, a Banbury mixer, a kneader, a blender, or a mill and the like. After kneading, the product is granulated into an appropriate size of particles suitable to production of expanded particles.

A raw material for polypropylene resin expanded particles according to the first invention of the second associated invention is a composite particle which comprises of a core layer and a coat layer.

As such a specific production method for composite particles, for example, the following methods can be used.

For example, there can be used a sheath-core shaped composite die described in: JP 1966-16125 Examined Patent Publication (Kokoku); JP 1968-23858 Examined Patent Publication (Kokoku); JP 1969-29522 Examined Patent Publication (Kokoku); and JP 1985-185816 Unexamined Patent Publication (Kokai) or the like.

In this case, two extruders are used. A thermoplastic resin constituting a core layer is melted and kneaded by one extruder; a resin constituting a coat layer is melted and kneaded by the other extruder; and then, a sheath-core shaped composite composed of a core layer and a coat layer is discharged out from the die in a strand shape.

It is preferable to use a method for cutting the composite to a specified weight or size by a strand cutter to obtain columnar pellet shaped resin particles comprising of the core layer and the coat layer.

In general, if the weight of one resin particle is 0.1 mg to 20 mg, there is no problem with production of expanded particles obtained by heating and foaming them. When the weight of one resin particle is within the range of 0.2 mg to 10 mg, if a deviation in weight between particles is small, the expanded particles are easily produced, a deviation in density of expanded particles obtained is small, and the filling properties of resin expanded particles into the mold or the like are improved.

As methods for obtaining expanded particles from the above resin particles, there can be used a method of performing heating and foaming after a volatile blowing agent in the resin particles fabricated as described above has been impregnated in the resin particles; more specifically, any of the methods described in JP 1974-2183 Examined Patent Publication (Kokoku), JP 1981-1344 Examined Patent Publication (Kokoku), DE 1285722 Unexamined Patent Publication (Kokai), and DE 2107683 Unexamined Patent Publication (Kokai) or the like.

After a blowing agent has been impregnated in resin particles comprising a core layer and a coat layer, in the case where heating and foaming are carried out, resin particles are put into a pressure vessel which can be closed or released, together with a volatile blowing agent; heating is carried out at or above the softening temperature of the core layer contained in a base resin, and the volatile blowing agent is impregnated in the resin particles.

Then, after the contents within the vessel are discharged from the closed vessel into a low pressure, and drying is carried out. In this manner, polypropylene resin expanded particles can be obtained.

It is preferable that a propylene polymer forming a core layer of polypropylene resin expanded particles of the first invention of the second associated invention have two or more endothermic peaks in a DSC curve obtained by means of differential scanning calorimeter (the DSC curve is obtained when 2 mg to 4 mg of expanded particles are heated from 20° C. to 200° C. at a rate of 10° C. by means of differential scanning calorimeter). This phenomenon arises when a part derived from the above base resin forms an inherent endothermic peak and an endothermic peak at a higher temperature than the former.

The expanded particles of which two or more endothermic peaks appear on the above DSC curve are obtained by controlling the condition when the above resin particles are foamed, more specifically, by controlling the temperature, the pressure, and a time and the like when discharging is carried out into a low pressure atmosphere.

In a method of producing expanded particles by discharging the contents of the vessel into a low pressure atmosphere, when a decomposition type blowing agent is kneaded in advance in resin particles comprising of the core layer and coat layer, the blowing agent is added into the pressure vessel, it is possible to obtain the above expanded particles even if no blowing agent is added into a pressure vessel.

As the above mentioned decomposition type blowing agent, any agent can be used as long as it is decomposed at a foaming temperature of resin particles and generates a gas. Specifically, for example, sodium bicarbonate, ammonium carbonate, an azide compound, and an azo compound and the like can be exemplified.

In addition, during heating and foaming, it is preferable that water or alcohol and the like is used as a dispersion medium of resin particles (refer to the first associated invention).

When resin particles are discharged into a low pressure atmosphere, it is preferable to maintain the pressure in the vessel to be constant by introducing inorganic gas or a volatile blowing agent similar to the above from the outside in order to facilitate the discharging of the beads.

Next, the polypropylene resin expanded particles of the second associated is molded by using a mold conforming to various conditions (refer to the first associated invention).

For the above expanded molded article, a film can be laminated as required (refer to the first associated invention).

The description of the second associated invention has now been completed.

[Third Associated Invention]

Next, the third associated invention is described below.

The third associated invention relates to a polypropylene resin expanded particle having its significantly uniform foam diameter and capable of obtaining a molded article with its excellent surface appearance and mechanical properties; a molded article thereof; and a polypropylene resin composition suitable as a base resin of the molded article and the polypropylene resin expanded particle.

An expanded molded article obtained from a polypropylene resin expanded particle is excellent in chemical resistance, shock resistance, and compression strain recovery or the like, as compared with a molded article made of a polystyrene resin expanded particle. Thus, the expanded molded article is suitably used as a bumper core material of automobiles or the like or as a variety of packaging materials and the like.

The above polypropylene resin expanded particle contains a polypropylene resin composition serving as a base resin and a blowing agent.

As the above polypropylene resin composition, from an aspect of its foaming applicability or the like, there is employed a propylene-alpha-olefin random copolymer or the like obtained by primarily copolymerizing alpha-olefin such as ethylene or 1-butene or the like with propylene. However, even using these copolymers are low in dynamic properties, since they are copolymers.

Thus, in order to improve dynamic properties of the polypropylene resin composition, there have been proposed a method of reducing the content of comonomer in a copolymer, or alternatively, a method of mixing linear polyethylene with propylene-alpha-olefin random copolymer (refer to patent document 3). However, with such methods as well, there has been a limitation to improving the dynamic properties of a molded article.

On the other hand, polypropylene itself is essentially a synthetic resin having excellent dynamic properties such as rigidity. Thus, when expanded particles can be obtained by a polypropylene homopolymer, an expanded particle molded article with its sufficiently high rigidity can be obtained. However, in the case where an attempt is made to obtain a molded article by expanded particles composed of a polypropylene homopolymer, the foaming temperature range or molding range is extremely narrow, and it is very difficult to precisely control these conditions. Thus, there has been a problem that a fusion failure between particles occurs with the obtained molded article or the appearance of the molded article surface is poor. Therefore, in actual industrial production, an expanded molded article has not been successfully obtained by a polypropylene homopolymer.

However, in recent years, there has been proposed a method in which polypropylene expanded article having a syndiotactic structure obtained by using a so-called metallocene catalyst as a base resin of an expanded article (refer to Patent Document 4). With this proposal, it becomes possible to produce an expanded article by a propylene homopolymer.

However, there has been a problem that polypropylene having a syndiotactic structure is low in melting point and is inferior in mechanical properties as compared with polypropylene having an isotactic structure.

In addition, in Patent Document 5 described later, there has been proposed a polypropylene resin expanded particle in which an isotactic polypropylene resin polymerized by using a metallocene polymer catalyst is used as a base resin.

In this case, although the foam diameter of expanded particles are characterized to be comparatively uniform, dynamic properties of a molded article obtained by using such expanded particles are not sufficient, and further improvement has been desired.

Patent Document 3
JP 1982-90027 Unexamined Patent Publication (Kokai) (claims)

Patent Document 4
JP 1992-224832 Unexamined Patent Publication (Kokai) (claims)

Patent Document 5
JP 1994-240041 Unexamined Patent Publication (Kokai) (claim 1).

However, in the case where expanded molding has been performed by using the above conventional expanded particles, and it has been impossible to obtain a molded article having both significantly uniform foam diameter and excellent surface appearance and mechanical properties.

The third associated invention has been made in view of such a conventional problem. The object of the third associated invention is to provide a polypropylene resin expanded particle in which foam diameter is significantly uniform and a molded article with its excellent surface appearance and mechanical properties can be obtained; and a polypropylene resin composition which is suitable as the molded article and a base resin of the polypropylene resin expanded particle resin expanded particle.

The first aspect of the third associated invention is a polypropylene resin composition, characterized by comprising:

5% by weight to 95% by weight of a following propylene polymer [A]; and

95% by weight to 5% by weight of a following propylene polymer [B] (the total amount of propylene polymers [A] and [B] is 100% by weight), wherein a propylene polymer [A] has the following requirements (a) to (c):

(a) a structural unit derived from propylene is present in 100 to 85 mole %, and a structural unit derived from ethylene and/or alpha-olefin with 4 to 20 carbons is present in 0 to 15 mole %; (the total amount of the structural unit derived from propylene and the structural unit derived from ethylene and/or alpha-olefin with 4 to 20 carbons is 100 mol %);

(b) a content of a position irregularity unit based on 2,1-insertion of a propylene monomer unit in all propylene insertions, which is measured by 13C-NMR, is 0.5% to 2.0%, and a content of a position irregularity unit based on 1,3-insertion of propylene monomer unit in all propylene insertions, which is measured by 13C-NMR, is 0.005% to 0.4%; and (c) in the case where a melting point is defined as Tm [° C.], and where a water vapor transmission rate when made into a film is defined as Y [g/m$^2$/24 hr], Tm and Y meet the following formula (1)

$$(-0.20) \cdot Tm + 35 \leq Y \leq (-0.33) \cdot Tm + 60 \qquad \text{Formula (1); and}$$

a propylene polymer [B] has only (a) of the above requirements (a) to (c). (claim 13)

The polypropylene resin composition of the third associated contains 5% by weight to 95% by weight of the propylene polymer [A] having the above requirements (a) to (c) and 95% by weight to 5% by weight of the propylene polymer [B] having only requirement (a) of the above requirements (a) to (c).

Thus, the above polypropylene resin composition is excellent in mechanical properties.

In addition in the polypropylene resin composition of the third associated invention, when expanded particles are produced using the above polypropylene resin composition as a base resin, expanded particles with its significantly uniform foam diameter can be obtained. Thus, when the expanded particles are molded, a molded article with its excellent surface appearance and mechanical properties can be obtained. That is, the polypropylene resin composition of the third associated invention can be used as an optimal base resin of the polypropylene resin expanded particle.

The base resin used here means a substrate resin component constituting the expanded particle. The expanded particle is made of the above base resin, other polymer components which is added according to need, and additives such as a blowing agent, catalyst neutralizing agent, lubricating agent, nucleating agent, and any other resin additive.

The second aspect of the third associated invention is a polypropylene resin expanded particle characterized in that a polypropylene resin composition as claimed in any one of claims 8 to 11 is comprised as a base resin (claim 17).

In the third associated invention, the polypropylene resin composition of the first aspect of the present invention is used as a base resin, and thus, a polypropylene resin expanded particle with its significantly uniform foam diameter can be obtained. In addition, by using this polypropylene resin expanded particle, a molded article excellent in mechanical properties such as compression strength or tensile strength and excellent in a surface appearance can be obtained.

The base resin used here means a substrate resin component constituting the above polypropylene resin expanded particle. The above polypropylene resin expanded particle is made of the above base resin, other polymer components which is added according to need, and additives such as catalyst neutralizing agent, lubricating agent, nucleating agent, and any other resin additive.

A third aspect of the third associated invention is a molded article, made by molding polypropylene resin expanded particles in a mold and having density of 0.008 g/cm$^3$ to 0.5 g/cm$^3$, wherein the above polypropylene resin expanded particles are that of the above second invention. (claim 19).

The molded article of the third associated invention is molded in a mold by using the polypropylene resin expanded particle of second invention, and has the above density.

Thus, the above molded article is excellent in mechanical properties such as compression strength or tensile strength, and is excellent in surface appearance such as smoothness or gloss properties.

In the first aspect of the third associated invention (claim 13), the above polypropylene resin composition contains a propylene polymer [A] and a propylene polymer [B]. First, the above propylene polymer [A] is a propylene polymer having the above requirements (a) to (c). Now, the propylene polymer [A] will be described here.

First of all, the above requirement (a) is that a structural unit derived from propylene is present in 100 mol % to 85 mol %, and a structural unit derived from ethylene and/or alpha-olefin with 4 to 20 carbons is present in 0 mol % to 15 mol %.

Here, the total amount of the structural unit derived from propylene and the structural unit derived from ethylene and/or olefin with 4 to 20 carbons is 100 mol %.

Therefore, the polypropylene polymer meeting the requirement (a) includes that made of a propylene homopolymer (100 mol %) or that made of a copolymer of propylene with ethylene and/or alpha-olefin with 4 to 20 carbons.

As ethylene and/or alpha-olefin with 4 to 20 carbons, of comonomers, which are copolymerized with propylene, there can be specifically exemplified: ethylene, 1-butene, 1-pentene, 1-hexene, 1-octene, or 4-methyl-1-butene and the like.

In addition, in the third associated invention, a polypropylene resin obtained by employing monomers which has been hardly polymerized by a conventional Ziegler-Natta catalyst, in copolymerizing with propylene, can be employed as the above propylene polymer [A].

Then, the above polypropylene resin composition containing such a propylene polymer can be used as a base resin for producing expanded particles.

As these monomers, there can be exemplified one or more kinds of cyclic olefin such as cyclopentene, norbornene, 1,4,5,8-dimethano-1,2,3,4,4a,8,8a,5-octahydronaphthalene; non-conjugate diene such as 5-methyl-1,4-hexadiene, 7-methyl-1,6-octadiene; and an aromatic unsaturated compound such as styrene or divinylbenzene.

The propylene polymer [A] for use in the third associated invention is, as in the above requirement (a), a propylene (co)polymer resin which contains 85 mol % to 100 mol % of the structural unit derived from the propylene contained in a propylene polymer, and it is required that the structural unit derived from ethylene and/or alpha-olefin with 4 to 20 carbons is contained at a content of 0 mol % to 15 mol %.

In the case where the structural unit of a comonomer is out of the above range, the mechanical properties of the above polypropylene resin composition such as bending strength or tensile strength are significantly lowered. In addition, even if expanded particles are fabricated with the above polypropylene resin composition being abase resin, desired expanded particles with uniform foam size cannot be obtained. Further, even if the expanded particles are molded, a desired molded article cannot be obtained.

Next, as shown in the above requirement (b), the above propylene polymer [A] has 0.5% to 2.0% at a content of a position irregularity unit based on 2,1-insertion of a propylene monomer unit in all propylene insertions measured by 13C-NMR, and a content of position irregularity unit based on 1,3-insertion of propylene monomer unit is 0.005% to 0.4%.

The requirement (b) relates to a content of a position irregularity unit of a propylene polymer. Such an irregularity unit has an effect that crystalline properties of the propylene polymer is lowered, and exhibits advantageous effect that foaming properties are improved.

In the case where the content of position irregularity unit based on the above 2,1-insertion is lower than 0.5%, in the polypropylene resin composition of the third associated invention, there is a problem that, when polypropylene expanded particles are fabricated with the above composition as a base resin, the advantageous effect of making uniform the foam size of expanded particles is reduced. On the other hand, in the case where 2.0% is exceeded, mechanical properties of a propylene resin composition as a base resin, for example, bending strength or tensile strength and the like, is lowered. Thus, there is a problem that the strengths of expanded particles and a molded article obtained therefrom are lowered.

In the case where the content of position irregularity unit based on 1,3-insertion is lower than 0.005%, in the polypropylene resin composition of the third associated invention, there is a problem that, when polypropylene expanded particles are fabricated with the above composition being a base resin, the advantageous effect of making uniform the foam size of expanded particles is reduced. On the other hand, in the case where 0.4% is exceeded, mechanical properties of a propylene resin composition as a base resin, for example, bending strength or tensile strength and the like, is lowered. Thus, there is a problem that the strengths of expanded particles and a molded article obtained therefrom are lowered.

Here, the contents of the structural unit derived from propylene in the above propylene polymer, the content of the structural unit derived from ethylene and/or alpha-olefin with 4 to 20 carbons in the above propylene polymer, and the isotactic triad fraction described later are measured by employing a 13C-NMR technique.

For the 13C-NMR spectrum measurement technique, refer to the above first associated invention.

Further, in the third associated invention, the above propylene polymer [A] contains a specific amount of partial structures (I) and (II) in the above chemical formula 2 which includes a position irregularity unit based on 2,1-insertion and 1,3-insertion of propylene (refer to the first associated invention).

The mm fraction in all polymer chains of the propylene polymer according to the third associated invention is expressed by the above mathematical formula 1 (refer to the first associated invention).

In addition, a content of 2,1-inserted propylene and a content of 1,3-inserted propylene with respect to all propylene insertions are calculated by the above mathematical formula 2 (refer to the first associated invention).

Next, with respect to requirement (c), a relationship between water vapor transmission rate and a melting point in the case where a propylene polymer [A] has been made into a film is shown.

That is, in the above propylene polymer [A], in the case where a melting point of the polymer is defined as Tm [° C.] and the water vapor transmission rate when the polymer is molded into a film is defined as Y [g/m²/24 hr], Tm and Y meets the following relational formula (1).

$$(-0.20) \cdot Tm + 35 \leq Y \leq (-0.33) \cdot Tm + 60 \quad \text{Formula (1)}$$

The above water vapor transmission rate can be measured by JIS K7129 "Testing Method for Water Vapor Transmission Rate of Plastic Film and Sheeting".

In the case where the value Y of water vapor transmission rate is within the above range, in the polypropylene resin composition of the third associated invention, when polypropylene resin expanded particles or an expanded molded article is fabricated by using the above composition as a base resin, the foam size of the expanded particles and expanded molded article are extremely uniform.

In the case where the value Y of water vapor transmission rate exceeds the range of formula (1) and in the case where the value is lower than the range of formula (1), there is a possibility that mechanical properties of the polypropylene resin composition of the third associated invention are lowered. When expanded particles are fabricated with this polypropylene resin composition being a base resin, the non-uniformity of foam size in the expanded particles increases. As a result, in the case where the expanded particles are molded into a molded article, only the molded article with its inferior mechanical properties can be obtained.

Although this reason is not clear, it is estimated that a balance between impregnation and escape of a blowing agent is associated with the uniformity of foam diameter, when the blowing agent is impregnated under a warming and pressurization, and is discharged to a low pressure atmosphere, thereby producing expanded particles. Further, it is estimated that this balance becomes suitable in the case of using a polypropylene resin composition which contains a propylene polymer such that a melting point (Tm) and water vapor transmission rate (Y) meet a relationship indicated in formula (1).

The above propylene polymer [A] can be obtained by using a so-called metallocene catalyst, for example.

Now, the above propylene polymer [B] in the first invention of the third associated invention (claim 13) will be described below.

The above propylene polymer [B] is a propylene polymer having only (a) of the above requirements (a) to (c). That is, the above propylene polymer [B] meets the requirement (a) that the structural unit derived from propylene exists to be 100 mol % to 85 mol % and the structural unit derived from ethylene and/or alpha-olefin with 4 to 20 carbons exists to be 0 mol % to 15 mol %, and fails to meet any of the above requirements (b) and (c).

The above requirement (a) is same as the requirement [a] of the above propylene polymer [A].

Next, it is preferable that the above propylene polymer [A] further have the following requirement (d) (claim 14).

(d) an isotactic triad fraction at a propylene unit chain part which has ahead-to-tail linkage, which is measured by 13C-NMR, is 97% or more.

In this case, there can be provided advantageous effect that higher uniformity of foam diameter in expanded particles is obtained by using the above polypropylene resin composition as a base resin.

That is, as the propylene polymer (A) which is a constituent component of a resin composition, in addition to the requirements (a) to (c) which have been already described, there is used a polymer in which the isotactic triad fraction measured by 13C-NMR (nuclear magnetic resonance) technique, of a propylene unit contiguous chain part having a head-to-tail linkage (that is, a rate of the three propylene unit in which each of arbitrary propylene unit 3 contiguous chains in polymer chains is linked in a heat-to-tail manner and the directions of methyl branch in propylene unit are identical) is 97% or more.

Hereinafter, the isotactic triad fraction is properly described as an mm fraction. In the case where the mm fraction is less than 97%, mechanical properties of the polypropylene resin composition is lowered. Thus, there is a possibility that the mechanical properties of a molded article composed of expanded particles obtained by using the composition as a base resin are also lowered.

Further preferably, the above mm fraction is 98% or more.

Next, it is preferable that the above propylene polymer [A] further have the following requirement (e) (claim 15).

(e) the melt flow rate is 0.5 g to 100 g/10 minutes.

In this case, the above polypropylene resin composition can be produced while the industrially useful production efficiency is maintained. Further, there can be attained advantageous effect that a molded article composed of expanded particles obtained by using this composition as a base resin has its excellent dynamic properties.

In the case where the above melt flow rate (MFR) is lower than 0.5 g/10 minutes, there is a possibility that the production efficiency of the above polypropylene resin composition, in particular, the productivity under the melting and kneading process described later is lowered. In addition, in the case where the MFR exceeds 100 g/10 minutes, there is a possibility that dynamic properties such as compression strength or tensile strength of a molded article obtained by further molding expanded particles when the obtained polypropylene resin composition is used as a base resin are lowered. Preferably, the melt flow rate is 1.0 g/10 minutes to 50 g/10 minutes. Further preferably, it is 1.0 g/10 minutes to 30 g/10 minutes.

Next, it is preferable that the above polypropylene resin composition exhibits a substantially single melting peak in measurement using a differential scanning calorimeter (claim 16).

In this case, it means that the above propylene polymer [A] and the above propylene polymer [B] are dissolved each other, and it exhibits that the uniformity of the resin composition is high. As a result, foam diameter becomes uniform in the expanded resin particles obtained by using such a polypropylene resin composition as a base resin.

The polypropylene resin composition according to the third associated invention is used as a base resin of a material for obtaining polypropylene resin expanded particles. Further, the polypropylene resin expanded particles are foamed by filling and heating them in a mold, whereby a molded article can be obtained.

Next, it is preferable that, in the third associated invention (claim 16), the above polypropylene resin expanded particles be foamed by using a blowing agent which meets the following requirement (f) (claim 17)

(f) in the case where a critical temperature of the above blowing agent is defined as Tc [° C.], Tc meets the following formula (2):

$$-90°C. \leq Tc \leq 400° C. \qquad \text{Formula (2)}$$

In this case, there is a tendency that the foam diameter of the obtained polypropylene resin expanded particles is uniform. As a result, the dynamic properties of the expanded molded article obtained by using such expanded particles are improved.

In the case where Tc is lower than −90° C., there is a possibility that the non-uniformity of foam diameter of the obtained polypropylene resin expanded particles becomes significant. Although the reason is not clear, it is estimated that such non-uniformity is caused by sudden promotion of foaming.

On the other hand, in the case where Tc is higher than 400° C., there is a possibility that it becomes very difficult to obtain propylene resin expanded particles with high magnificence, for example, 0.1 g/cm² or less of density.

For a specific example of the above blowing agent, refer to the first associated invention.

In addition, among the blowing agents which meet the above formula (2), in the case where the following formula (3) is met, there is an advantage that special facility or equipment is not required for handling these blowing agents.

$$0° \leq Tc \leq 300° C. \qquad \text{Formula (3)}$$

Further, in the case where the following formula (4) is met, in addition to industrial effectiveness described in the previous section, there is advantageous effect that the foam diameter of the obtained expanded particles are extremely uniform.

$$30° C. \leq Tc \leq 200° C. \qquad \text{Formula (4)}$$

The above blowing agents may be used alone or in combination of the two or more.

In the above polypropylene resin expanded particles of the second invention of the third associated invention, other polymer components or additive agents can be mixed with a base resin of the above polypropylene resin composition composed of the propylene polymer [A] and polypropylene polymer [B] without departing from advantageous effect of the third associated invention.

For the other polymer component and additive agents, refer to the first associated invention.

In the third associated invention, when the propylene polymers [A] and [B] as the above base resins are mixed with each other and when the other component is mixed with the above base resins, although such mixings can be carried out where the polypropylene base resin is in a solid state, in general, melting and kneading is used. That is, by using a variety of kneading machines such as a roll, a screw, a Banbury mixer, a kneader, a blender, or a mill, the above propylene polymers or the above base resin and the other component or the like are kneaded at a desired temperature. After kneading, the product is granulated into an appropriate size of particles suitable to production of expanded particles.

In addition, it is preferable to use a method for performing melting and kneading in an extruder, followed by extruding in a strand shape a kneaded material from a die having small holes mounted at a tip end of the extruder, and then, performing cutting at a specified weight or size by a cutting machine to obtain resin particles.

In addition, in general, there is no problem with production of expanded particles when the weight of one resin particle is 0.1 mg to 20 mg. When the weight of one resin particle is in the range of 0.2 mg to 10 mg, and further, a dispersion in weight between particles is small, expanded particles can be easily produced. Further, the density distribution of the obtained expanded particles becomes small, and the filling properties of expanded resin particles in a mold or the like is improved.

As a method of obtaining expanded particles, there can be used a method of impregnating a volatile blowing agent in resin particles, followed by heating and foaming them. Specifically, there can be used methods described in JP 1974-2183 Examined Patent Publication (Kokoku), JP 1981-1344 Examined Patent Publication (Kokoku), DE 1285722 Unexamined Patent Publication (Kokai), and DE2107683 Unexamined Patent Publication (Kokai).

After a blowing agent has been impregnated in resin particles, in the case where heating and foaming are performed, resin particles are put in a pressure vessel which can be closed and released together with a volatile blowing agent. Then, heating is performed at a softening temperature or more, of a base resin, and the volatile blowing agent is impregnated in the resin particles. Thereafter, the content within the closed vessel is discharged from the closed vessel to a low pressure atmosphere, and then, the solid part is treated to be dried. In this manner, expanded particles are obtained.

It is preferable that the polypropylene resin expanded particles of the third associated invention exhibits an endothermic peak with its higher temperature as well as an endothermic peak intrinsic to a base resin in a DSC curve obtained by differential scanning calorimetry (the DSC curve is obtained when 2 mg to 4 mg of expanded particles are heated from 20° C. to 200° C. at a rate of 10° C. per minute by the differential scanning calorimeter).

Expanded particles in which an endothermic peak intrinsic to the base resin and an endothermic peak whose temperature is higher than the former appear in the DSC curve are obtained by controlling the condition for foaming the above resin particles, specifically a temperature, a pressure, a time and the like for the discharge into a low pressure atmosphere.

In a method of producing expanded particles by discharging the content of the closed vessel from the closed vessel to a low pressure atmosphere, a decomposition type blowing agent can be kneaded in advance in resin particles, thereby making it possible to obtain the above expanded particles even if the blowing agent is not fed in the pressure vessel.

As the above decomposition type blowing agent, any agent can be used when it is decomposed at a foaming temperature of resin particles, and generates gas. Specifically, for example, there can be exemplified sodium bicarbonate, ammonium carbonate, an azide compound, an azo compound and the like.

In addition, during heating and foaming, it is preferable that water or alcohol and the like is used as a dispersion medium of resin particles (refer to the first associated invention).

When resin particles are discharged to a low pressure atmosphere, in order to facilitate the discharge, it is preferable that an inorganic gas or a volatile blowing agent similar to the above is introduced from the outside into the closed vessel, thereby constantly maintaining the internal pressure of the closed vessel.

Next, the polypropylene resin expanded particles of the third associated invention is molded by using a mold conforming to various conditions (refer to the first associated invention).

For the above expanded molded article, a film can be laminated as required (refer to the first associated invention).

In the above molded article of the third invention of the third associated invention, the density of the molded article is 0.008 g/cm$^3$ to 0.5 g/cm$^3$. If the density of the molded article is greater than 0.5 g/cm$^3$, it is impossible to sufficiently provide preferred properties of the foamed article such as light weight, shock resistance, or heat resistance. Further, there is a possibility that cost efficiency is lowered because of its low expansion ratio.

On the other hand, if the density is smaller than 0.008 g/cm$^3$, there is a tendency that the closed cell ratio is lowered, and mechanical properties such as bending strength or compression strength and the like are insufficient.

The molded articles of the third associated invention is suitable for packages, toys, automobile parts, helmet core materials, or cushioning packaging materials and the like.

The description of the third associated invention has now been completed.

[Fourth Associated Invention]

Now, the fourth associated invention will be described here.

The fourth associated invention relates to a polypropylene resin expanded particle which has significantly uniform foam size, which exhibits excellent fusion properties, which is capable of lowering a molding temperature for obtaining a molded article, and moreover, which is capable of producing an molded article having an excellent surface appearance and mechanical properties, and a molded article using the particles.

A resin expanded particle has a low thermal conductivity owing to its closed cell structure. Thus, this particle is widely used as raw material in obtaining molded articles such as heat insulation materials, cushioning materials, or core materials. In addition, as a thermoplastic resin constituting the above resin expanded particle, in general, there are used polyethylene, polypropylene, polystyrene or the like.

Among the above described thermoplastic resins, there is an advantage that an molded article obtained by using a resin expanded particle obtained by using a resin having crystalline properties, i.e., polyethylene or polypropylene is excellent in chemical resistance or heat resistance, as compared with a molded article obtained by using a polystyrene resin expanded particle.

However, in the case of a high melting point resin represented by a polypropylene resin, since a melting point is as high as 135° C. or above, a high pressure steam exceeding 0.2 MPaG (hereinafter, referred to as G: Gauge pressure) is required as a pressure for fusing the resin expanded particles during molding in a mold.

Thus, there is a disadvantage that the molding cost increases, and moreover, a molding cycle is extended. In addition, in the case of the resin expanded particle made of the above described high melting point resin, molding cannot be performed in conventional molding machine for expandable polystyrene. Thus, a molding machine that has a high pressure steam control system and a high mold closing pressure is required.

On the other hand, in the case of a polyethylene resin, since a melting point is as low as 125° C. or below, it is sufficient if the steam pressure for fusing the resin expanded particles has a low pressure of less than 0.2 MPaG. Thus, there is provided an advantage that molding can be performed even by a molding machine for expandable polystyrene with almost no change of specification.

However, an molded article of a polyethylenic resin is low in heat resistance, since a base resin has a low melting point. Particularly, in an molded article having high expansion ratio, energy absorption performance is small.

Therefore, the molded article of the polyethylene resin can be generally used only at low expansion ratio, as compared with another molded articles of other thermoplastic resins.

In order to solve various problems as described above, there is proposed a resin expanded particle having a specific structure, the resin expanded particle comprising a core layer in an expanded state comprising a crystalline thermoplastic resin and a coat layer comprising an ethylene polymer which is substantially in a non-expanded state. (Patent Document 6).

In this case, a resin expanded particle exhibiting excellent fusion properties can be obtained even when the heated steam pressure in molding is low. However, the mechanical strength of a molded article obtained is not sufficient, and further improvement has been desired.

Patent Document 6

JP 1998-77359 Unexamined Patent Publication (Kokai) (pages 2 to 4).

Therefore, the object of the fourth associated invention of the present application is to provide a polypropylene resin expanded particle which has significantly uniform foam size and which is capable of obtaining, even if molding is performed with a general-purpose molding machine with a low mold closing pressure, a molded article excellent in surface appearance, mechanical properties, fusion between expanded particles and in heat resistance; and a molded article thereof.

The first aspect of the fourth associated invention is a polypropylene resin expanded particle characterized by comprising:

a core layer in an expanded state comprising of a crystalline thermoplastic resin; and a coat layer comprising of a thermoplastic resin covering the above core layer, wherein the above core layer contains a resin composition as a base resin characterized by comprising:

5% by weight to 95% by weight of a following propylene polymer [A]; and

95% by weight to 5% by weight of a following propylene polymer [B] (the total amount of propylene polymers [A] and [B] is 100% by weight), wherein a propylene polymer [A] has the following requirements (a) to (c):

(a) a structural unit derived from propylene is present in 100 to 85 mole %, and a structural unit derived from ethylene and/or alpha-olefin with 4 to 20 carbons is present in 0 to 15 mole %; (the total amount of the structural unit derived from propylene and the structural unit derived from ethylene and/or alpha-olefin with 4 to 20 carbons is 100 mol %);

(b) a content of a position irregularity unit based on 2,1-insertion of a propylene monomer unit in all propylene insertions, which is measured by 13C-NMR, is 0.5% to 2.0%, and a content of a position irregularity unit based on 1,3-insertion of propylene monomer unit in all propylene insertions, which is measured by 13C-NMR, is 0.005% to 0.4%; and (c) in the case where a melting point is defined as Tm [° C.], and where a water vapor transmission rate when made into a film is defined as Y [g/m$^2$/24 hr], Tm and Y meet the following formula (1)

$$(-0.20)\cdot Tm+35 \leq Y \leq (-0.33)\cdot Tm+60 \quad \text{Formula (1); and}$$

a propylene polymer [B] has only (a) of the above requirements (a) to (c). (claim 20)

In the polypropylene resin expanded particle of the fourth associated invention, the above resin composition containing the propylene polymer [A] and the propylene polymer [B] is contained as a base resin.

Thus, a polypropylene resin expanded particle with high mechanical strength of the above core layer can be provided. If such a polypropylene resin expanded particle is molded by a general-purpose molding machine with low mold closing pressure, there can be provided a molded article which is excellent in fusion properties between expanded particles and the above molded article is excellent in mechanical properties such as compression strength and tensile strength and in surface appearance.

In addition, the second aspect of the fourth associated invention is a molded article, made by molding polypropylene resin expanded particles in a mold and having density of 0.5 g/cm$^3$ to 0.008 g/cm$^3$, wherein the above polypropylene resin expanded particles are the one which is described in the above first aspect of the fourth associated invention (claim 27).

The molded article of the fourth associated invention has a density of 0.5 g/cm$^3$ to 0.008 g/cm$^3$, and uses that of the above first invention.

Thus, the above molded article can be obtained by heating with a steam of about 0.2 MPaG, is excellent in mechanical properties such as compression strength and tensile strength, as well as in surface appearance such as smoothness and gloss properties.

Therefore, the above molded article is suitable for packages, toys, automobile parts, helmets, core materials, and cushioning packaging materials or the like.

If the density of the molded article is greater than 0.5 g/cm$^3$, there is a possibility that preferred characteristics of an expanded article such as weight reduction, shock absorption properties or heat resistance are not sufficiently provided, and cost efficiency is lowered because of a low expansion ratio.

On the other hand, if the density is smaller than 0.008 g/cm$^3$, there is a possibility that the closed cell ratio is prone to decrease, and mechanical properties such as bending strength and compression strength or the like are insufficient.

The polypropylene resin expanded particle of the fourth associated invention has a complex structure formed of a core layer and a coat layer.

In the above first invention of the fourth associated invention (claim 20), the above core layer contains a resin composition as a base resin which contains the above propylene polymer [A] and the above propylene polymer [B].

The base resin used here means a substrate resin component constituting the above core layer. The core layer is made of the above base resin, other polymer components which is added according to need, and additives such as catalyst neutralizing agent, lubricating agent, nucleating agent, and any other resin additive.

Now, the above propylene polymer [A] will be described here.

The above propylene polymer [A] is a propylene polymer having the above requirements (a) to (c).

The above requirement (a) is that a structural unit derived from propylene is present in 100 mol % to 85 mol %, and a structural unit derived from ethylene and/or alpha-olefin with 4 to 20 carbons is present in 0 mol % to 15 mol %.

Here, the total amount of the structural unit derived from propylene and the structural unit derived from ethylene and/or olefin with 4 to 20 carbons is 100 mol %.

Therefore, the polypropylene polymer meeting the requirement (a) includes propylene homo1 polymer (100 mol %) or a copolymer of propylene with ethylene and/or alpha-olefin with 4 to 20 carbons.

As ethylene and/or alpha-olefin with 4 to 20 carbons, of comonomers, which are copolymerized with propylene, there can be specifically exemplified: ethylene, 1-butene, 1-pentene, 1-hexene, 1-octene, or 4-methyl-1-butene and the like.

In addition, in the fourth associated invention, a polypropylene resin obtained by employing monomers which has been hardly polymerized by a conventional Ziegler-Natta catalyst, in copolymerizing with propylene, can be employed as the above propylene polymer [A].

As these monomers, there can be exemplified one or more kinds of cyclic olefin such as cyclopentene, norbornene, 1,4,5,8-dimethano-1,2,3,4,4a,8,8a,5-octahydronaphthalene; linear non-conjugate diene such as 5-methyl-1,4-hexadiene, 7-methyl-1,6-octadiene, 4-ethylidene-8-methyl-1,7-nonadiene or the like; cyclic non-conjugate polyene such as 5-ethylidene-2-norbornene, dicyclopentadiene, 5-vinyl-2-norbornene, norbornadiene or the like; or aromatic unsaturated compound such as styrene or divinylbenzene. These monomers can be used alone, or in combination of the two or more.

In the above propylene polymer [A] for use in the fourth associated invention, as in the above requirement (a), it is required that the structural unit obtained from propylene in a propylene polymer exist to be 85 mol % to 100 mol %, and it is required that the structural unit obtained from ethylene and/or alpha-olefin with 4 to 20 carbons exists to be 0 mol % to 15 mol %.

In the case where the structural unit of a comonomer is out of the above range, the mechanical properties of the above base resin composition such as bending strength or tensile strength are significantly lowered. In addition, even if expanded particles are fabricated with the above resin composition being a base resin, desired expanded particles with excellent strength and uniform foam size cannot be obtained. Further, even if the expanded particles are molded, a desired molded article cannot be obtained.

In addition, in the above propylene polymer [A], it is preferable that the structural unit obtained from propylene, in particular, exists to be 98 mol % to 85 mol %, and that the structural unit obtained from ethylene and/or alpha-olefin with 4 to 20 carbons exists to be 2 mol % to 15 mol % (the total amount of the structural unit obtained from propylene and the structural unit obtained from ethylene and/or alpha-olefin with 4 to 20 carbons is 100 mol %).

In this case, the structural unit obtained from propylene and the structural unit obtained from ethylene and/or alpha-olefin with 4 to 20 carbons are mandatory components. In addition, there can be attained advantageous effect that the above polypropylene resin expanded particles which contain such a propylene polymer [A] as one component of the above core layer are very uniform in the foam size.

Further, in the above propylene polymer [A], the structural unit obtained from propylene can be defined to be 100 mol %.

In this case, the above propylene polymer [A] is a so-called propylene homopolymer. The above polypropylene resin expanded particles which contain such a propylene polymer [A] as one component of the above core layer are more excellent in strength of the molded article obtained by molding the particles.

Next, as shown in the above requirement (b), the above propylene polymer [A] is 0.5% to 2.0% at a content of a position irregularity unit based on 2,1-insertion of a propylene monomer unit in all propylene insertions measured by 13C-NMR, and a content of position irregularity unit based on 1,3-insertion of propylene monomer unit is 0.005% to 0.4%.

The requirement (b) relates to a content of a position irregularity unit of a propylene polymer. Such an irregularity unit has an effect that crystalline properties of the propylene polymer is lowered, and exhibits advantageous effect that foaming properties are improved.

In the case where the content of position irregularity unit based on 2,1-insertion is lower than 0.5%, in the polypropylene resin composition of the fourth associated invention, there is a problem that, when the polypropylene expanded particles are defined as one component of a base resin forming a core layer of the expanded particles, the advantageous effect of making uniform the foam size of expanded particles is reduced. On the other hand, in the case where 2.0% is exceeded, mechanical properties of a propylene resin composition as a base resin, for example, bending strength or tensile strength and the like, is lowered. Thus, there is a problem that the strengths of expanded particles and a molded article obtained therefrom are lowered.

In the case where the content of position irregularity unit based on 1,3-insertion is lower than 0.005%, there is a problem that, when the polypropylene expanded particles are defined as one component of a base resin forming a core layer of the expanded particles, the advantageous effect of making uniform the foam size of expanded particles is reduced. On the other hand, in the case where the content exceeds 0.4%, mechanical properties of a propylene resin composition as a base resin, for example, bending strength or tensile strength and the like, is lowered. Thus, there is a problem that the strength of expanded particles and a molded article obtained therefrom are lowered.

Here, the contents of the structural unit derived from propylene in the above propylene polymer, the content of the structural unit derived from ethylene and/or alpha-olefin with 4 to 20 carbons in the above propylene polymer, and the isotactic triad fraction described later are measured by employing a 13C-NMR technique.

For the 13C-NMR spectrum measurement technique, refer to the above first associated invention.

Further, in the fourth associated invention, the above propylene polymer [A] contains a specific amount of partial structures (I) and (II) in the above chemical formula 2 which includes a position irregularity unit based on 2,1-insertion and 1,3-insertion of propylene (refer to the first associated invention).

The mm fraction in all polymer chains of the propylene polymer according to the fourth associated invention is expressed by the above mathematical formula 1 (refer to the first associated invention).

In addition, the contents of 2,1-inserted propylene and a rate of 1,3-inserted propylene with respect to all propylene insertions are calculated by the above mathematical formula 2 (refer to the first associated invention).

Next, with respect to requirement (c), a relationship between water vapor transmission rate and a melting point in the case where the above propylene polymer [A] has been made into a film is shown.

That is, in the above propylene polymer [A], in the case where a melting point of the polymer is defined as Tm [° C.] and the water vapor transmission rate when the polymer is molded into a film is defined as Y [$g/m^2/24$ hr], Tm and Y meets the following relational formula (1).

$$(-0.20) \cdot Tm + 35 \leq Y \leq (-0.33) \cdot Tm + 60 \qquad \text{Formula (1)}$$

The above water vapor transmission rate can be measured by JIS K7129 "Testing Method for Water Vapor Transmission Rate of Plastic Film and Sheeting".

In the case where the value Y of the water vapor transmission rate of the above propylene polymer [A] is in the above range, the fourth associated invention is characterized in that the foam size in the expanded particles of the fourth associated invention is very uniform, and dynamic properties of the molded article obtained by using the expanded particles are excellent.

In the case where the value Y exceeds a range of formula (1) and in the case where it is lower than the range of formula (1), the non-uniformity of size of foams in the polypropylene expanded particles of fourth associated invention increases. As a result, there can be only be obtained an expanded particle with inferior mechanical properties when molding the above polypropylene resin expanded particles is effected in a molded article.

Although this reason is not clear, it is presumed that a balance between impregnation and escape of a blowing agent is associated to the uniformity of size of foams when an expanded particle is produced by discharging it in a low pressure atmosphere; and this balance becomes preferable in the case where a propylene polymer is employed such that the melting point (Tm) and water vapor transmission rate (Y) meets a relationship of formula (1) as a polypropylene polymer [A].

The above propylene polymer [A] can be obtained by using a so-called metallocene catalyst, for example.

Now, the propylene polymer [B] in the first invention of the fourth associated invention (claim 20) will be described below.

The above propylene polymer [B] is a propylene polymer having only (a) of the above requirements (a) to (c). That is, the above propylene polymer [B] meets the requirement (a) that the structural unit derived from propylene exists to be 100 mol % to 85 mol % and the structural unit derived from ethylene and/or the alpha-olefin with 4 to 20 carbons exists to be 0 mol % to 15 mol %, and meets neither of the above requirements (b) and (c).

The above requirement (a) is same as the requirement [a] of the above propylene polymer [A].

Next, it is preferable that the above coat layer comprises of an olefin polymer in which a melting point lower than either of propylene polymers [A] and [B] forming a core layer or an olefin polymer which shows substantially no melting point (claim 21).

In this case, there is an advantageous effect that a molded article can be obtained at a lower temperature.

As an olefin polymer with a lower melting point than the above propylene polymer [A] and [B], there can be exemplified: high pressure low density polyethylene, linear low density polyethylene, linear very low density polyethylene; copolymer of ethylene with vinyl acetate, unsaturated carboxylic acids or unsaturated carboxylic acid esters, and the like; or a propylene copolymer with ethylene or alpha-olefin or analogous.

In addition, as the above olefin polymer which shows substantially no melting point, for example, there can be exemplified a rubber or elastomer such as an ethylene-propylene rubber, an ethylene-propylene-diene rubber; an ethylene-acrylic rubber; chlorinated polyethylene rubber; chlorosulfonated polyethylene rubber, and the like. These rubbers or elastomer can be used alone or in combination of the two or more.

Next, it is preferable that the above propylene polymer characterized in that a propylene polymer of a core layer further has the following requirement (d) (claim 22):

(d) an isotactic triad fraction at a propylene unit chain part which has ahead-to-tail linkage, which is measured by 13C-NMR, is 97% or more.

In this case, there can be provided advantageous effect that the uniformity of the size of foams in the polypropylene resin expanded particles is further improved.

That is, as the propylene polymer [A] which is a constituent component of a resin composition for the above core layer, there is used propylene polymer in which the isotactic triad fraction (that is, a rate of three propylene unit in which propylene units are bonded with each other in a head-to-tail manner, of arbitrary three propylene unit in the polymer chains, and the direction of methyl branch in the propylene unit is identical) measured by 13C-NMR (nuclear magnetic resonance technique), is 97% or more in addition to the already described requirements (a) to (c).

Hereinafter, the isotactic triad fraction is described as an mm fraction. In the case where the mm fraction is less than 97%, there is a danger that the mechanical properties of the resin composition is lowered. Thus, there is a possibility that the mechanical properties of a molded article by molding the composition as abase resin of the core layer are also lowered.

More preferably, the above mm fraction is 98% or more.

Next, it is preferable that the above propylene polymer [A] further have the following requirement (e) (claim 23).

(e) a melt flow rate is 0.5 g to 100 g/10 minutes.

In this case, there can be obtained advantageous effect that the above polypropylene resin expanded particles can be produced while maintaining productivity which is useful in commercial production. Further, there can be attained advantageous effect that a molded article composed of expanded particles obtained by using this composition has its excellent physical properties.

If the above melt flow rate (MFR) is less than 0.5 g/10 minutes, there is a danger that the productivity of the above polypropylene resin expanded particles under the melting and kneading process described later is lowered. In addition, in the case where the MFR exceeds 100 g/10 minutes described above, there is a danger that dynamic properties such as compression strength or tensile strength of a molded article derived by employing the above polypropylene resin expanded particles are lowered. Preferably, the melt flow rate is 1.0 g/10 minutes to 50 g/10 minutes, and is further 1.0 g/10 minutes to 30 g/10 minutes.

Next, it is preferable that the above resin composition of the above core layer exhibits a substantially single melting peak in measurement using a differential scanning calorimeter (claim 24).

In this case, it means that the above propylene polymer [A] and the above propylene polymer [B] are dissolved each other, and it exhibits that the uniformity of the resin composition is high. As a result, foam diameter becomes uniform in the polypropylene resin expanded particles obtained by using such a resin composition as a base resin of the core layer.

Next, it is preferable that the above coat layer, the above propylene polymer [A] and/or the above propylene polymer [B] are blended by 1 part by weight to 100 parts by weight per 100 parts by weight of an olefin polymer (claim 25).

In this case, adhesive properties between the above core layer and the above coat layer are improved. As a result, fusion between expanded particles in the molded article obtained by using the above polypropylene resin expanded particles is rigid, and, as a result, the strength or the like of the molded article is improved.

In the case where a total amount of the above propylene polymers [A] and [B] is lower than 1 part by weight, there is a possibility that advantageous effect of improving the degree of fusion between the above described expanded particles cannot be sufficiently obtained. On the other hand, in the case where the total amount exceeds 100 parts by weight, there is a possibility that a higher steam pressure is required to fuse the above expanded particles, thereby obtaining a molded article. More preferably, the total amount is 2 parts by weight to 50 parts by weight. Furthermore preferably, the amount is 3 parts by weight to 10 parts by weight.

Next, it is preferable that the above polypropylene resin expanded particles be foamed by using a blowing agent which meets the following requirement (f) (claim 26):

(f) in the case where a critical temperature of the above blowing agent is defined as Tc [° C.], Tc meets the following formula (2).

$$-90°C. \leq Tc \leq 400°C. \qquad \text{Formula (2)}$$

In this case, there is a tendency that the foam diameter of the expanded particles is more uniform. As a result, the dynamic properties of the molded article obtained by using such expanded particles are improved. In the case where Tc is lower than −90° C., there is a possibility that the non-uniformity of foam diameter of the above polypropylene resin expanded particles becomes significant. Although the reason is not clear, it is estimated that such non-uniformity is caused by sudden progress of foaming.

On the other hand, in the case where Tc is higher than 400° C., there is a possibility that it becomes very difficult to obtain propylene resin expanded particles with high magnificence, for example, a density of 0.1 $g/cm^2$ or less.

For a specific example of the above blowing agent, refer to the first associated invention.

In addition, among from the blowing agent which meets the above formula (2), in the case where the following formula (3) is met, there is an advantage that special facilities or equipment are not required especially when these blowing agents are handled.

$$0° C. \leq Tc \leq 300° C. \quad \text{Formula (3)}$$

Further, in the case where the following formula (4) is met, there is advantageous effect that, apart from the engineering effectiveness described previously, the foam diameters of the polypropylene resin expanded particles obtained are very uniform.

$$30° C. \leq Tc \leq 200° C. \quad \text{Formula (4)}$$

The above blowing agent may be used alone or in combination of the two or more.

Additionally, other polymer components or additives can be mixed with the above resin composition which is a base resin consisting of the propylene polymers [A] and [B] forming the above core within the range in which advantageous effect of the fourth associated invention is not degraded.

For the above other polymer components and additive agents, refer to the first associated invention.

In the fourth associated invention, when the propylene polymers [A] and [B] as the above resin composition are mixed with each other and when the other component is mixed with the above resin composition, although such mixings can be carried out where the polypropylene base resin is in a solid state, in general, melting and kneading is used. That is, by using a variety of kneading machines such as a roll, a screw, a Banbury mixer, a kneader, a blender, or a mill, the above propylene polymers or the above resin composition and the other component or the like are kneaded at a desired temperature. After kneading, the product is granulated into an appropriate size of particles suitable to production of polypropylene resin expanded particles.

A raw material for polypropylene resin expanded particles according to the fourth associated invention is a composite particle which comprises of a core layer and a coat layer.

As such a specific production method for composite particles, for example, the following methods can be used.

For example, there can be used a sheath-core shaped composite die described in: JP 1966-16125 Examined Patent Publication (Kokoku); JP 1968-23858 Examined Patent Publication (Kokoku); JP 1969-29522 Examined Patent Publication (Kokoku); and JP 1985-185816 Unexamined Patent Publication (Kokai) or the like.

In this case, two extruders are used. A thermoplastic resin constituting a core layer is melted and kneaded by one extruder; a resin constituting a coat layer is melted and kneaded by the other extruder; and then, a sheath-core shaped composite composed of a core layer and a coat layer is discharged out from the die in a strand shape.

It is preferable to use a method for cutting the composite to a specified weight or size by a strand cutter to obtain columnar pellet shaped resin particles comprising of the core layer and the coat layer.

In general, if the weight of one resin particle is 0.1 mg to 20 mg, there is no problem with production of expanded particles obtained by heating and foaming them. When the weight of one resin particle is within the range of 0.2 mg to 10 mg, if a deviation in weight between particles is small, the expanded particles are easily produced, a deviation in density of expanded particles obtained is small, and the filling properties of resin expanded particles into the mold or the like are improved.

As methods for obtaining expanded particles from the above resin particles, there can be used a method of performing heating and foaming after a volatile blowing agent in the resin particles fabricated as described above has been impregnated in the resin particles; more specifically, any of the methods described in JP 1974-2183 Examined Patent Publication (Kokoku), JP 1981-1344 Examined Patent Publication (Kokoku), DE 1285722 Unexamined Patent Publication (Kokai), and DE 2107683 Unexamined Patent Publication (Kokai) or the like.

After a blowing agent has been impregnated in resin particles comprising of a core layer and a coat layer, in the case where heating and foaming are carried out, resin particles are put into a pressure vessel which can be closed or released, together with a volatile blowing agent; heating is carried out at or above the softening temperature of a base resin in the core layer, and the volatile blowing agent is impregnated in the resin particles.

Then, after the contents within the vessel are discharged from the closed vessel into a low pressure, and drying is carried out. In this manner, polypropylene resin expanded particles can be obtained.

It is preferable that the above resin composition forming a core layer of polypropylene resin expanded particles of the fourth associated invention have two or more endothermic peaks in a DSC curve obtained by means of differential scanning calorimeter (the DSC curve is obtained when 2 mg to 4 mg of expanded particles are heated from 20° C. to 200° C. at a rate of 10° C. by means of differential scanning calorimeter). This phenomenon arises when a part derived from the resin composition as the above base resin forms an inherent endothermic peak and an endothermic peak at a higher temperature than the former.

The expanded particles of which two or more endothermic peaks appear on the above DSC curve are obtained by controlling the condition when the above composite resin particles are foamed, more specifically, by controlling the temperature, the pressure, and a time and the like when discharging is carried out into a low pressure atmosphere.

In a method of producing expanded particles by discharging the contents of the vessel into a low pressure atmosphere, when a decomposition type blowing agent is kneaded in advance in resin particles comprising of the core layer and coat layer, the blowing agent is added into the pressure vessel, it is possible to obtain the above expanded particles even if no blowing agent is added into a pressure vessel.

As the above mentioned decomposition type blowing agent, any agent can be used as long as it is decomposed at a foaming temperature of resin particles and generates a gas. Specifically, for example, sodium bicarbonate, ammonium carbonate, an azide compound, and an azo compound and the like can be exemplified.

In addition, during heating and foaming, it is preferable that water or alcohol and the like is used as a dispersion medium of resin particles (refer to the first associated invention).

When resin particles are discharged into a low pressure atmosphere, it is preferable to maintain the pressure in the vessel to be by introducing inorganic gas or a volatile blowing agent similar to the above from the outside in order to facilitate the discharging of the beads.

Next, the polypropylene resin expanded particles of the fourth associated invention are molded by using a mold under various conditions (refer to the first associated invention).

Furthermore, a film can be laminated on the above molded article as required (refer to the first associated invention).

The description of the fourth associated invention has now been completed.

[Fifth Associated Invention]

Next, a fifth associated invention is described here.

The fifth associated invention relates to a shock absorber which can be used for a core material or the like for an automobile bumper and a shock-absorbing article having the shock absorber.

At present, as an automobile bumper, there is widely used one comprised of a core material comprising a synthetic resin expanded article and a synthetic resin skin material which covers the core material. In this way, by using a synthetic resin expanded article for a core material, an automobile bumper with its excellent shock absorption properties can be provided.

In general, in a shock absorber such as a core material for an automobile bumper, it is required to meet the following three items at the same time.

(1) Energy absorption performance must be excellent;
(2) Dimensional recovery rate must be excellent; and
(3) Low density and light weight can be achieved.

In order to achieve this object, there have been proposed the art of using polypropylene (refer to Patent Document 7); the art of using an ethylene-propylene copolymer (refer to Patent Document 8); and the art of using a 1-butene-propylene copolymer (refer to Patent Document 9), as a base resin of the core material.

In producing a shock absorber such as a core material for an automobile bumper using a polypropylene resin as a base resin, in general, there is used a so-called bead molding technique in which expanded particles which contain a polypropylene resin as a base resin are charged and heated in a mold and, thereby foaming them, and particles are mutually fused, thereby obtaining a molded article. The polypropylene resin expanded particle molded article obtained by this method is characterized in that it has excellent shock buffering properties or resilience properties, is light in weight, and is small in residual strain.

Thus, a shock absorber composed of a molded article made of polypropylene resin expanded particles has excellent properties as compared with a shock absorber composed of another material resin. However, with respect to rigidity or energy-absorbing efficiency, a satisfactory result has not necessarily been obtained.

In order to solve the above described problem, there is proposed a technique for further using a specific propylene homopolymer as a base resin of a shock absorber such as a core material for a bumper (refer to Patent Document 10).

Expanded particles further containing such a specific propylene homopolymer as a base resin is characterized in that the energy-absorbing efficiency of a shock absorber obtained by bead molding is more excellent than a conventional one.

Patent Document 7

JP 1983-221745 Unexamined Patent Publication (Kokai) (claims)

Patent Document 8

JP 1985-189660 Unexamined Patent Publication (Kokai) (claims)

Patent Document 9

JP 1990-158441 Unexamined Patent Publication (Kokai) (claims)

Patent Document 10

Brochure of International Application Publication WO98/06777 (claims).

However, in the art of using the above specific propylene homopolymer, a high pressure of 3.6 kg/cm$^2$ to 4.0 kg/cm$^2$ (gauge pressure) is required as a steam pressure needed for bead molding. Therefore, there has been a problem that higher cost is required for molding of a shock absorber, and moreover, a molding cycle is extended.

The fifth associated invention has been made in view of such a conventional problem. The object of the fifth associated invention is to provide a shock absorber and a shock-absorbing article which can be produced in accordance with a bead molding technique with a low steam pressure and which indicates good shock absorption properties.

The first aspect of the fifth associated invention is a shock absorber obtained by putting and molding expanded particles in a mold, characterized in that the above expanded particle comprises as a base resin a propylene polymer having the following requirements (a) to (c):

(a) a structural unit derived from propylene is present in 100 to 85 mole %, and a structural unit derived from ethylene and/or alpha-olefin with 4 to 20 carbons is present in 0 to 15 mole %; (the total amount of the structural unit derived from propylene and the structural unit derived from ethylene and/or alpha-olefin with 4 to 20 carbons is 100 mol %);

(b) a content of a position irregularity unit based on 2,1-insertion of a propylene monomer unit in all propylene insertions, which is measured by 13C-NMR, is 0.5% to 2.0%, and a content of a position irregularity unit based on 1,3-insertion of propylene monomer unit in all propylene insertions, which is measured by 13C-NMR, is 0.005% to 0.4%; and (c) in the case where a melting point is defined as Tm [° C.], and where a water vapor transmission rate when made into a film is defined as Y [g/m$^2$/24 hr], Tm and Y meet the following formula (1)

$$(-0.20) \cdot Tm + 35 \leq Y \leq (-0.33) \cdot Tm + 60 \qquad \text{Formula (1) (claim 28).}$$

The shock absorber of the first invention of the fifth associated invention is obtained by molding expanded particles which contains as a base resin a specific propylene polymer having the above requirements (a) to (c).

Thus, the above shock absorber has excellent shock energy-absorbing efficiency and rigidity by utilizing excellent properties which the specific propylene polymer has.

A reason why the energy-absorbing efficiency is improved in the above shock absorber is estimated as follows.

In general, when an impact is applied to a shock absorber, its considered that foams are collapsed while they are compressed, thereby absorbing impact energy. Therefore, it is estimated that in the shock absorber the rate of a portion collapsed by low energy is lowered and the energy absorbed by a shock absorber itself is higher, as the thickness of the wall of foam is uniform.

The shock absorber of the fifth associated invention is obtained by molding expanded particles which contain as a base resin the propylene polymer having the above requirements (a) to (c). Then, the above expanded particles which contains the specific propylene polymer as a base resin is very uniform in foam diameter. Thus, it is considered that, when a shock absorber is molded, expanded particles with their uniform foam diameter are foamed, and are fused with each other to form a uniform foam wall, and excellent energy-absorbing efficiency is exhibited as described above.

On the other hand, in a conventional material, the foam size of the expanded particles obtained by using the material is non-uniform. Even if such expanded particles are molded to produce a shock absorber, a distribution occurs with the thickness of the foam wall, and a thick part and a thin part of the foam wall coexist.

When an impact is applied to such a shock absorber, corruption of foams starts with low energy at the thin portion of the foam wall. As a result, a total amount of energy the shock absorber itself can absorb is lowered.

In addition, the shock absorber of the fifth associated invention is excellent in energy-absorbing efficiency, as described above. Thus, during molding thereof, the molding is performed by increasing expansion ratio, whereby the weight of the shock absorber can be reduced, and the thickness of the shock absorber can be reduced. Then, even if such an attempt is made to reduce the weight of the above shock absorber in this way, sufficient energy-absorbing efficiency can be maintained.

In addition, the above shock absorber is obtained by putting expanded particle which contains as a base resin the specific propylene polymer in a mold and molding them, as described above. Thus, when the above expanded particles are molded by a bead molding technique or the like, for example, the required steam pressure can be lowered. In addition, a time required for cooling in molding can be reduced. That is, an amount of energy required for molding the above shock absorber can be lowered.

In this manner, according to the fifth associated invention, there can be provided a shock absorber which can be produced in accordance with a bead molding technique with a low steam pressure and which exhibits good shock absorption properties.

A second aspect of the fifth associated invention is a shock-absorbing article characterized in that a skin material is provided on a surface of the above shock absorber of the first aspect of the fifth associated invention (claim 36).

The shock-absorbing article of the fifth associated invention is obtained by providing a skin material on a surface of a shock absorber of the fifth associated invention (claim 28) so as to cover the above shock absorber, for example.

Thus, in the above shock-absorbing article, the above shock absorber can absorb shock energy, as described above, and a skin material provided on the surface of the shock absorber can improve the strength of the shock-absorbing article.

The other advantageous effect is identical to that of the first aspect of the fifth associated invention.

In the fifth associated invention, the above expanded particle contains a propylene polymer having the above requirements (a) to (c), as a base resin.

The base resin used here means a substrate resin component constituting the above expanded particle. The above expanded particle is made of the above base resin, other polymer components which is added according to need, and additives such as catalyst neutralizing agent, lubricating agent, nucleating agent, and any other resin additive.

Hereinafter, the above requirement (a) is first described.

The above requirement (a) is that a structural unit derived from propylene is present in 100 mol % to 85 mol %, and a structural unit derived from ethylene and/or alpha-olefin with 4 to 20 carbons is present in 0 mol % to 15 mol %.

Here, the total amount of the structural unit derived from propylene and the structural unit derived from ethylene and/or olefin with 4 to 20 carbons is 100 mol %.

Therefore, the polypropylene polymer meeting the requirement (a) includes that made of a propylene homopolymer (100 mol %) or that made of a copolymer of propylene with ethylene and/or alpha-olefin with 4 to 20 carbons.

As ethylene and/or alpha-olefin with 4 to 20 carbons, of comonomers, which are copolymerized with propylene, there can be specifically exemplified: ethylene, 1-butene, 1-pentene, 1-hexene, 1-octene, or 4-methyl-1-butene and the like.

In addition, in the fifth associated invention, a polypropylene based polymer obtained by employing monomers which has been hardly polymerized by a conventional Ziegler-Natta catalyst, in copolymerizing with propylene, can be employed as the base resin to produce the above expanded particle.

As these monomers, there can be exemplified one or more kinds of cyclic olefin such as cyclopentene, norbornene, 1,4,5,8-dimethano-1,2,3,4,4a,8,8a,5-octahydronaphthalene; linear non-conjugate diene such as 5-methyl-1,4-hexadiene, 7-methyl-1,6-octadiene, 4-ethylidene-8-methyl-1,7-nonadiene; cyclic non-conjugate polyene such as 5-ethylidene-2-norbornene, dicyclopentadiene, 5-vinyl-2-norbornene, and norbornadiene, and an aromatic unsaturated compound such as styrene, or divinylbenzene.

It is required that the propylene polymer for use in the fifth associated invention is, as in the above requirement (a), a propylene (co)polymer resin which contains 85 mol % to 100 mol % of the structural unit derived from the propylene contained in a propylene polymer, and the structural unit derived from ethylene and/or alpha-olefin with 4 to 20 carbons is contained at a content of 0 mol % to 15 mol %.

In the case where the structural unit of propylene and the structural unit of ethylene and/or alpha-olefin as a co-monomer is out of the above range, the mechanical properties of the above base resin such as a bending strength and a tensile strength are significantly lowered. As a result, improvement of the rigidity and energy-absorbing efficiency in a shock absorber is not achieved.

In addition, in the above propylene polymer, in particular, it is preferable that the structural unit derived from propylene is present in 98 mol % to 85 mol %, and that the structural unit derived from ethylene and/or alpha-olefin with 4 to 20 carbons is present in 2 mol % to 15 mol % (the total amount of the structural unit derived from propylene and the structural unit derived from alpha-olefin with 4 to 20 carbons is 100 mol %).

In this case, the above structural unit derived from propylene and the above structural unit derived from ethylene and/or alpha-olefin with 4 to 20 carbons are essential ingredients. In addition, the above expanded particles which contain such a propylene polymer as the above base resin are very uniform in their foam diameter. Thus, the above shock absorber obtained by molding these expanded particles are very uniform in the thickness its foam wall, and is more excellent in energy-absorbing efficiency.

In addition, in the above propylene polymer, the structural unit derived from propylene can be set at 100 mol %.

In this case, the above propylene polymer is a so-called propylene homopolymer. Then, the above shock absorber obtained by using such a propylene polymer is more excellent in its rigidity.

Next, as shown in the above requirement (b), the above propylene polymer is 0.5% to 2.0% at a content of a position irregularity unit based on 2,1-insertion of a propylene monomer unit in all propylene insertions, which is measured by 13C-NMR, and a content of position irregularity unit based on 1,3-insertion of propylene monomer unit is 0.005% to 0.4%.

A propylene polymer containing each of these two kinds of position irregularity units in the above described amount is used as a base resin, whereby there is achieved advantageous effect that the foam diameter of expanded particles obtained therefrom is significantly uniform. Then, the above shock absorber obtained by molding such expanded particles has advantageous effect that it is significantly high in rigidity and energy-absorbing efficiency.

In the case where the above content of position irregularity unit based on 2,1-insertion is lower than 0.5%, or alternatively, in the case where the above content of position irregularity unit based on 1,3-insertion is lower than 0.005%, the advantageous effect that the foam diameter of the above expanded particles are made uniform is reduced. As a result, there is a problem that the rigidity and energy-absorbing efficiency of the shock absorber obtained by molding the above described expanded particles is lowered.

On the other hand, in the case where the above content of position irregularity unit based on 2,1-insertion exceeds 2.0%, or alternatively, in the case where the above content of position irregularity unit based on 1,3-insertion exceeds 0.4%, there is a problem that the mechanical properties such as bending strength or tensile strength of the above propylene polymer are lowered. As a result, there is a problem that the strength of the above expanded particles which contain the above propylene polymer as a base resin and that of the above shock absorber obtained by molding the expanded particles are lowered.

Here, the contents of the structural unit derived from propylene in the above propylene polymer, the content of the structural unit derived from ethylene and/or alpha-olefin with 4 to 20 carbons in the above propylene polymer, and the isotactic triad fraction described later are measured by employing a 13C-NMR technique.

For the 13C-NMR spectrum measurement technique, refer to the above first associated invention.

Further, in the fifth associated invention, the above propylene polymer contains a specific amount of partial structures (I) and (II) in the above chemical formula 2 which includes a position irregularity unit based on 2,1-insertion and 1,3-insertion of propylene (refer to the first associated invention).

The mm fraction in all polymer chains of the propylene polymer according to the fifth associated invention is expressed by the above mathematical formula 1 (refer to the first associated invention).

In addition, a content of 2,1-inserted propylene and a content of 1,3-inserted propylene with respect to all propylene insertions are calculated by the above mathematical formula 2 (refer to the first associated invention).

Next, with respect to requirement (c), a relationship between water vapor transmission rate and a melting point in the case where the propylene polymer has been made into a film is shown.

That is, in the above propylene polymer, in the case where a melting point of the polymer is defined as Tm [° C.] and the water vapor transmission rate when the polymer is molded into a film is defined as Y [g/m²/24 hr], Tm and Y meets the following relational formula (1).

$$(-0.20) \cdot Tm + 35 \leq Y \leq (-0.33) \cdot Tm + 60 \qquad \text{Formula (1)}$$

The above water vapor transmission rate can be measured by JIS K7129 "Testing Method for Water Vapor Transmission Rate of Plastic Film and Sheeting".

In the case where a value Y of water vapor transmission rate of the above propylene polymer is within the above range, the foam diameters in expanded particles become extremely uniform. As a result, the above shock absorber obtained by molding these expanded particles is excellent in rigidity and energy-absorbing efficiency.

In the case where the value Y of water vapor transmission rate is out of the range of formula (1), the non-uniformity of foam diameter in expanded particles increases. As a result, the above shock absorber is lowered in mechanical properties and energy-absorbing efficiency.

Although this reason is not clear, it is estimated that a balance between impregnation and escape of a blowing agent is associated with the uniformity of foam diameter when the blowing agent is impregnated under a warming and pressurization, and is discharged to a low pressure atmosphere, thereby producing expanded particles. Further, it is estimated that this balance becomes suitable in the case of using a propylene polymer such that a melting point (Tm) and water vapor transmission rate (Y) meet a relationship indicated in formula (1).

The propylene polymer meeting the above requirements (a) to (c) can be obtained by using a so-called metallocene catalyst, for example.

In addition, the shock absorber of the fifth associated invention can be obtained to be foamed by charging and heating in a mold the expanded particles which contain as a base resin a propylene polymer having the above requirements (a) to (c).

Next, it is preferable that the above propylene polymer further have the following requirement (d) (claim 29).

(d) the isotactic triad fraction at a propylene unit chain part which has a head-to-tail linkage, which is measured by 13C-NMR, is 97% or more.

That is, as the propylene polymer for the base resin, in addition to the requirements (a) to (c) which have been already described, there is used a polymer in which the isotactic triad fraction measured by 13C-NMR (nuclear magnetic resonance) technique, of a propylene unit contiguous chain part having a head-to-tail linkage (that is, a rate of the three propylene unit in which each of arbitrary propylene unit 3 contiguous chains in polymer chains is linked in a heat-to-tail manner and the directions of methyl branch in propylene unit are identical) is 97% or more.

In this case, the uniformity of foam size in the above expanded particle is further improved. Thus, the above shock absorber is improved in energy-absorbing efficiency.

Hereinafter, the isotactic triad fraction is properly described as an mm fraction. In the case where the mm fraction is less than 97%, mechanical properties of the above propylene polymer is lowered. Thus, there is a possibility that the mechanical properties and shock absorption properties of the above shock absorber are lowered. Further preferably, the above mm fraction is 98% or more.

Next, it is preferable that the above propylene polymer further have the following requirement (e) (claim 30).

(e) the melt flow rate is 0.5 g to 100 g/10 minutes.

In this case, the above expanded particles used to obtain the above shock absorber can be produced while industrially useful production efficiency is maintained. Further, the physical properties and shock absorption properties of the above shock absorber can be improved.

In the case where the above melt flow rate (MFR) is lower than 0.5 g per 10 minutes, there is a possibility that the production efficiency of the above expanded particles, in particular, the productivity under the melting and kneading process described later is lowered. On the other hand, in the case where the MFR exceeds 100 g/10 minutes, there is a possibility that physical properties such as a compression strength and a tensile strength and energy-absorbing efficiency of the above shock absorber are lowered. Thus, it is more preferred that the above MFR be 1.0 g to 50 g/10 minutes. Further preferably, the rate should be 1.0 g to 30 g/10 minutes.

Next, it is preferable that the above expanded particles be foamed by using a blowing agent which meets the following requirement (f) (claim 31).

(f) in the case where the critical temperature of the above blowing agent is defined as Tc [° C.], Tc meets the following formula (2).

$$-90° C. \leq Tc \leq 400° C. \qquad \text{Formula (2)}$$

In this case, there is a tendency that the foam diameter of the above expanded particles is more uniform. As a result, the physical properties of the shock absorber obtained by using such expanded particles are improved.

In the case where Tc is lower than −90° C., the no-uniformity of foam diameter of the expanded particles obtained is significant. Although the reason is not clear, it is estimated that such non-uniformity is caused by sudden foaming.

On the other hand, in the case of where Tc is higher than 400° C., there is a possibility that it becomes very difficult to obtain an expanded particle with high magnificence, for example, 0.1 g/cm³ or less of density.

For a specific example of the above blowing agent, refer to the first associated invention.

In addition among the blowing agents meeting the above formula (2), in the case where the following formula (3) is met, there is an advantage that no special facility or equipment is required for handling these blowing agents.

$$0° C. \leq Tc \leq 300° C. \qquad \text{Formula (3)}$$

Further, in the case where the following formula (4) is met, there is advantageous effect that the foam diameter of the expanded particles obtained becomes very uniform in addition to the industrial effectiveness described previous section.

$$30° C. \leq Tc \leq 200° C. \qquad \text{Formula (4)}$$

Thus, there is advantageous effect that the above shock absorber obtained by using such expanded particles is more excellent in shock absorption properties.

The above blowing agents may be used alone, or in combination of the two or more.

In the fifth associated invention, other polymer components or additives can be mixed with the above propylene polymer (base resin) without departing from the advantageous effect of the fifth associated invention.

For the above other polymer components and additives, refer to the first associated invention.

Although mixing of the other polymer components or additives with the above base resin can be carried out where the resin is in a fluid state or solid state, in general, melting and kneading is used. That is, for example, the above base resins and the other components or the like are kneaded at a desired temperature by using a variety of kneading machines such as a roll, a screw, a Banbury mixer, a kneader, a blender, or a mill, and the like. After kneading, the product is granulated into an appropriate size of resin particles suitable for production of expanded particles.

The above resin particles can be obtained by a method of performing melting and kneading in an extruder, followed by extruding in a strand a kneaded material from a die having small holes mounted at the tip end of the extruder, and then, cutting the material to a specified weight or size by a cutting machine.

In general, there is no problem with production of expanded particles when the weight of one resin particle is 0.1 mg to 20 mg. When the weight of one resin particle is within the range of 0.2 mg to 10 mg, and further when a dispersion in weight between particles is small, the expanded particles are easily produced, the density distribution of expanded particles obtained is small, and the filling properties of the expanded particles into the mold or the like are improved.

As methods for obtaining expanded particles from the above resin particles, there can be used a method of heating and foaming after impregnating volatile blowing agent in the resin particles fabricated as described above, specifically, for example, methods described in JP 1974-2183 Examined Patent Publication (Kokoku), JP 1981-1344 Examined Patent Publication (Kokoku), DE 1285722 Unexamined Patent Publication (Kokai), and DE 2107683 Unexamined Patent Publication (Kokai) or the like.

That is, resin particles are put in a pressure vessel which can be closed and released together with an volatile blowing agent. Then, heating is performed at a temperature equal to or greater than a softening temperature of the base resin, and the volatile blowing agent is impregnated in the resin particles. Then, the content within the closed vessel is released from the vessel to a low pressure atmosphere, and thus, drying treatment is performed, whereby expanded particles can be obtained.

In the above described method, if decomposition type blowing agent is kneaded in advance in resin particles, even if a blowing agent is not fed in a pressure vessel, it is possible to obtain the above expanded particles.

As the above decomposition type blowing agent, any agent can be used when it is decomposed at a foaming temperature of resin particles and generates gas. Specifically, for example, there can be exemplified sodium bicarbonate, ammonium carbonate, an azide compound, or an azo compound and the like.

In addition, during heating and foaming, it is preferable that water, alcohol or the like be used as a dispersion medium of resin particles (refer to the first associated invention).

When resin particles are released to a low pressure atmosphere, in order to facilitate the release, it is preferable to constantly maintain the internal pressure of the closed vessel by introducing an inorganic gas or a volatile blowing agent which is similar to the above from the outside to the closed vessel.

Next, it is preferable that the above shock absorber have a crystalline structure in which a peak inherent to the base resin and a peak at higher temperature than that of the inherent peak appear as endothermic peaks on a first DSC curve obtained when 2 mg to 4 mg of test specimens cut out from the above shock absorber are heated up to 220° C. at a rate of 10° C./minute by means of a differential scanning calorimeter (claim 32).

This phenomenon means that the above shock absorber forms an inherent endothermic peak and an endothermic peak at a higher temperature than the former on the above DSC curve.

In this case, there can be provided advantageous effect that the rigidity of the shock absorber is improved.

As described above, a shock absorber where an inherent peak and a high temperature peak appears on a DSC curve can be obtained by fabricating in advance expanded particles where the inherent peak and the high temperature peak appear on the above DSC curve, and then, molding the expanded particles by a molding method or the like described later.

In addition, as described above, expanded particles where an inherent peak and a high temperature peak appear on the DSC curve can be obtained by controlling a condition for foaming the above resin particles, specifically a temperature, a pressure, a time and the like for releasing the particles into a low pressure atmosphere.

When the above shock absorber is fabricated by molding the above expanded particles, the molds which can form with various conditions can be used (refer to the first associated invention).

In addition, it is preferable that the density of the above shock absorber be 0.02 g/cm³ to 0.45 g/cm³ (claim 33).

In this case, sufficient energy absorption performance and light weight performance can be compatible with each other.

In the case where the density of the above shock absorber is lower than 0.02 g/cm³, there is a possibility that the energy absorption performance becomes insufficient.

On the other hand, in the case where the density exceeds 0.45 g/cm³, there is a possibility that light weight performance which is an excellent feature of the expanded article is not sufficiently attained.

In addition, the above shock absorber can be used as a core material for an automobile bumper or a core material for automobile's interior articles and the like. Here, as the automobile's interior articles, there can be exemplified, for example, a dashboard, a console box, an instrument panel, a door panel, a door trim, a ceiling material, an interior article of a pillar part, a sun visor, armrest, headrest and the like.

In addition, it is preferable that the above shock absorber have on its surface a skin layer with a density which is higher than the inside thereof (claim 34).

In this case, the strength of the above shock absorber can be improved more remarkably. Thus, the above shock absorber can be used as is, for an automobile's bumper or an automobile's interior articles and the like.

The above skin layer can be integrally formed when the above expanded particles are molded in a mold, thereby fabricating a shock absorber.

For example, the above skin layer can be formed by partially fusing the above expanded particles by a heat at a portion which comes into contact with a wall of the mold when the above expanded particles are molded. Therefore, a component of the above skin layer is identical to that of the above expanded particles.

In addition, it is preferable that the above shock absorber be a core material for an automobile's bumper (claim 35).

In this case, the excellent shock absorption properties of the above shock absorber can be used with the maximum efficiency.

Next, in the above second aspect of the fifth associated invention (claim 36), as the above skin material, for example, there are exemplified: an elastomeric polyolefin sheet; a polystyrene resin film such as OPS (bi-axially oriented polystyrene sheet), heat resistant OPS, or HIPS film; a polypropylene resin film such as CPP (non-oriented polypropylene film) or OPP (bi-axially oriented polypropylene film), or a polyethylene resin film; a variety of films such as a polyester film; and a variety of skin materials such as a felt or non-woven cloth.

As the above described shock-absorbing article, for example, an automobile's bumper, an automobile interior articles and the like are exemplified. As the automobile's interior articles, for example, there are exemplified, for example, a dashboard, a console box, an instrument panel, a door panel, a door trim, a ceiling material, an interior article of a pillar part, a sun visor, armrest, headrest and the like.

In addition, it is preferable that the above shock-absorbing article be an automobile's bumper (claim 37).

In this case, the excellent shock absorption properties and strength of the above shock-absorbing article can be used with the maximum efficiency.

The description of the fifth associated invention has now been completed.

[Sixth Associated Invention]

Next, a sixth associated invention is described here.

The sixth associated invention relates to a shock absorber which can be used for a core material or the like for an automobile bumper and a shock-absorbing article having the shock absorber.

For the prior art, refer to the fifth associated invention.

The sixth associated invention has been made in view of such a conventional problem. The object of the sixth associated invention is to provide a shock absorber and a shock-absorbing article which can be produced in accordance with a bead molding technique with a low steam pressure and which indicates good shock absorption properties.

The sixth associated invention is a shock absorber obtained by putting and molding expanded particles in a mold, characterized in that, in the above expanded particle, a resin which comprises a resin composition containing 5% by weight to 95% by weight of the following propylene polymer [A] as a base resin and 95% by weight to 5% by weight of the following propylene polymer [B] (the total amount of a propylene polymer [A] and a propylene polymer [B] is 100% by weight) is used as a base resin, and wherein a propylene polymer [A] has the following requirements (a) to (c):

(a) a structural unit derived from propylene is present in 100 to 85 mole %, and a structural unit derived from ethylene and/or alpha-olefin with 4 to 20 carbons is present in 0 to 15 mole %; (the total amount of the structural unit derived from propylene and the structural unit derived from ethylene and/or alpha-olefin with 4 to 20 carbons is 100 mol %);

(b) a content of a position irregularity unit based on 2,1-insertion of a propylene monomer unit in all propylene insertions, which is measured by 13C-NMR, is 0.5% to 2.0%, and a content of a position irregularity unit based on 1,3-insertion of propylene monomer unit in all propylene insertions, which is measured by 13C-NMR, is 0.005% to 0.4%; and (c) in the case where a melting point is defined as Tm [° C.], and where a water vapor transmission rate when made into a film is defined as Y [g/m²/24 hr], Tm and Y meet the following formula (1)

$$(-0.20) \cdot Tm + 35 \leq Y \leq (-0.33) \cdot Tm + 60 \qquad \text{Formula (1); and}$$

a propylene polymer [B] has only (a) of the above requirements (a) to (c) (claim 38).

The shock absorber of the sixth associated invention is obtained by molding the above specific expanded particle, and the expanded particle is obtained by using as the above base resin the resin composition which contains: the propylene polymer [A] having the above requirements (a) to (c); and the propylene polymer [B] having only (a) of the requirements (a) to (c).

Thus, the above shock absorber is excellent in shock energy-absorbing efficiency and rigidity by utilizing an excellent feature which the above resin composition has.

A reason why the energy-absorbing efficiency is improved in the above shock absorber is estimated as follows.

In general, when an impact is applied to a shock absorber, it is considered that foams are collapsed while it is compressed, thereby absorbing impact energy. Therefore, it is estimated that in the shock absorber the rate of a portion collapsed by low energy is lowered and energy absorbed by a shock absorber itself is higher, as the thickness of the wall of foam is uniform.

The shock absorber of the sixth associated invention is obtained by molding an expanded particle obtained by using the above specific resin composition as a base resin. In addition, the above expanded particles which contain the above specific resin composition as a base resin are very uniform in foam diameter.

Thus, when the above shock absorber is molded, it is considered that the expanded particles with their uniform foam diameter are foamed and fused with each other, thereby forming a uniform foam wall, and excellent energy-absorbing efficiency is exhibited as described above.

On the other hand, in a conventional material, the foam diameters of the expanded particles obtained by using the material are non-uniform. Even if such expanded particles are molded to produce a shock absorber, a distribution occurs with the thickness of the foam wall, and a thick part and a thin part of the foam wall coexist.

When an impact is applied to such a shock absorber, corruption of foam starts with low energy at the thin portion of the foam wall. As a result, a total amount of energy the shock absorber itself can absorb is lowered.

In addition, the shock absorber of the sixth associated invention is excellent in energy-absorbing efficiency, as described above. Thus, during molding thereof, the molding is performed by increasing expansion ratio, whereby the weight of the shock absorber can be reduced, and the thickness of the shock absorber can be reduced. Then, even if such an attempt to reduce the weight of the above shock absorber is made in this way, sufficient energy-absorbing efficiency can be maintained.

In addition, the above shock absorber is obtained by putting expanded particles which contains as a base resin the specific resin composition in a mold and molding them, as described above. Thus, when the above expanded particles are molded by a bead molding technique or the like, for example, the required steam pressure can be lowered. In addition, a time required for cooling in molding can be reduced. That is, an amount of energy required for molding the above shock absorber can be lowered.

In this manner, according to the sixth associated invention, there can be provided a shock absorber which can be produced in accordance with a bead molding technique with a low steam pressure and which exhibits good shock absorption properties.

A second aspect of the sixth associated invention is a shock-absorbing article characterized in that a skin material is provided on a surface of the shock absorber of the first aspect of the sixth associated invention (claim 47).

The shock-absorbing article of the second aspect of the sixth associated invention is obtained by providing a skin material on a surface of a shock absorber of the first aspect of the sixth associated invention (claim 38) so as to cover the shock absorber, for example.

Thus, in the above shock-absorbing article, the above shock absorber can absorb shock energy, as described above, and a skin material provided on the surface of the shock absorber can improve the strength of the shock-absorbing article.

The other advantageous effect is identical to that of the first aspect of the sixth associated invention.

In the sixth associated invention, the above shock absorber is obtained by molding the above expanded particles, and the expanded particle contains as a base resin a resin composition which contains the above propylene polymer [A] and propylene polymer [B].

The base resin used here means a substrate resin component constituting the above expanded particle. The above expanded particle is made of the above base resin, other polymer components which is added according to need, and additives such as catalyst neutralizing agent, lubricating agent, nucleating agent, and any other resin additive.

In addition, the above resin composition, as described above, contains 5% by weight to 95% by weight of the above propylene polymer [A] and 95% by weight to 5% by weight of the above propylene polymer [B] (the total amount of the propylene polymer [A] and the propylene polymer [B] is 100% by weight).

In the case where the content of the propylene polymer [A] is lower than 5% by weight or in the case where the content of the propylene polymer [B] exceeds 95% by weight, there is a problem that a distribution of foam diameter of the above expanded particles becomes wide, and energy-absorbing efficiency of the shock absorber is lowered. In this case, a high molding steam pressure is required to obtain a shock absorber having a sufficient degree of fusion. Thus, there is a problem that the molding time is extended, and the molding cost is increased.

On the other hand, in the case where the content of the propylene polymer [A] exceeds 95% by weight or in the case where the content of the propylene polymer [B] is lower than 5% by weight, there is a problem that energy-absorbing efficiency of the shock absorber is lowered.

First, the above propylene polymer [A] is described hereinafter.

The propylene polymer [A] is a propylene polymer having the above requirements (a) to (c).

The above requirement (a) is that a structural unit derived from propylene is present in 100 mol % to 85 mol %, and a structural unit derived from ethylene and/or alpha-olefin with 4 to 20 carbons is present in 0 mol % to 15 mol %.

Here, the total amount of the structural unit derived from propylene and the structural unit derived from ethylene and/or olefin with 4 to 20 carbons is 100 mol %. Therefore, the polypropylene polymer meeting the requirement (a) includes that made of a propylene homopolymer (100 mol %) or that made of a copolymer of propylene with ethylene and/or alpha-olefin with 4 to 20 carbons.

As ethylene and/or alpha-olefin with 4 to 20 carbons, of comonomers, which are copolymerized with propylene, there can be specifically exemplified: ethylene, 1-butene, 1-pentene, 1-hexene, 1-octene, or 4-methyl-1-butene and the like.

In addition, in the sixth associated invention, a polypropylene polymer obtained by employing monomers which has been hardly polymerized by a conventional Ziegler-Natta catalyst for co-polymerization with propylene can also be used as the above propylene polymer [A].

As these monomers, there can be exemplified one or more kinds of cyclic olefin such as cyclopentene, norbornene, 1,4,5,8-dimetano-1,2,3,4,4a,8,8a,5-octahydronaphthalene; linear non-conjugate diene such as 5-methyl-1,4-hexadiene, 7-methyl-1,6-octadiene, 4-ethylidene-8-methyl-1,7-nonadiene; cyclic non-conjugated polyene such as 5-ethylidene-2-norbornene, dicyclopentadiene, 5-vinyl-2-norbornene, and norbornadiene, and an aromatic unsaturated compound such as styrene, or divinylbenzene.

As in the above requirement (a), it is required that the propylene polymer [A] is a propylene (co-)polymer resin containing 85 mol % to 100 mol % of the structural unit derived from propylene contained in a propylene polymer, and the structural unit derived from ethylene and/or alpha-olefin with 4 to 20 carbons is contained at a content of 0 mol % to 15 mol %.

In the case where the structural unit of propylene and the structural unit of ethylene and/or alpha-olefin as a co-monomer is out of the above range, the mechanical properties of the above base resin such as a bending strength and a tensile strength are significantly lowered. As a result, improvement of the rigidity and energy-absorbing efficiency in a shock absorber is not achieved.

In addition, in the propylene polymer [A], in particular, it is preferable that the structural unit derived from propylene is present in 98 mol % to 85 mol %, and that the structural unit derived from ethylene and/or alpha-olefin with 4 to 20 carbons is present in 2 mol % to 15 mol % (the total amount of the structural unit derived from propylene and the structural unit derived from alpha-olefin with 4 to 20 carbons is 100 mol %).

In this case, the above structural unit derived from propylene and the above structural unit derived from ethylene and/or alpha-olefin with 4 to 20 carbons are essential ingredients. In addition, the above expanded particles which contain such a propylene polymer [A] as the above base resin are very uniform in their foam diameter. Thus, the above shock absorber obtained by molding these expanded particles are very uniform in the thickness its foam wall, and is more excellent in energy-absorbing efficiency.

In addition, in the above propylene polymer [A], the structural unit derived from propylene can be set at 100 mol %.

In this case, the above propylene polymer [A] is so-called propylene homopolymer. Then, the above shock absorber obtained by using such a propylene polymer [A] is more excellent in its rigidity.

Next, as shown in the above requirement (b), the above propylene polymer [A] is 0.5% to 2.0% at a content of position irregularity unit based on 2,1-insertion of a propylene monomer unit in all propylene insertions, which is measured by 13C-NMR, and a content of position irregularity unit based on 1,3-insertion of propylene monomer unit is 0.005% to 0.4%.

This requirement (b) relates to a content of a position irregularity unit of a propylene polymer. Such an irregularity unit has an effect that crystalline properties of the propylene polymer is lowered, and exhibits advantageous effect that foaming properties are improved.

A propylene polymer [A] containing each of these two kinds of position irregularity units in the above described amount is used as one component of abase resin, whereby there is achieved advantageous effect that the foam diameter of expanded particles obtained therefrom is significantly uniform. Then, the above shock absorber obtained by molding such expanded particles has advantageous effect that it is significantly high in rigidity and energy-absorbing efficiency.

In the case where the above content of position irregularity unit based on 2,1-insertion is lower than 0.5%, or alternatively, in the case where the above content of position irregularity unit based on 1,3-insertion is lower than 0.005%, the advantageous effect that the foam diameter of the above expanded particles are made uniform is reduced. As a result, there is a problem that the rigidity and energy-absorbing efficiency of the shock absorber obtained by molding the above described expanded particles is lowered.

On the other hand, in the case where the above content of position irregularity unit based on 2,1-insertion exceeds 2.0%, or alternatively, in the case where the above content of position irregularity unit based on 1,3-insertion exceeds 0.4%, there is a problem that the mechanical properties such as bending strength or tensile strength of the above propylene polymer are lowered. As a result, there is a problem that the strength of the above expanded particles which contain the above propylene polymer as a base resin and that of the above shock absorber obtained by molding the expanded particles are lowered.

Here, the contents of the structural unit derived from propylene in the above propylene polymer, the content of the structural unit derived from ethylene and/or alpha-olefin with 4 to 20 carbons in the above propylene polymer, and the isotactic triad fraction described later are measured by employing a 13C-NMR technique.

For 13C-NMR spectrum measurement technique, refer to the above first associated invention.

Further, in the sixth associated invention, the above propylene polymer [A] contains a specific amount of partial structures (I) and (II) in the above the above chemical formula 2 which includes a position irregularity unit based on 2,1-insertion and 1,3-insertion of propylene (refer to the first associated invention).

The mm fraction in all polymer chains of the propylene polymer [A] according to the sixth associated invention is expressed by the above mathematical formula 1 (refer to the first associated invention).

In addition, a content of 2,1-inserted propylene and a content of 1,3-inserted propylene with respect to all propylene insertions are calculated by the above mathematical formula 2 (refer to the first associated invention).

Next, with respect to requirement (c), a relationship between water vapor transmission rate and a melting point in the case where the above propylene polymer [A] has been defined as a film is shown.

That is, in the above propylene polymer [A], in the case where a melting point of the polymer is defined as Tm [° C.] and the water vapor transmission rate when the polymer is molded into a film is defined as Y [g/m$^2$/24 hr], Tm and Y meets the following relational formula (1).

$$(-0.20) \cdot Tm + 35 \leq Y \leq (-0.33) \cdot Tm + 60 \qquad \text{Formula (1)}$$

The above water vapor transmission rate can be measured by JIS K7129 "Testing Method for Water Vapor Transmission Rate of Plastic Film and Sheeting".

In the case where a value Y of water vapor transmission rate is within the above range, the foam diameters in expanded particles become extremely uniform. As a result, the above shock absorber obtained by molding these expanded particles is excellent in rigidity and energy-absorbing efficiency.

In the case where the value Y of water vapor transmission rate is out of the range of formula (1), the non-uniformity of foam diameter in expanded particles increases. As a result, the above shock absorber is lowered in mechanical properties and energy-absorbing efficiency.

Although this reason is not clear, it is estimated that a balance between impregnation and escape of a blowing agent is associated with the uniformity of foam diameter when the blowing agent is impregnated under a warming and pressurization, and the resin particles are discharged to a low pressure atmosphere, thereby producing expanded particles. Further, it is estimated that this balance becomes suitable in the case of using a resin composition as a base resin containing a propylene polymer such that a melting point (Tm) and water vapor transmission rate (Y) meet a relationship indicated in formula (1).

The above propylene polymer [A] can be obtained by using a so-called metallocene catalyst, for example.

Next, the above propylene polymer [B] is described here.

The above propylene polymer [B] is a propylene polymer having only (a) of the above requirements (a) to (c). That is, the above propylene polymer [B] meets the requirement (a) that the structural unit derived from propylene exists to be 100 mol % to 85 mol % and the structural unit derived from ethylene and/or alpha-olefin with 4 to 20 carbons exists to be 0 mol % to 15 mol %, and fails to meet any of the above requirements (b) and (c).

The above requirement (a) is same as the requirement [a] of the above propylene polymer [A].

In the above sixth associated invention, the above shock absorber can be obtained by charging and heating in a mold the expanded particles which contain as a base resin a resin composition containing the propylene polymer [A] and the propylene polymer [B].

Next, it is preferable that the above propylene polymer [A] further has the following requirement (d) (claim 39).

(d) the isotactic triad fraction at a propylene unit chain part which has a head-to-tail linkage, which is measured by 13C-NMR, is 97% or more.

That is, as the propylene polymer [A], in addition to the requirements (a) to (c) which have been already described, there is used a polymer in which the isotactic triad fraction measured by 13C-NMR (nuclear magnetic resonance technique), of a propylene unit contiguous chain part having a head-to-tail linkage (that is, a rate of three propylene unit in which each of arbitrary propylene unit in polymer chains is linked in a heat-to-tail manner and the directions of methyl branch in propylene unit are identical) is 97% or more.

In this case, the uniformity of foam size in the above expanded particle is further improved. Thus, the above shock absorber is improved in energy-absorbing efficiency.

Hereinafter, the isotactic triad fraction is described as an mm fraction. In the case where the mm fraction is less than 97%, mechanical properties of the resin composition as the above base resin is lowered. Thus, there is a possibility that the mechanical properties and shock absorption properties of the above shock absorber are lowered. Further preferably, the above mm fraction is 98% or more.

Next, it is preferable that the above propylene polymer [A] further have the following requirement (e). (claim 40).

(e) the melt flow rate is 0.5 g to 100 g/10 minutes.

In this case, the above expanded particles used to obtain the above shock absorber can be produced while industrially useful production efficiency is maintained. Further, the physical properties and shock absorption properties of the above shock absorber can be improved.

In the case where the above melt flow rate (MFR) is lower than 0.5 g per 10 minutes, there is a possibility that the production efficiency of the above expanded particles, in particular, the productivity under the melting and kneading process described later is lowered. On the other hand, in the case where the MFR exceeds 100 g/10 minutes, there is a possibility that physical properties such as a compression strength and a tensile strength; and energy-absorbing efficiency of the above shock absorber are lowered. Thus, it is more preferred that the above MFR be 1.0 g to 50 g/10 minutes. Further preferably, the rate should be 1.0 g to 30 g/10 minutes.

Next, it is preferable that the above expanded particles be foamed by using a blowing agent which meets the following requirement (f) (claim 41).

(f) in the case where the critical temperature of the above blowing agent is defined as Tc [° C.], Tc meets the following formula (2).

$$-90°C. \leq Tc \leq 400° C. \qquad \text{Formula (2)}$$

In this case, there is a tendency that the foam diameter of the above expanded particles is more uniform. As a result, the physical properties of the shock absorber obtained by using such expanded particles are improved.

In the case where Tc is lower than −90° C., the no-uniformity of foam diameter of the above expanded particles is significant. Although the reason is not clear, it is estimated that such non-uniformity is caused by sudden foaming.

On the other hand, in the case of where Tc is higher than 400° C., there is a possibility that it becomes very difficult to obtain an expanded particle with high expansion ratio, for example, 0.1 g/cm³ or less of density.

For a specific example of the above blowing agent, refer to the first associated invention.

In addition among the blowing agents meeting the above formula (2), in the case where the following formula (3) is met, there is an advantage that no special facility or equipment is required for handling these blowing agents.

$$0° C. \leq Tc \leq 300° C. \qquad \text{Formula (3)}$$

Further, in the case where the following formula (4) is met, there is advantageous effect that the foam diameter of the expanded particles obtained becomes very uniform in addition to the industrial effectiveness described previous section.

$$30° C. \leq Tc \leq 200° C. \qquad \text{Formula (4)}$$

Thus, there is advantageous effect that the above shock absorber obtained by using such expanded particles is more excellent in shock absorption properties.

The above blowing agents may be used alone, or in combination of the two or more.

In the sixth associated invention, other polymer components or additives can be mixed with the above propylene composition containing the propylene polymer [A] and the propylene polymer [B] without departing from the advantageous effect of the sixth associated invention.

For the above other polymer components and additives, refer to the first associated invention.

Although mixing of the above propylene polymer [A] with the above propylene polymer [B] or mixing of the other polymer components or additives with the above base resin can be carried out where the resin is in a fluid state or solid state, in general, melting and kneading is used. That is, for example, the above base resins and the other components or the like are kneaded at a desired temperature by using a variety of kneading machines such as a roll, a screw, a Banbury mixer, a kneader, a blender, or a mill, and the like. After kneading, the product is granulated into an appropriate size of resin particles suitable for production of expanded particles.

Resin particles can be obtained by a method of performing melting and kneading in an extruder, followed by extruding in a strand a kneaded material from a die having a minutely small holes mounted at the tip end of the extruder, and then, cutting the material to a specified weight or size by a cutting machine.

In general, there is no problem with production of expanded particles when the weight of one resin particle is 0.1 mg to 20 mg. When the weight of one resin particle is within the range of 0.2 mg to 10 mg, and further when a dispersion in weight between particles is small, the expanded particles are easily produced, the density distribution of expanded particles obtained is small, and the filling properties of the expanded particles into the mold or the like are improved.

As methods for obtaining expanded particles from the above resin particles, there can be used a method of heating and foaming after impregnating volatile blowing agent in the resin particles fabricated as described above, specifically, for example, methods described in JP 1974-2183 Examined Patent Publication (Kokoku), JP 1981-1344 Examined Patent Publication (Kokoku), DE 1285722 Unexamined Patent Publication (Kokai), and DE 2107683 Unexamined Patent Publication (Kokai) or the like.

That is, resin particles are put in a pressure vessel which can be closed and released together with a volatile blowing agent. Then, heating is performed at a temperature equal to or above the softening temperature of the base resin, and the volatile blowing agent is impregnated in the resin particles. Then, the content within the closed vessel is released from the vessel to a low pressure atmosphere, and thus, drying treatment is performed, whereby expanded particles can be obtained.

In the above described method, if decomposition type blowing agent is kneaded in advance in resin particles, even if a blowing agent is not fed in a pressure vessel, it is possible to obtain the above expanded particles.

As the above decomposition type blowing agent, any agent can be used when it is decomposed at a foaming temperature of resin particles and generates gas. Specifically, for example, there can be exemplified sodium bicarbonate, ammonium carbonate, an azide compound, or an azo compound and the like.

In addition, during heating foaming, it is preferable that water, alcohol or the like be used as a dispersion medium of resin particles (refer to the first associated invention).

When resin particles are released to a low pressure atmosphere, in order to facilitate the release, it is preferable to constantly maintain the internal pressure of the closed vessel by introducing an inorganic gas or a volatile blowing agent which is similar to the above from the outside to the closed vessel.

Next, it is preferable that the above shock absorber have a crystalline structure in which a peak inherent to the base resin and a peak at higher temperature than that of the inherent peak appear as endothermic peaks on a first DSC curve obtained when 2 mg to 4 mg of test specimens cut out from the above shock absorber are heated up to 220° C. at a rate of 10° C./minute by means of a differential scanning calorimeter. (claim 42).

This phenomenon means that the above shock absorber forms an inherent endothermic peak and an endothermic peak at a higher temperature than the former on the above DSC curve.

In this case, there can be provided advantageous effect that the rigidity and the shock absorption performance of the shock absorber are improved as compared with the shock absorber in which no high temperature endothermic peak exists.

As described above, a shock absorber where an inherent peak and a high temperature peak appears on a DSC curve can be obtained by fabricating in advance expanded particles where the inherent peak and the high temperature peak appear on the above DSC curve, and then, molding the expanded particles by a molding method or the like described later.

In addition, as described above, expanded particles where an inherent peak and a high temperature peak appear on the DSC curve can be obtained by controlling a condition for foaming the above resin particles, specifically a temperature, a pressure, a time and the like for releasing the particles in to a low pressure atmosphere.

Next, it is preferable that the above inherent peak is substantially single (claim 43).

This means that the propylene polymer [A] and the propylene polymer [B] are dissolved each other, and indicates that the uniformity of the resin composition is high. In this case, energy-absorbing efficiency of the above shock absorber can be improved more remarkably.

Next, when the above shock absorber is fabricated by molding the above expanded particles, the molds which conform with various conditions can be used (refer to the first associated invention).

In addition, it is preferable that the density of the above shock absorber is 0.02 g/cm$^3$ to 0.45 g/cm$^3$ (claim 44).

In this case, sufficient energy absorption performance and light weight performance can be compatible with each other.

In the case where the density of the above shock absorber is lower than 0.02 g/cm$^3$, there is a possibility that the energy absorption performance becomes insufficient.

On the other hand, in the case where the density exceeds 0.45 g/cm$^3$, there is a possibility that light weight performance which is an excellent feature of the expanded article is not sufficiently attained.

In addition, the above shock absorber can be used as a core material for an automobile bumper or a core material for automobile's interior articles and the like. Here, as the automobile's interior articles, there can be exemplified, for example, a dashboard, a console box, an instrument panel, a door panel, a door trim, a ceiling material, an interior article of a pillar part, a sun visor, armrest, headrest and the like.

In addition, it is preferable that the above shock absorber have on its surface a skin layer with a density which is higher than the inside thereof (claim 45).

In this case, the strength of the above shock absorber can be improved more remarkably. Thus, the above shock absorber can be used as is, for an automobile's bumper or an automobile's interior articles and the like.

The above skin layer can be integrally formed when the above expanded particles are molded in a mold, thereby fabricating a shock absorber.

For example, the above skin layer can be formed by partially fusing the above expanded particles by a heat at a portion which comes into contact with a wall of the mold when the above expanded particles are molded. Therefore, a component of the above skin layer is identical to that of the above expanded particles.

In addition, it is preferable that the above shock absorber be a core material for an automobile's bumper (claim 46).

In this case, the excellent shock absorption properties of the above shock absorber can be used with the maximum efficiency.

Next, in the above second aspect of the sixth associated invention (claim 47), as the above skin material, for example, there are exemplified: an elastomeric polyolefin sheet; a polystyrene resin film such as OPS (bi-axially oriented polystyrene sheet), heat resistant OPS, or HIPS film; a polypropylene resin film such as CPP (non-oriented polypropylene film) or OPP (bi-axially oriented polypropylene film), or a polyethylene resin film; a variety of films such as a polyester film; and a variety of skin materials such as a felt or non-woven cloth.

As the above described shock-absorbing article, for example, an automobile's bumper, an automobile interior articles and the like are exemplified. As the automobile's interior articles, for example, there are exemplified, for example, a dashboard, a console box, an instrument panel, a door panel, a door trim, a ceiling material, an interior article of a pillar part, a sun visor, armrest, headrest and the like.

In addition, it is preferable that the above shock-absorbing article be an automobile's bumper (claim 48).

In this case, the excellent shock absorption properties and strength which the above shock-absorbing article has can be used with the maximum efficiency.

The description of the sixth associated invention has now been completed.

[Seventh Associated Invention]

Now, the seventh associated invention is described below.

The seventh associated invention relates to a polypropylene resin molded article used for a heat insulation material, a cushioning packaging material, a transport box, bumper core material for automobiles, and an automobile part or the like.

An expanded molded article based on a polypropylene resin is excellent in chemical resistance, heat resistance, and strain recovery after compression, as compared with an expanded molded article of a polystyrene resin. This expanded molded article is widely used: for a cushioning packaging material and a transport box; for automobile's members such as automobile bumper core materials, pillar, platform, and side impact material; for transportation molded articles such as a pellet material and a tool box. In addition, the polypropylene resin expanded molded article is excellent in heat resistance and compression strength, as compared with an expanded molded article based on a polyethylene resin.

Thus, the polypropylene resin expanded molded article is, in particular, used for a member requiring use under a high temperature or strength.

Among a variety of the above described applications, in particular, in a use as a heat insulation material or structural part, it is required that a water vapor transmission characteristic is low in addition to the fact that heat resistance and compression strength are high.

In order to achieve this object, for example, there is proposed a technique for fusing a film which has moisture-proofness on a surface of a molded article (refer to Patent Document 11).

Patent Document 11
JP 1988-212543 Unexamined Patent Publication (Kokai) (claims).

However, in the above technique of using a film having moisture-proof properties, an additional process for fusing the above film is required, and thus, there has been a problem that higher cost occurs. Further, because of the presence of the above film per se, the damage resistance properties of a final molded article are lowered. As a result, there has been a disadvantage that the appearance of a molded article is degraded. Therefore, there has been a demand for a material indicative of a low water vapor transmission characteristic with a single expanded molded article.

The seventh associated invention has been made in view of such a conventional problem. The object of the seventh associated invention is to provide a propylene resin expanded molded article which is excellent in heat resistance and strength and which is lower in water vapor transmission and moisture permeability, and is excellent in moisture-proofness.

The first aspect of the seventh associated invention is a polypropylene resin expanded molded article obtained by heating and molding an expanded particle which comprises as a base resin a propylene polymer having the following requirements (a) to (c), characterized in that the above a polypropylene resin expanded molded article having the following requirement (d) (claim 49):

(a) a structural unit derived from propylene is present in 100 to 85 mole %, and a structural unit derived from ethylene and/or alpha-olefin with 4 to 20 carbons is present in 0 to 15 mole %; (the total amount of the structural unit derived from propylene and the structural unit derived from ethylene and/or alpha-olefin with 4 to 20 carbons is 100 mol %);

(b) a content of a position irregularity unit based on 2,1-insertion of a propylene monomer unit in all propylene insertions, which is measured by 13C-NMR, is 0.5% to 2.0%, and a content of a position irregularity unit based on 1,3-insertion of propylene monomer unit in all propylene insertions, which is measured by 13C-NMR, is 0.005% to 0.4%; and (c) in the case where a melting point is defined as Tm [° C.], and where a water vapor transmission rate when made into a film is defined as A [g/m$^2$/24 hr], Tm and A meet the following formula (1)

$(-0.20) \cdot Tm + 35 \leq A \leq (-0.33) \cdot Tm + 60$  Formula (1); and a propylene polymer [B] has only (a) of the above requirements (a) to (c); and (d) a rate of water vapor transmission Y [g/m$^2$/hour] measured in conformity with ASTM E-96 and a density X [g/cm$^3$] of the polypropylene resin expanded molded article meets the following formula (2):

$Y \leq (43.6) \cdot X^2 - (4.5) \cdot X + 0.15$  Formula (2)

The polypropylene resin expanded molded article of the seventh associated invention is obtained by using expanded particles when a propylene polymer having the above requirements (a) to (c) is used as a base resin. In addition, the rate of water vapor transmission Y and density X meets the above formula (2).

Thus, the above polypropylene resin expanded molded article exhibits very low moisture permeability and a water vapor transmission characteristic while it maintains excellent heat resistance and strength specific to a propylene resin.

Therefore, the above polypropylene resin expanded molded article is suitable to be used for such as a heat insulation material, an architectural structural member, or a packaging material and the like.

In addition, the above polypropylene resin expanded molded article has an excellent feature that the water vapor transmission characteristic and moisture permeability are low. Thus, it is possible to reduce the thickness and density of the polypropylene resin expanded molded article required to achieve predetermined moisture-proof properties than a conventional one.

In the above polypropylene resin expanded molded article, although a reason why the rate of water vapor transmission is lowered as compared with a molded article using a conventional raw material is not clear, the reason is estimated as follows.

That is, the polypropylene resin expanded molded article of the seventh associated invention, as described above, is obtained by molding the above expanded particle which contains a specific propylene polymer as a base resin. Thus, the above polypropylene resin expanded molded article is significantly uniform in size of its foam diameter. That is, the uniformity of thickness of the wall of foams is high.

In the case where such a polypropylene resin expanded molded article is used in an architectural use or the like, for example, the polypropylene resin expanded molded article is inserted between structural members, and is used as a heat insulation material or the like. At this time, in the case where there is a difference in water vapor pressure on both sides of the above polypropylene resin expanded molded article, transport of water vapor takes place. This water vapor is primarily considered as passing by diffusing through the foam wall of the above polypropylene resin expanding molded article.

Therefore, if a thick part and a thin part coexist on the foam wall, vapor transmits the thin part more easily as compared with the thick part. Thus, the vapor passes through such thin part.

On the other hand, the polypropylene resin expanded molded article of the seventh associated invention is uniform in the thickness foam wall. Thus, there are a few parts through which vapor easily passes. As a result, it is estimated that the water vapor transmission characteristic of the entire molded article is lowered.

In addition, the above polypropylene resin expanded molded article can be produced by a general bead molding technique, for example. Thus, the above polypropylene resin expanded molded article can be obtained with ease and at a low cost without requiring specific facility or the like.

Further, the above polypropylene resin expanded molded article is obtained by molding expanded particles which contain a specific propylene polymer as a base resin, as described above.

Thus, when the above expanded particles are molded by a bead molding technique or the like, for example, a required steam pressure can be reduced. In addition, a time required for cooling during molding can be reduced. That is, an amount of energy required for molding the above polypropylene resin expanded molded article can be reduced.

In this manner, according to the seventh associated invention, there can be provided a propylene resin expanded molded article which is excellent in heat resistance and strength and which is low in water vapor transmission and moisture permeability, and is excellent in moisture-proof properties.

In the seventh associated invention, the above expanded particle contains a propylene polymer having the above requirements (a) to (c) as a base resin.

The base resin used here means a base resin component constituting the above expanded particles. The above expanded particle may contain other polymer components to be added according to need, and additives such as a blowing agent, catalyst neutralizing agent, lubricating agent, nucleating agent, and any other resin additive.

Now, the above requirement (a) is first described here.

First of all, the above requirement (a) is that a structural unit derived from propylene is present in 100 mol % to 85 mol %, and a structural unit derived from ethylene and/or alpha-olefin with 4 to 20 carbons is present in 0 mol % to 15 mol %.

Here, the total amount of the structural unit derived from propylene and the structural unit derived from ethylene and/or olefin with 4 to 20 carbons is 100 mol %.

Therefore, the polypropylene polymer meeting the requirement (a) includes that made of a propylene homopolymer (100 mol %) or that made of a copolymer of propylene with ethylene and/or alpha-olefin with 4 to 20 carbons.

As ethylene and/or alpha-olefin with 4 to 20 carbons, of comonomers, which are copolymerized with propylene, there can be specifically exemplified: ethylene, 1-butene, 1-pentene, 1-hexene, 1-octene, or 4-methyl-1-butene and the like.

In addition, in the seventh associated invention, a propylene polymer obtained by employing monomers which has been hardly polymerized by a conventional Ziegler-Natta catalyst, in copolymerizing with propylene, can be employed as abase-resin for producing the above expanded particle.

As such monomers, there can be exemplified at least one or more kinds of the followings: cyclopentene, norbornene, 1,4,5,8-dimethano-1,2,3,4,4a,8,8a,5-octahydronaphthalene; linear non-conjugated diene such as 5-methyl-1,4-hexadiene, 7-methyl-1, or 6-octadiene, 4-ethylidene-8-methyl-1,7-nonadiene or the like; cyclic non-conjugate polyene such as 5-ethylidene-2-norbornene, dicyclopentadiene, 5-vinyl-2-norbornene, norbornadiene or the like; or aromatic unsaturated compound such as styrene or divinylbenzene or the like.

The propylene polymer for use in the seventh associated invention is a propylene (co) polymer resin which contains 85 mol % to 100 mol % of the structural unit derived from propylene as is described in the above requirement (a), in the propylene polymer. In addition, it is required that the structural unit derived from ethylene and/or alpha-olefin with 4 to 20 carbons is contained at a content of 0 mol % to 15 mol %.

In the case where a structural unit of a comonomer is out of the above range, the mechanical properties of the above propylene polymer such as bending strength or tensile strength are significantly lowered. In addition, even if expanded particles are fabricated with the above propylene polymer being a base resin, desired expanded particles with high strength and uniform foam size cannot be obtained. Further, even if the expanded particles are molded, a desired polypropylene based resin molded article cannot be obtained.

In addition, in the above propylene polymer, in particular, it is preferable that the structural unit derived from propylene exists to be 99.5 mol % to 85.0 mol % and/or the structural unit derived from ethylene and/or alpha-olefin with 4 to 20 carbons exists to be 0.5 mol % to 15.0 mol % (the total amount of the structural unit derived from propylene and the structural unit derived from ethylene and/or alpha-olefin with 4 to 20 carbons is 100 mol %).

In this case, the structural unit derived from propylene and the structural unit derived from ethylene and/or alpha-olefin with 4 to 20 carbons are mandatory components. In addition, the above expanded particles containing such a propylene polymer as the above base resin are very uniform in their foam size. Thus, the above polypropylene resin expanded molded article obtained by molding the expanded particles is very uniform in its foam wall, and is lower in water vapor transmission.

In addition, in the above propylene polymer, the structural unit derived from propylene can be set at 100 mol %.

In this case, the above propylene polymer is obtained as a so-called propylene homopolymer. The above polypropylene resin expanded molded article obtained by using such a propylene polymer is more excellent in its strength.

Next, as shown in the above requirement (b), the above propylene polymer is 0.5% to 2.0% at a content of a position irregularity unit based on 2,1-insertion of a propylene monomer unit in all propylene insertions measured by 13C-NMR, and a content of position irregularity unit based on 1,3-insertion of propylene monomer unit is 0.005% to 0.4%.

The requirement (b) relates to a content of a position irregularity unit of a propylene polymer. Such an irregularity unit has an effect that crystalline properties of the propylene polymer is lowered, and exhibits advantageous effect that foaming properties are improved.

In the case where the content of position irregularity unit based on 2,1-insertion is lower than 0.5% or in the case where the content of position irregularity unit based on 1,3-insertion is lower than 0.005%, the advantageous effect of making uniform the foam size of the expanded particles is reduced. As a result, there is a problem that the degree of moisture-proofness of the above polypropylene resin expanded molded article obtained by molding the above expanded particles is improved.

On the other hand, in the case where the content of position irregularity unit based on 2,1-insertion exceeds 2.0% or in the case where the content of position irregularity unit based on 1,3-insertion exceeds 0.4%, there is a problem that mechanical properties such as a bending strength or tensile strength of the above propylene polymer are lowered.

Here, the contents of the structural unit derived from propylene in the above propylene polymer, the content of the structural unit derived from ethylene and/or alpha-olefin with 4 to 20 carbons in the above propylene polymer, and the isotactic triad fraction described later are measured by employing a 13C-NMR technique.

For the 13C-NMR spectrum measurement technique, refer to the above first associated invention.

Further, in the seventh associated invention, the above propylene polymer contains a specific amount of partial structures (I) and (II) in the above chemical formula 2 which includes the position irregularity unit based on 2,1-insertion and 1,3-insertion of propylene (refer to the first associated invention).

The mm fraction of all polymer chains of the propylene polymer according to the seventh associated invention is expressed by the above mathematical formula 1 (refer to the first associated invention).

In addition, a content of 2,1-inserted propylene and a content of 1,3-inserted propylene with respect to all propylene insertions are calculated by the above mathematical formula 2 (refer to the first associated invention).

Next, in the requirement (c), a relationship between water vapor transmission rate and a melting point in the case where the above propylene polymer has been made into a film is shown.

That is, in the above propylene polymer, in the case where a melting point of the polymer is defined as Tm [° C.] or the water vapor transmission rate when the polymer is molded into a film is defined as A [g/m$^2$/24 hr], Tm and A meets the following relational formula (1).

$$(-0.20) \cdot Tm+35 \leq A \leq (-0.33) \cdot Tm+60 \quad \text{Formula (1)}$$

The above water vapor transmission rate can be measured by the JIS K7129 "Testing Methods for Water Vapor Transmission Rate of Plastic Film and Sheeting".

In the case where the value A of the water vapor transmission rate of the above propylene polymer is in the above range, the foam diameter in the above expanded particles is extremely uniform. As a result, the above polypropylene resin expanded molded article obtained by using the expanded particles are excellent in dynamic properties such as heat resistance and strength.

In the case where the value A of the water vapor transmission rate deviates from the range of formula (1), the non-uniformity of size of foam in the above expanded particles increases. As a result, the mechanical properties of the above polypropylene resin expanded molded article are lowered.

Although this reason is not clear, it is estimated that a balance of impregnation and escape of a blowing agent is associated with the uniformity of foam size when the blowing agent is impregnated under a warming and pressurization, and the resin particles are discharged to a low pressure atmosphere, thereby producing expanded particles. Further, it is estimated that this balance becomes suitable in the case of using a propylene polymer such that a melting point (Tm) and water vapor transmission rate (A) meet a relationship indicated in formula (1).

The propylene polymer meeting the above requirements (a) to (c) can be obtained by using a so-called metallocene catalyst, for example.

In addition, the polypropylene resin expanded molded article of the seventh associated invention can be obtained by charging and heating in a mold, for example, the expanded particles containing the propylene polymer having the above requirements (a) to (c) as a base resin.

In addition, the polypropylene resin expanded molded article of the seventh associated invention has the above requirement (d).

The above requirement (d) shows a relationship between the degree of moisture permeability and density in the above polypropylene resin expanded molded article.

That is, in the above polypropylene resin expanded molded article, in the case where the degree of moisture permeability measured in conformity with ATSM E-96 is defined as Y [g/m$^2$/hr], and the density of the expanded molded article is defined as X [g/cm$^3$], Y and X meet the following formula (2)

$$Y \leq (43.6) \cdot X^2 - (4.5) \cdot X + 0.15 \quad \text{Formula (2)}$$

In the case where the rate of water vapor transmission Y and the density X of the above polypropylene resin expanded molded article does not meet a relationship of the above formula (2), there is a possibility that the rate of water vapor transmission of the above polypropylene resin expanded molded article is increased, and the molded article cannot be used for uses of a heat insulation material, an architectural structural member, a packaging material and the like.

Next, it is preferable that the above propylene polymer characterized in that the propylene polymer further has the following requirement (e) (claim 50):

(e) an isotactic triad fraction at a propylene unit chain part which has ahead-to-tail linkage, which is measured by 13C-NMR, is 97% or more.

That is, as the above propylene polymer of the base resin, there is used propylene polymer in which the isotactic triad fraction (that is, a rate of three propylene unit in which propylene units are bonded with each other in a head-to-tail manner, of arbitrary three propylene unit in the polymer chains, and the direction of methyl branch in the propylene unit is identical) measured by 13C-NMR (nuclear magnetic resonance technique), is 97% or more in addition to the already described requirements (a) to (c).

In this case, the uniformity of foam diameter in expanded particles is further increased. Thus, in the case where a molded article obtained therefrom is used as a structural material, there can be attained advantageous effect that heat insulation performance or moisture proofing performance is excellent.

Hereinafter, the isotactic triad fraction is described as an mm fraction. In the case where the mm fraction is lower than 97%, the mechanical properties of the above propylene polymer are lowered. Thus, there is a possibility that the mechanical properties of the above polypropylene resin expanded molded article are also lowered. Therefore, it is more preferable that the above mm fraction is 98% or more.

Next, it is preferable that the propylene polymer characterized in that a propylene polymer of the above core layer further has the following requirement (f) (claim 51):

(f) a melt flow rate is 0.5 g/10 minutes to 100 g/10 minutes.

In this case, there can be obtained advantageous effect that expanded particles can be produced while maintaining productivity which is useful in commercial production. Further, the above polypropylene resin expanded molded article obtained from the expanded particles can provide advantageous effect that its dynamic properties are excellent.

In the case where the above melt flow rate (MFR) is lower than 0.5 g per 10 minutes, there is a possibility that the production efficiency of the above expanded particles, in particular, the productivity under performing melting and kneading process described later is lowered. In addition, in the case where the MFR exceeds 100 g per 10 minutes, there is a possibility that dynamic properties such as compression strength or tensile strength of the above polypropylene resin expanded molded article obtained by molding the expanded particles are lowered. Preferably, the melt flow rate is 1.0 g/10 minutes to 50 g/10 minutes. Further preferably, it is 1.0 g/10 minutes to 30 g/10 minutes.

Next, it is preferable that the above polypropylene resin expanded molded article comprise a crystalline structure in which a peak inherent to the base resin and a peak at higher temperature than that of the inherent peak appear as endothermic peaks on a first DSC curve obtained when 2 mg to 4 mg of a test specimens cut out from the above polypropylene resin expanded molded article are heated up to 220° C. at a rate of 10° C./minute by means of a differential scanning calorimeter (claim 52).

This phenomenon means that the above polypropylene resin expanded molded article forms an inherent endothermic peak and an endothermic peak at a higher temperature than the former on the above DSC curve.

In this case, the above propylene based resin expanded molded article is more excellent in mechanical properties such as a compression strength or a tensile strength.

Although a relationship between the above two endothermic peak temperatures is not limited in particular, it is preferable that a difference between these two endothermic peak temperatures be within the range of 10° C. to 25° C. from the viewpoint of easiness of fusion during molding and heating. The temperatures of the two endothermic peaks vary depending on a molecular structure of a base resin, thermal history of a resin, amount of blowing agent, foaming temperature, and foaming pressure or the like. In general, if foaming is performed at a high temperature side, the difference between the two endothermic peaks is increased.

In addition, in the seventh associated invention, other polymer components or additives can be mixed with the above propylene resin which is a base resin within the range in which advantageous effect of the seventh associated invention is not degraded.

For the other polymer component and additive agents, refer to the first associated invention.

Mixing of the above other polymer components or additives with the above base resin can be carried out where the polypropylene base resin is in a fluid state or solid state. In general, molding and kneading is used. That is, by using a variety of kneading machines such as a roll, a screw, a Banbury mixer, a kneader, a blender, or a mill, the above base resin and the other component or the like are kneaded at a desired temperature. After kneading, the product is granulated into an appropriate size of particles suitable to production of the above expanded particles.

The above resin particles are molded and kneaded in an extruder, and then, a kneaded material is discharged out in a strand shape from a die having a minutely small holes. Thereafter, the resultant kneaded material is cut to a specified weight or size by a cutting machine, whereby the columnar pellet shaped material can be obtained.

In general, there is no problem with production of an expanded particle obtained by heating and foaming the resin particle, when the weight of one resin particle is 0.1 mg to 20 mg. When the weight of one resin particle is in the range of 0.2 mg to 10 mg, and further, a deviation in weight between particles is small, expanded particles can be easily produced. Further, the density distribution of the obtained expanded particles becomes small, and the filling properties of expanded resin particles in a mold or the like is improved.

As a method of obtaining expanded particles from the above resin particles, there can be used a method of impregnating a volatile blowing agent in resin particles fabricated as described above, followed by heating and foaming them. Specifically, for example, there can be used methods described in JP 1974-2183 Examined Patent Publication (Kokoku), JP 1981-1344 Examined Patent Publication (Kokoku), DE 1285722 Unexamined Patent Publication (Kokai), and DE 2107683 Unexamined Patent Publication (Kokai).

That is, resin particles are put in a pressure vessel which can be closed and released together with a volatile blowing agent. Then, heating is performed at or above the softening temperature, of a base resin, and the volatile blowing agent is impregnated in the resin particles.

Thereafter, the content within the closed vessel is discharged from the closed vessel to a low pressure atmosphere, and then, the solid part is treated to be dried. In this manner, expanded particles are obtained.

In the above method of producing the expanded particles, a decomposition type blowing agent can be kneaded in advance in resin particles, thereby making it possible to obtain the above expanded particles even if the blowing agent is not fed in the pressure vessel.

As the above decomposition type blowing agent, any agent can be used when it is decomposed at a foaming temperature of resin particles, and generates gas. Specifically, for example, there can be exemplified sodium bicarbonate, ammonium carbonate, an azide compound, an azo compound and the like.

In addition, during heating and foaming, it is preferable that water, alcohol or the like is used as a dispersion medium of resin particles (refer to the first associated invention).

When resin particles are discharged to a low pressure atmosphere, in order to facilitate the discharge, it is preferable that an inorganic gas or a volatile blowing agent similar to the above is introduced from the outside into the closed vessel, thereby constantly maintaining the internal pressure of the closed vessel.

Next, the molded article of the seventh associated invention can be obtained by heating the above expanded particles so that they undergo secondary foaming and fusion, followed by cooling.

In this case, a mold under various conditions is used (refer to the first associated invention).

Next, it is preferable that the density of the polypropylene resin expanded molded article be 0.020 to 0.080 g/cm$^3$ (claim 53).

In this case, the above polypropylene resin expanded molded article has a mechanical strength and weight reduction. In addition, there can be attained advantageous effect that the molded article is excellent in surface appearance such as smoothness or glossiness. Thus, in this case, the above propylene resin expanded molded article is particularly suitable for, for example, an architectural heat insulation material, an automobile part, a helmet core material, a cushioning packaging material and the like.

In the case where the density of the above polypropylene resin expanded molded article exceeds 0.080 g/cm$^3$, it becomes impossible to sufficiently display referred properties of an expanded particle such as light weight, shock absorption properties, or heat insulation properties. Further, a cost-related disadvantage may result because of its low expanded ratio.

On the other hand, if the density is smaller than 0.020 g/cm$^3$, there is a tendency that the closed cell ratio is reduced, and there is a possibility that mechanical properties such as a bending strength or a compression strength becomes insufficient.

In addition, as use of the above polypropylene resin expanded molded article, although a heat insulation material in an architectural field can be exemplified as a representative one, the above polypropylene resin expanded molded article is preferably used as an automobile's interior material independently or by being integrated with a variety of skin materials.

Here, as the above automobile's interior materials, there can be exemplified a dashboard, a console box, an instrument panel, a door panel, a door trim, a ceiling material, an interior material of a pillar part, a sun visor, an armrest, and headrest or the like. In addition, apart from the automobile applications, this molded article can be widely used for a structural material such as a helmet core material, a ship or airplane, or a railway vehicle and a variety of cushioning materials.

There is no particular limitation in the above described skin materials, and for example, there can be exemplified: an elastomeric polyolefin sheet; a polystyrene resin film such as OPS (bi-axially oriented polystyrene sheet), heat resistant OPS, or HIPS film; a polypropylene resin film such as CPP (non-oriented polypropylene film) or OPP (bi-axially oriented polypropylene film), or a polyethylene resin film; a variety of films such as a polyethylene based resin film or a polyester base resin film; or variety of skin materials such as felt or a non-woven cloth.

The description of the seventh associated invention has now been completed.

BEST MODE FOR CARRYING OUT THE INVENTION

EXAMPLES

Figure 1:
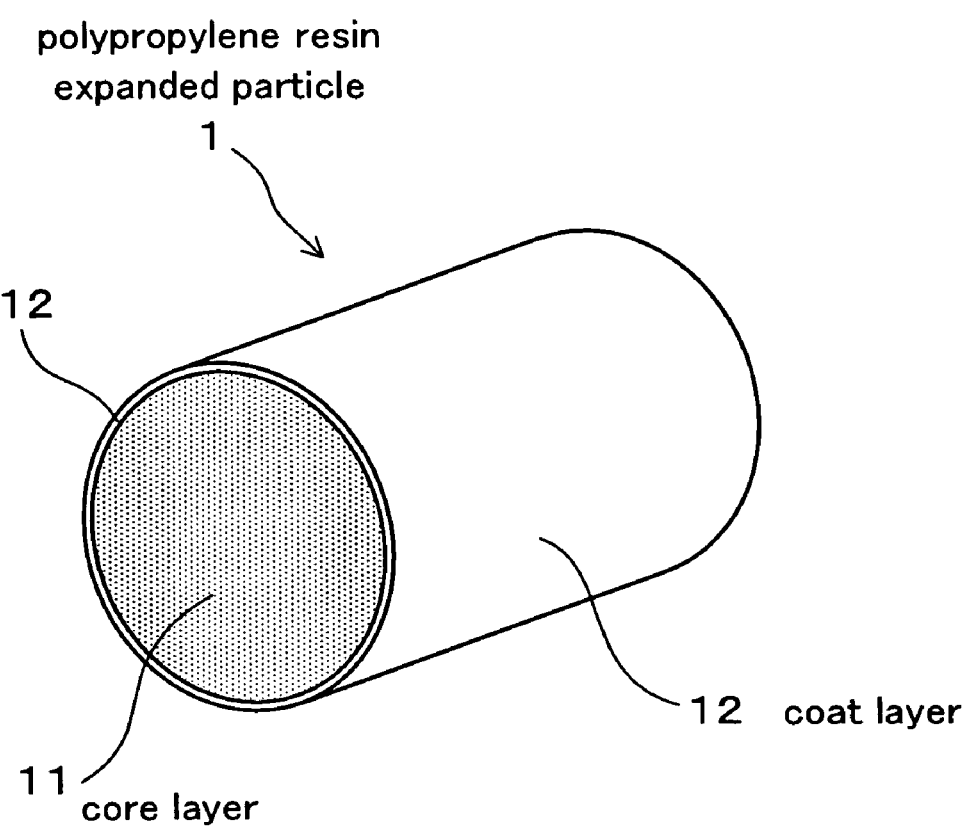
FIG. 1 is a perspective view of polypropylene resin expanded particles according to Example 21.

Now, examples of the present invention will be described below.

[Production 1 of Base Resin]

A polypropylene based polymer serving as a base resin was synthesized in accordance with the following production examples 1 to 4.

Production Example 1

(i) Synthesis of [dimethylsylilenebis{1,1'-(2-methyl-4-phenyl-4-hydroazulenyl)}zirconium dichloride]

All of the following reactions were carried out in an inert gas atmosphere, and a solvents were dried and purified before employing in such reactions.

(a) Synthesis of Racemic/meso Mixture 2.22 g of 2-methylazulene synthesized in accordance with a method described in JP 1987-207232 Unexamined Patent Publication (Kokai) was dissolved in 30 mL of hexane, and 15.6 ml (1.0 equivalent) of cyclohexane-diethyl ether solution of phenyl lithium was added on a small amount basis at 0° C.

This solution was stirred at room temperature for 1 hour, and was cooled to −78° C., and 30 mL of tetrahydrofuran was added.

Next, after adding 0.95 mL of dimethylchlorosilane, the temperature was raised up to room temperature, and further, heating was carried out at 50° C. for 90 minutes. Then, a saturated ammonium chloride aqueous solution was added, and the organic layer was separated. Then, drying was carried out by using sodium sulfate, and the solvents was removed under reduced pressure.

1.48 g of bis(1,1'-(2-methyl-4-phenyl-1,4-dihydro azulenyl)dimethylsilane was obtained by purifying the thus obtained crude product with silica gel column chromatography (hexane-:dichloromethane=5:1).

786 mg of the thus obtained bis(1,1'-(2-mehyl-4-phenyl-1,4-dihydro azulenyl) dimethylsilane was dissolved in 15 mL of diethyl ether; 1.98 mL of a hexane solution (1.68 mol/L) of n-butyllithium was added; the temperature was gradually raised up to room temperature; and then, the solution was stirred at room temperature for 12 hours. The solid obtained by removing the solvent was washed with hexane, and was dried under vacuum.

Further, 20 mL of a toluene-diethyl ether mixture (40:1) was added; 325 mg of zirconium tetrachloride at −60° C.; the temperature was gradually raised; and the mixture was stirred at room temperature for 15 minutes.

The obtained solution was condensed under reduced pressure, and hexane was added to precipitate 150 mg of racemic/meso mixture consisting of dimethylsilylenebis{1, 1'-(2-methyl-4-phenyl-4-hydroazulenyl)}zirconium.

(b) Separation of Raceme 887 mg of the racemic/meso mixture, obtained by repeating the above procedure, was put in a glass container; the mixture was dissolved in 30 mL of dichloromethane and the solution was irradiated by a high voltage mercury lamp for 30 minutes. Then, dichloro methane was removed under reduced pressure, and a yellow solid was obtained.

After adding 7 mL of toluene to this solid and stirring it, and the mixture was, whereby a yellow solid was separated as a sediment. The supernatant was removed and the a solid was dried at reduced pressure to obtain 437 mg of racemic dimethylsilylenebis{1,1'-(2-methyl-4-phenyl-4-hydroazylenyl)}zirconium dichloride.

(ii) Synthesis of Catalyst (a) Treatment 135 mL of desalinated water and 16 g of magnesium sulfate were put in a glass container, and was stirred to make a solution. 22.2 g of montmorillonite ("Kunipia-F" available from Kuminine Kogyo Co., Ltd.) was added to this solution, the temperature was raised, and the solution was maintained at 80° C. for 1 hour.

Next, after adding 300 mL of desalinated water, the solid component was separated by filtration. After adding 46 mL of desalinated water, 23.4 g of sulfuric acid, and 29.2 g of magnesium sulfate, to the solid component, the temperature was raised, and the mixture was heated under reflux. Then, 200 mL of desalinated water was added, and was filtered.

Further, the procedure of addition of 400 mL of desalinated water and filtration were carried out two times. Then, the solid was dried at 100° C., and chemically treated montmorillonite was obtained as a catalyst carrier.

(b) Preparation of Catalytic Component

After the inside of a 1 liter autoclave equipped with a stirrer was substituted by propylene, 230 mL of de-water heptane was introduced, and the temperature was maintained at 40° C.

10 g of chemically treated montmorillonite as a catalytic carrier, which was prepared as described above, suspended in 200 mL of toluene, was put into the autoclave.

Further, a mixture of racemic dimethylsilylenebis{1,11-(2-methyl-4-phenyl-4-hydroazulenyl)}zirconium dichloride (0.15 mmol), triisobutylaluminum (3 mmol) and toluene (a total of 20 mL) were added into the autoclave.

Then, propylene was introduced for 120 minutes at a rate of 10 g/hr, and further, polymerization reaction was then continued for additional 120 minutes. Thereafter, the solvent was removed under nitrogen atmosphere to leave behind a catalytic component. Thus, obtained catalytic component contained 1.9 g of polymer per 1 g of solid component.

(iii) Polymerization of Propylene

After substituting the inside of a stirrer-equipped autoclave having 200 L in internal capacity was well substituted by propylene, 45 kg of dehydrated liquid propylene was introduced. 500 mL (0.12 mol) of hexane solution of triisobutyl aluminum and hydrogen (3NL) were introduced, and the internal temperature of the autoclave was raised up to 70° C.

Then, the above solid catalyst component (1.7 g) was put into the autoclave with pressure of argon, polymerization was started, and polymerization reaction was carried out for 3 hours.

Then, 100 mL of ethanol was put into the autoclave to stop reaction, and the residual gas component was purged, whereby 14.1 kg of polymer was obtained.

This polymer had the following properties: MFR=10; 99.7% of isotactic triad fraction; melting point of 146° C. measured by a DSC technique (temperature was raised at a rate of 10° C. per minute from 30° C.); 1.32% of position irregularity unit based on 2,1-insertion; 0.08% of position irregularity unit based on 1,3-insertion.

(iv) Measurement of Water Vapor Transmission Rate

The thus obtained polymer was molded into a film of 25 micron in thickness, and water vapor transmission rate Y was measured in accordance with a method described in JIS K7129 (this applies to the following production examples). The result was 10.5 (g/m$^2$/24 hr).

With respect to this base resin, since a melting point Tm is 146° C., Y should be in the range of $5.8° C. \leq Y \leq 11.8$ from the above formula (1). The above substitute resin meets the above requirement (c), since it is in the above range.

Production Example 2

Propylene Homopolymerization

After the inside of a stirrer-equipped 200 L autoclave was fully substituted with propylene, 45 kg of dehydrated liquid propylene was introduced. Then, 500 mL (0.12 mol) of a hexane solution of triisobutyl aluminum and hydrogen (3NL) were introduced, and the internal temperature of the autoclave was raised up to of 40° C.

Then, the above solid catalyst component (3.0 g) was put into the autoclave with a pressure of argon, polymerization was started, and polymerization reaction was carried out for 3 hours.

Thereafter, 100 mL of ethanol was put into a the autoclave, the reaction was stopped, and the residual gas component was purged, whereby 4.4 kg of polymer was obtained.

The polymer had the following properties: MFR=2; 99.8% of isotactic triad fraction; melting point of 152° C. measured by the DSC technique (the temperature was raised at a rate of 10° C. per minute from 30° C.); 0.89% position irregularity unit based on 2,1-insertion; and 0.005% of position irregularity unit based on 1,3-insertion.

Measurement of Water Vapor Transmission Rate

In addition, the water vapor transmission rate Y after molding into a film was 9.5 (g/m$^2$/24 hr).

With this base resin, since the melting point Tm is 152° C., Y should be in the range of $4.6 \leq Y \leq 9.8$ from the above formula (1). The above base resin meets the above requirement (c), since it is in the above range.

Production Example 3

Propylene/Ethylene Copolymerization

After the inside of a stirrer-equipped 200 L autoclave was well substituted by propylene, 60 L of purified n-heptane was introduced. Then, 500 mL of a hexane solution of triisobutylaluminum (0.12 mol) was added, and the internal temperature of the autoclave was raised up to 70° C. Thereafter, the above solid catalyst component (9.0 g) was added; a mixture gas of propylene and ethylene (propylene: ethylene=97.5:2.5 at a ratio by weight) was introduced so that the pressure is 0.7 MPa, polymerization was started, and polymerization reaction was carried out for 3 hours under this condition.

Then, 100 mL of ethanol was put into the autoclave the reaction was stopped; and the residual gas component was purged, whereby 9.3 kg of polymer was obtained. This polymer had the following properties: MFR=14; ethylene-content=2.0 wt. %; 99.2% of isotactic triad fraction; melting point of 141° C.; 1.06% of position irregularity unit based on 2,1-insertion; and 0.16% of position irregularity unit based on 1,3-insertion.

In addition, the water vapor transmission rate Y after molding into a film was 12.0 (g/m²/24 hr).

With respect to this base resin, since the melting point Tm is 141° C., Y should be in the range of $6.8 \leq Y \leq 13.5$. The above base resin meets the above requirement (c), since it is in the above range.

Production Example 4

Propylene/1-butene Copolymerization

After the inside of a stirrer equipped 200 L autoclave was well substituted by propylene, 60 L of purified n-heptane was introduced. Then, 500 mL of a hexane solution of triisobutylaluminum was added (0.12 mol), and the internal temperature of the autoclave was raised up to 70° C. Thereafter, the above solid catalyst component (9.0 g) was added; a mixture gas of propylene and 1-butene (propylene: 1-butene=90:10) was introduced so that the pressure is 0.6 MPa, polymerization was started, and polymerization reaction was carried out for 3 hours under this condition.

Then, 100 mL of ethanol was put into the autoclave; the reaction was stopped; and the residual gas component was purged, whereby 8.6 kg of polymer was obtained. This polymer had the following properties: MFR=6; 1-content quantity=6.0 wt. %; melting point of 142° C.; 99.3% of isotactic triad fraction; 1.23% of position irregularity unit based on 2,1-insertion; and 0.09% of position irregularity unit based on 1,3-insertion.

The water vapor transmission rate Y after molding into a film was 11.5 (g/m²/24 hr).

With respect to this base resin, since the melting point Tm is 142° C., Y should be in the range of $6.6 \leq Y \leq 13.1$. The above base resin meets the above requirement (c), since it is in the above range.

Production Example 5

After the inside of a stirrer-equipment 200 L autoclave was well substituted by propylene, 60 L of the purified n-heptane was introduced, and diethyl aluminum chloride (45 g) and 11.5 g of titanium trichloride catalyst available from Marubeni Solvay Co., Ltd. was introduced under a propylene atmosphere. Further, while a hydrogen concentration of a gas phase part is maintained to be 7.0 wt. %, propylene was introduced into the autoclave at the autoclave internal temperature of 65° C. for 4 hours at a rate of 9 kg/hr.

After stopping propylene introduction, reaction was further continued for 1 hour, 100 mL of butanol was added to the reaction mixture to stop reaction, and the residual gas component was purged, whereby 30 kg of polymer was obtained.

This polymer had the following properties: MFR=10; melting point of 160° C.; 97% of isotactic triad fraction; 0% of position irregularity unit based on 2,1-insertion; and 0% of position irregularity unit based on 1,3-insertion.

The water vapor transmission rate Y after molded as a film was 10.0 (g/m²/24 hr).

Since the melting point Tm of this base resin is 160° C., Y should be in the range of $3.0 \leq Y \leq 7.2$ from the above formula (1). However, the result for the above base resin is not in the above range.

That is, this resin fails to meet the requirement (c) of claim 1 of the first associated invention.

Production Example 6

After the inside of the stirrer-equipped 200 L autoclave was well substituted by propylene, 60 L of purified n-heptane was introduced. Then, diethyl aluminum chloride (40 g) and 7.5 g of titanium trichloride catalyst available from Marubeni Solvay Co., Ltd. was introduced under a propylene atmosphere. Further, while the hydrogen concentration of a gas phase part is maintained at 7.0 wt. %, in the auto clave at 60° C., a mixture gas of propylene and ethylene (propylene: ethylene=97.5:2.5 in ratio by weight) was introduced so that the pressure is 0.7 MPa.

After stopping mixture gas introduction, reaction was further continued for 1 hour; 100 mL of butanol was added to the reaction mixture to stop reaction; and the residual gas component was purged, whereby 32 kg of polymer was obtained.

This polymer had the following properties: MFR=12; melting point of 146° C.; 96% of isotactic triad fraction; 0% of position irregularity unit based on 2,1-insertion; and 0% of position irregularity unit based on 1,3-insertion.

The water vapor transmission rate Y after molded as a film was 15.0 (g/m²/24 hr).

Since the melting point Tm of this base resin is 146° C., Y should be in the range of $5.8 \leq Y \leq 11.8$ from the above formula (1). However, the above base resin is not in the above range.

That is, this resin fails to meet the requirement (c) of claim 1 of the first associated invention.

Now, a description will be given with respect to Examples in which polypropylene based resin foam particles are produced by using the base resin obtained by the above described Production Examples 1 to 6.

Example 1

Two antioxidants, 0.05 wt. % of (trade name "Yoshinox BHT" available from Yoshitomi Pharmaceuticals, Co., Ltd and 0.10 wt. % of trade name "Irganox 1010" available from Ciba-Geigy Co., Ltd.) were added to a propylene homopolymer obtained in Production Example 1 as a base resin, and the mixture was extruded into the form of strands of 1 mm in diameter using a single axis extruder of 65 mm in diameter. After cooling in water, the strands were cut into pellets having length of 2 mm.

1,000 g of this pellet was put into a 5 liter autoclave, together with 2, 500 g of water, 200 g of calcium tertiary phosphate triphosphate and 0.2 g of sodium dodecyl benzene sulfonate. Further, 120 g of isobutane was added, and the temperature was raised up to 135° C. over 60 minutes. Then, the reaction mixture was maintained at this temperature for 30 minutes.

Then, while supplying nitrogen gas into the autoclave so as to maintain the pressure at 2.3 MPa, a valve at the bottom part of the autoclave was opened. Then, the contents were discharged into an atmosphere of air.

After drying the expanded particles obtained by the above operation, the bulk density was measured, the measurement was 32 g/L. In addition, the average size of the foam of the particles were 280 micron in diameter, which was very uniform.

Then, the thus obtained polypropylene based expanded particles were sequentially charged under compression into an aluminum mold from a hopper by using compressed air. Thereafter, heating and molding were carried out by introducing a steam of 0.25 MPa gauge pressure into the chamber of the mold, and a molded article was obtained.

The molded article had 0.058 g/cm³ of density, a dimension of 300 mm vertical, 300 mm horizontal, and 50 mm in thickness. The molded article had little voids on the surface, having superior surface appearance free of irregularities. In addition, when the degree of fusion of a cross section was measured by breaking the article at the center of it, the result was 80%.

In addition, a test specimen of 50 mm vertical, 50 mm horizontal, and 25 mm in thickness was prepared from another molded article molded under the same molding condition, and a compression test was carried out in conformance with JIS K6767. As a result, the stress during 50% compression was 7.2 kg/cm². Further, using a testing specimen of the same size, when a permanent set after compression was measured by the method described in JIS K6767, the measurement was 11%.

The results are shown in Table 1.

expanded particles is low in degree of internal fusion, and further, the surface appearance of the molded article was poor. In addition, the mechanical properties were insufficient.

In contrast, in Examples 1 to 5 according to the present invention, it is evident that foams of the polypropylene resin expanded particles are very uniform, the degree of fusion of the molded article using the particles is also high, and the surface appearance is excellent. In addition, with respect to the mechanical properties as well, the compression strength was high, and the permanent set after compression was small.

Now, Examples of the second associated invention will be described here.

[Production 1 of Base Resin]

A propylene polymer as a base resin forming a core layer was synthesized in accordance with the following Production Examples 1 to 4.

TABLE 1

|  |  | Example 1 | Example 2 | Example 3 | Example 4 | Example 5 | Comparative Example 1 | Comparative Example 2 |
|---|---|---|---|---|---|---|---|---|
| base resin | production example | production example 1 | production example 2 | production example 3 | production example 4 | production example 4 | production example 5 | production example 6 |
|  | MFR (g/10 minutes) | 10 | 2 | 14 | 6 | 6 | 10 | 12 |
|  | comonomer | — | — | ethylene | 1-butene | 1-butene | — | ethylene |
|  | contents of comonomer (wt %) | — | — | 2.0 | 6 | 6 | — | 2.6 |
|  | melting point (° C.) | 146 | 152 | 141 | 142 | 142 | 160 | 146 |
|  | water vapor transmission rate (g/m²/24 hr) | 10.5 | 9.5 | 12.0 | 11.5 | 11.5 | 10.0 | 15.0 |
|  | [mm] fraction (%) | 99.7 | 99.8 | 99.2 | 99.3 | 99.3 | 97 | 96 |
|  | [2, 1] insertion (%) | 1.32 | 0.89 | 1.06 | 1.23 | 1.23 | 0 | 0 |
|  | [1, 3] insertion (%) | 0.08 | 0.005 | 0.16 | 0.09 | 0.09 | 0 | 0 |
| foaming temperature (° C.) |  | 135 | 140 | 130 | 130 | 132 | 150 | 135 |
| bulk density of expanded particle (g/L) |  | 32 | 29 | 30 | 27 | 20 | 0.46 | 39 |
| condition of foam |  | average 280 μ; well uniformed | average 240 μ; well uniformed | average 250 μ; well uniformed | average 230 μ; well uniformed | average 300 μ; well uniformed | average 200 μ; widely varied | average 180 μ; widely varied |
| particle density (g/L) |  | 58 | 55 | 56 | 58 | 35 | 67 | 61 |
| fusion (%) |  | 90 | 85 | 95 | 95 | 95 | 40 | 60 |
| appearance of molded article |  | ○ | ○ | ○ | ○ | ○ | x | x~Δ |
| compression test (kg/cm²) |  | 7.2 | 8.0 | 6.9 | 7.5 | 7.4 | 4.5 | 5.3 |
| permanent set after compression (%) |  | 11 | 12 | 9 | 10 | 9 | 16 | 15 |

Notes
1) In the table, "—" of "comonomer" and "content of comonomer" section means polymerisation is conducted without adjunction of comonomer.
2) Appearance of molded article.
○: Excellent
Δ: Acceptable
x: Poor Examples 2 to 5 and Comparative Examples 1 and 2

Testing was carried out in the same manner as in Example 1 except that base resins described in Table 1 (the above production examples 1 to 6) were used.

The results are shown in Table 1.

As shown by the data in Table 1, in the case where there is employed a base resin which fails to meet the above requirement (c) derived from the above production examples 5 and 6 (in Comparative Examples 1 and 2), the obtained polypropylene based resin expanded particles had foams with wide distribution in the size. In addition, the molded article molded by employing the polypropylene based resin Production Example 1

(i) Synthesis of [dimethyldylilenedis{1,1'-(2-methyl-4-phenyl-4-hydroazulenyl)}Zirconium dichloride]

All of the following reactions were performed in an inert gas atmosphere, and solvents were dried and purified before using in such reactions.
(a) Synthesis of racemic/meso mixture
(b) Separation of Racemic isomer (ii) Synthesis of Catalyst (a) Treatment of Catalyst Carrier
(b) Preparation of Catalyst Component The above description is similar to that of Production Example 1 of the first associated invention.

(iii) Polymerization of Propylene

After substituting the inside of a stirrer-equipped 200 L autoclave with propylene, 45 kg of dehydrated liquid propylene was introduced.

Then, 500 mL (0.12 mol) of a hexane solution of triisobutyl aluminum and hydrogen (3NL) were introduced, and the internal temperature of the autoclave was raised up to 70° C.

Then, the above solid catalyst component (1.7 g) was put into the autoclave with pressure of argon, polymerization was started, and polymerization reaction was performed for 3 hours.

Thereafter, 100 mL of ethanol was put into the reaction mixture, the reaction was stopped, and the residual gas component was purged, whereby 14.1 kg of polymer was obtained as a propylene polymer for a core layer.

This polymer had the following properties: MFR=10; 99.7% of isotactic triad fraction; a melting point of 146° C. measured by the DSC technique (the temperature was raised at a rate of 10° C./minute from 30° C.); 1.32% of position irregularity unit based on 2,1-insertion; 0.08% of position irregularity based on 1,3-insertion.

(iv) Measurement of Water Vapor Transmission Rate

The above obtained polymer was molded in film having a thickness of 25 micron, and water vapor transmission rate Y was measured in accordance with a method described in JIS K7129 (this applies to the following production examples). The result was 10.5 (g/m²/24 hr).

In this propylene polymer, the melting point Tm was 146° C. Thus, from the above formula (1), Y should be in the range of $5.8 \leq Y \leq 11.8$. Y was in this range, and thus, met the above requirement (c) of the second associated invention.

Production Example 2

Propylene Homopolymerization

After the inside of a stirrer-equipped 200 L autoclave was thoroughly substituted with propylene, 45 kg of dehydrated liquid propylene was introduced. Then, 500 mL (0.12 mol) of a hexane solution of triisobutyl aluminum and hydrogen (3NL) were introduced, and the internal temperature of the autoclave was raised up to 40° C.

Thereafter, the above solid catalyst component (3.0 g) was put into the autoclave with pressure of argon, polymerization was started, and polymerization reaction was performed for 3 hours.

Thereafter, 100 mL of ethanol was put into the reaction mixture, reaction was stopped, and the residual gas component was purged, whereby 4.4 kg of polymer was obtained as a propylene polymer for a core layer.

This polymer had the following properties: MFR=2; 99.8% of isotactic triad fraction; a melting point of 152° C. measured by the DSC technique (the temperature was raised at a rate of 10° C./minute from 30° C.); 0.89% of position irregularity unit based on 2,1-insertion; 0.005% of position irregularity based on 1,3-insertion.

Measurement of Water Vapor Transmission Rate

In addition, the water vapor transmission rate Y after molded in film was 9.5 (g/m²/24 hr).

In this propylene polymer, the melting point Tm is 152° C. Thus, from the above formula (1), Y should be in the range of $4.6 \leq Y \leq 9.8$. Y was in this range, and thus, met the above requirement (c) of the second associated invention.

Production Example 3

Propylene/Ethylene Copolymerization

After the inside of a stirrer-equipped 200 L autoclave was thoroughly substituted with propylene, 60 L purified n-heptane was introduced. Then, 500 mL (0.12 mol) of a hexane solution of triisobutyl aluminum was introduced, and the internal temperature of the autoclave was raised up to 70° C.

Thereafter, the above solid catalyst component (9.0 g) was added, a mixture gas of propylene and ethylene (propylene:ethylene=97.5:2.5 in ratio by weight) was introduced so that the pressure is 0.7 MPa, polymerization was started, and polymerization reaction was performed under this condition for 3 hours.

Thereafter, 100 mL of ethanol was put into the reaction mixture, reaction was stopped, the residual gas component was purged, whereby 9.3 kg of polymer was obtained as a propylene polymer for a core layer. This polymer had the following properties: MFR=14; ethylene content=2.0% by weight, 99.2% of isotactic triad fraction, a melting point of 141° C., 1.06% of position irregularity unit based on 2,1-insertion, 0.16% of position irregularity unit based on 1,3-insertion.

In addition, the water vapor transmission rate Y after molded in film was 12.0 (g/m²/24 hr).

In this propylene polymer, the melting point Tm was 141° C. Thus, from the above formula (1), Y should be in the range of $6.8 \leq Y \leq 13.5$. Y was in that range, and thus, met the above requirement (c) of the second associated invention.

Production Example 4

Propylene/1-Butene Copolymerization

After the inside of a stirrer-equipped 200 L autoclave was thoroughly substituted with propylene, 60 L of purified n-heptane was introduced; 500 mL of a hexane solution of triisobutyl aluminum was added; and the internal temperature of the autoclave was raised up to 70° C. Thereafter, the above solid catalyst component (9.0 g) was added; a mixture gas of propylene and 1-butene (propylene:1-butene=90:10) was introduced so that the pressure is 0.6 MPa, and polymerization reaction was performed for 3 hours under this condition.

Thereafter, 100 mL of ethanol is put into the reaction mixture; reaction was stopped; and the residual gas component was purged, whereby 8.6 kg of polymer was obtained as a propylene polymer for a core layer. This polymer had the following properties: MFR=6,1-butene content=6.0% by weight; a melting point of 142° C.; 99.3% of isotactic triad fraction; 1.23% of position irregularity unit based on 2,1-insertion; 0.09% of position irregularity unit based on 1,3-insertion.

The water vapor transmission rate Y after molded in film was 11.5 (g/m²/24 hr).

In this propylene polymer, the melting point Tm was 142° C. Thus, from the above formula (1), Y should be in the range of $6.6 \leq Y \leq 13.1$. Y was in that range, and thus met the above requirement (c) of the second associated invention.

Production Example 5

After the inside of a 200 L stirrer-equipped was thoroughly substituted with propylene, 60 L of purified n-heptane was introduced; diethyl aluminum chloride (45 g) and 11.5 g of titanium trichloride catalyst available from Marubeni Solvay Co., Ltd. were introduced under a propylene atmosphere. Further, while the hydrogen concentration of a gas phase part was maintained at 7.0% by volume, propylene was introduced into the autoclave over 4 hours at an autoclave internal temperature of 65° C. and at a rate of 9 kg/hour.

After propylene introduction was stopped, 1-hour reaction was further continued. 100 mL of butanol was added in the autoclave and the reaction was stopped; and the residual gas component was purged, whereby 30 kg of polymer was obtained as a propylene polymer for a core layer.

This polymer had the following properties: MFR=10; a melting point of 160° C.; 97% of isotactic triad fraction; 0% of position irregularity unit based on 2,1-insertion; 0% of position irregularity unit based on 1,3-insertion.

The water vapor transmission rate Y after molded in film was 10.0 (g/m$^2$/24 hr).

In this propylene polymer, a melting point Tm was 160° C. Thus, from the above formula (1), Y should be in the range of $3.0 \leq Y \leq 7.2$, and however, was not in that range.

That is, this polymer did not meet the requirement (c) of the first invention of the second associated invention (claim 6).

Production Example 6

After the inside of a stirrer-equipped 200 L autoclave was thoroughly substituted with propylene, 60 L of purified n-heptane was introduced; diethyl aluminum chloride (40 g) and 7.5 g of titanium trichloride catalyst available from Marubeni Solvay Co., Ltd. were introduced under a propylene atmosphere. Further, while the hydrogen concentration of a gas phase part was maintained at 7.0% by volume, a mixture gas of propylene and ethylene (propylene: ethylene=97.5:2.5 in ratio by weight) was introduced into the autoclave at 60° C. so that the pressure is 0.7 MPa.

After mixture gas introduction was stopped, the reaction was further continued for 1 hour; 100 mL of butanol was added in the autoclave and the reaction was stopped; and the residual gas component was purged, whereby 32 kg of polymer was obtained as a propylene polymer for a core layer.

This polymer had the following properties: MFR=12; a melting point of 146° C.; 96% of isotactic triad fraction; 0% of position irregularity unit based on 2,1-insertion; 0% of position irregularity unit based on 1,3-insertion.

The water vapor transmission rate Y after molded in film was 15.0 (g/m$^2$/24 hr).

In this propylene polymer, a melting point Tm was 146° C. Thus, from the above formula (1), Y should be in the range of $5.8 \leq Y \leq 11.8$, and however, was not in that range.

That, this polymer did not meet the requirement (c) of the first invention of the second associated invention (claim 6).

Next, a description will be given with respect to Examples in which polypropylene resin expanded particles were produced by using a propylene polymer obtained in accordance with Production Examples 1 to 6 described above.

In the following Examples, the properties were obtained as follows.

<Melting Point>; By using a differential scanning calorimeter (DSC), a temperature of 3 mg to 5 mg of sample consisting of a propylene polymer obtained in accordance with each of the above described production examples 1 to 6 or a resin of a coat layer described in Tables 1 and 2 described later, was raised from 20° C. to 220° C. at a rate of 10° C./minute. Then, the temperature was reduced to 20° C. at a rate of 10° C./minute, and further, a melting point was defined with a peak temperature on an endothermic curve obtained by raising a temperature to 220° C. at a rate of 10° C./minute again.

<Fusion Test>; Propylene resin expanded particles comprising of a core layer and a coat layer, described later, was fabricated by using the above propylene polymer. Next, the particles were heated and molded by introducing a high pressure steam after charging the particles into a mold by compression filling; a molded article was produced. Then, the thus produced molded article was cut out, and a test specimen of 200 mm in length, 30 mm in width, and 12.5 mm in thickness was fabricated.

This test specimen was bent up to 90 degrees along the periphery of a cylinder of 50 mm in diameter, and was judged based on the following criteria.

◯: 80% or more out of total number of test specimens was not broken.

X: More than 20% out of total number of test specimens was broken.

<Heat Resistance Test>; The degree of dimensional change after heating at 110° C. was measured in conformance with JIS K6767, and was judged based on the following criteria.

This test specimen was fabricated in accordance with procedures similar to those of the method which was already described in the <Fusion Test> section.

◯: The degree of dimensional change after heating was lower than 3%.

Δ: The degree of dimensional change after heating was 3% to 6%.

X: The degree of dimensional change after heating exceeds 6%.

Example 21

By using a single screw extruder of 65 mm in internal diameter, antioxidants (0.05% by weight of trade name "Yoshinox BHT" available from Yoshitomi Pharmaceuticals, Co., Ltd.) and 0.10% by weight of trade name "Irganox 1010" available from Ciba Geigy Co., Ltd. were added to the propylene homopolymer obtained in Production Example 1, and was kneaded, and then, linear polyethylene with a low density of 0.920 was kneaded by using a single screw extruder of 30 mm in internal diameter.

Next, from a die having a die orifice of 1.5 mm in diameter, the above propylene homopolymer was applied as a material for a core layer, linear low density polyethylene of 0.92 g/cm$^3$ of density and 121° C. in melting point was applied as a material for a coat layer, and these layers were extruded in a strand shape.

Further, this strand was cooled through a water tank; the cooled strand was cut so that the weight of one piece is 1.0 mg, and a fine granule pellet was obtained as resin particles. When these resin particles were observed by a phase contrast microscope, a propylene polymer as a core layer was coated with the linear low density polyethylene with thickness of 30 micron as a coat layer.

Next, in order to obtain the above resin particles as expanded particles, 1000 g of the above fine granule pellet was put into a 5 liter autoclave, together with 2500 g of water, 200 g of 10% water dispersion of calcium tertiary phosphate, and 30 g of sodium dodecylbenzenesulfonate (2% aqueous solution). Further, 200 g of isobutane was added, the temperature was raised up to 135° C. over 60 minutes, and the reaction mixture was maintained at this temperature for 30 minutes.

Then, while supplying nitrogen gas into the autoclave so as to maintain the pressure at 2.3 MPa, a valve at the bottom part of the autoclave was opened. Then, the contents were discharged into the atmosphere of air, and foaming was performed.

After drying the expanded particles obtained by the above operation, the bulk density of polypropylene resin expanded particles was measured; the result was 24 kg/m$^3$. In addition, the average size of the foam of polypropylene resin expanded particles was 340 micron, which was very uniform.

As shown in FIG. 1, the above described polypropylene resin expanded particle 1 was a columnar fine granule pellet consisting of the above core layer 11 and the above coat layer 12 covering its outer periphery.

Next, the above obtained propylene resin expanded particles were sequentially charged under compression into an aluminum mold from a hopper by using compressed air. Thereafter, heating and molding were carried out by introducing a steam of 0.15 MPa (gauge pressure) into the chamber of the mold, and a molded article was obtained.

The molded article had 45 kg/m$^3$ of density, a dimension of 300 mm vertical, 300 mm horizontal, and 50 mm in thickness. The molded article had little voids on the surface, having superior surface appearance. In addition, when the degree of fusion of a cross section by breaking the article at the center of it was measured, the result was 80%.

In addition, after a test specimen of a dimension of 50 mm vertical, 50 mm horizontal, and 25 mm in thickness was prepared from another molded article molded under the same molding condition, and a compression test was carried out in conformance with JIS K7220. As a result, the stress at 50% compression was 0.52 MPa. Further, using a testing specimen of the same size, when a permanent set after compression was measured by the method described in JIS K6767, the result was 11%.

The result is shown in Table 2.

Examples 22 to 28 and Comparative Examples 21 to 23

The above Examples and Comparative Examples were carried out in the same manner as in Example 21 except that a base resin forming a core layer described in each of the above Production Examples 1 to 6 was used, and a resin forming a coat layer described in each of Tables 2 to 4 was used.

The results are shown in Tables 2 to 4.

As shown by the data in Tables 2 to 4, in the case of using a base resin which fails to meet the above requirement (c) obtained from the above Production Examples 5 and 6 (Comparative Examples 21, 22 and 23), the obtained polypropylene resin expanded particles had foamed with wide distribution in the size.

In addition, the molded article molded by using the polypropylene resin expanded particles was low in degree of internal fusion, and in addition, the surface appearance of the molded article was poor. Further, the mechanical properties were insufficient.

In contrast, in Examples 21 to 28 according to the present invention, it is evident that the foams of polypropylene resin expanded particles were very uniform; the degree of fusion of the molded article using the particles is also high; and further, the surface appearance is excellent. Further, with respect to the mechanical properties, the compression strength is high, the permanent set after compression is small, and further, heat resistance is excellent.

TABLE 2

| | Example 21 | Example 22 | Example 23 | Example 24 |
|---|---|---|---|---|
| production example of resin for core layer | production example 1 | production example 1 | production example 1 | production example 2 |
| polypropylene resin expanded particle | | | | |
| core layer | | | | |
| MFR (g/10 minutes) | 10 | 10 | 10 | 2 |
| melting point (° C.) | 146 | 146 | 146 | 152 |
| water vapor transmission rate (g/m$^2$/24 hr) | 10.5 | 10.5 | 10.5 | 9.5 |
| [mm] fraction (%) | 99.7 | 99.7 | 99.7 | 99.8 |
| [2, 1] insertion (%) | 1.32 | 1.32 | 1.32 | 0.89 |
| [1, 3] insertion (%) | 0.08 | 0.08 | 0.08 | 0.005 |
| coat layer | | | | |
| resin for coat layer | LLDPE | LLDPE | HIPS | LLDPE |
| density (g/cm$^3$) | 0.92 | 0.92 | 1.05 | 0.92 |
| melting point (° C.) | 121 | 121 | none | 121 |
| thickness of coat layer (μ) | 30 | 70 | 30 | 30 |
| weight of composite particle (mg) | 1.0 | 1.0 | 1.0 | 1.0 |
| foaming temperature (° C.) | 135 | 135 | 135 | 140 |
| average bulk density of expanded particle (kg/m$^3$) | 25 | 25 | 25 | 25 |
| average size of foam (μ) | 340 | 300 | 340 | 340 |
| condition of foam | highly uniform | highly uniform | highly uniform | highly uniform |
| expanded molded article | | | | |
| steam pressure for molding (MPa) | 0.15 | 0.15 | 0.12 | 0.15 |
| density of molded article (kg/m$^3$) | 45 | 45 | 45 | 45 |
| appearance of molded article | ○ | ○ | ○ | ○ |
| mold-to-part contraction (%) | 1.6 | 1.9 | 1.6 | 1.7 |
| fusion test | ○ | ○ | ○ | ○ |
| compression test (MPa) | 0.52 | 0.50 | 0.55 | 0.58 |
| permanent set after compression (%) | 11 | 11 | 12 | 11 |
| heat resistance test | ○ | ○ | ○ | ○ |

LLDPE: Linear Low Density Polyethylene
HIPS: HIPS grade name "HT60" available from A and M Polystyrene Co., Ltd.

TABLE 3

| | Example 25 | Example 26 | Comparative Example 21 | Comparative Example 22 |
|---|---|---|---|---|
| production example of resin for core layer | production example 3 | production example 4 | production example 5 | production example 6 |
| polypropylene resin expanded particle | | | | |
| core layer | | | | |
| MFR (g/10 minutes) | 10 | 6 | 10 | 2 |
| melting point (° C.) | 141 | 142 | 160 | 146 |

TABLE 3-continued

| | Example | | | |
|---|---|---|---|---|
| | Example 25 | Example 26 | Comparative Example 21 | Comparative Example 22 |
| water vapor transmission rate (g/m²/24 hr) | 12.0 | 11.5 | 10.0 | 15.0 |
| [mm] fraction (%) | 99.2 | 99.3 | 97.0 | 96.0 |
| [2, 1] insertion (%) | 1.06 | 1.23 | 0 | 0 |
| [1, 3] insertion (%) | 0.16 | 0.09 | 0 | 0 |
| coat layer | | | | |
| resin for coat layer | LLDPE | LLDPE | LLDPE | LLDPE |
| density (g/cm³) | 0.92 | 0.92 | 0.92 | 0.92 |
| melting point (° C.) | 121 | 121 | 121 | 121 |
| thickness of coat layer (μ) | 30 | 30 | 30 | 30 |
| weight of composite particle (mg) | 1.0 | 1.0 | 1.0 | 1.0 |
| average bulk density of expanded particle (kg/m³) | 19 | 20 | 24 | 24 |
| average size of foam (μ) | 320 | 300 | 120 | 260 |
| condition of foam | highly uniform | highly uniform | widely varied | widely varied |
| expanded molded article | | | | |
| steam pressure for molding (MPa) | 0.15 | 0.15 | 0.15 | 0.15 |
| density of molded article (kg/m³) | 45 | 45 | 45 | 45 |
| appearance of molded article | ○ | ○ | x | x |
| mold-to-part contraction (%) | 1.6 | 1.6 | 2.2 | 2.3 |
| fusion test | ○ | ○ | x | x |
| compression test (MPa) | 0.47 | 0.48 | 0.51 | 0.44 |
| permanent set after compression (%) | 11 | 11 | 17 | 16 |
| heat resistance test | ○ | ○ | Δ | Δ |

LLDPE: Linear Low Density Polyethylene

TABLE 4

| | Example | | |
|---|---|---|---|
| | Example 27 | Example 28 | Comparative Example 23 |
| production example of resin for core layer polypropylene resin expanded particle | production example 1 | production example 1 | production example 1 |
| resin for coat layer | composition A | LLDPE2 | composition B |
| thickness of coat layer (μ) | 30 | 30 | 30 |
| weight of composite particle (mg) | 1.0 | 1.0 | 1.0 |
| average bulk density of expanded particle (kg/m³) | 25 | 24 | 21 |
| expanded molded article | | | |
| steam pressure for molding (MPa) | 0.17 | 0.1 | 0.17 |
| density of molded article (kg/m³) | 40 | 40 | 40 |
| mold-to-part contraction (%) | 1.6 | 1.6 | 1.6 |
| fusion test | ○ | ○ | x |
| compression test (MPa) | 0.47 | 0.45 | could not be performed |
| heat resistance test | ○ | ○ | could not be performed | composition A:
(1) Linear low density polyethylene (density 0.920 and melting point 120° C.) [100 parts by weight]
(2) Propylene polymer obtained in Production Example 1 [20 parts by weight]
composition B:
(1) Linear low density polyethylene (density 0.920 and melting point 120° C.) [100 parts by weight]
(2) Propylene polymer obtained in Production Example 1 [150 parts by weight]
LLDPE2: Linear Low Density Polyethylene (density 0.907 and melting point 100° C.)

Now, Examples of the third associated invention will be described here.

[Production of Propylene Polymer]

First, propylene polymers [A] and [B] constituting a polypropylene resin composition were synthesized by any of the methods shown in the following Production Examples 1 to 6.

Production Example 1

(i) Synthesis of [dimethylsilylenebis{1,1'-(2-methyl-4-phenyl-4-hydroazulenyl)}zirconium dichloride]

All of the following reactions were performed in an inert gas atmosphere, and solvents were dried and purified before using in such reactions.
(a) Synthesis of racemic/meso mixture
(b) Separation of racemic isomer (ii) Synthesis of Catalyst (a) Treatment of Catalyst Carrier
(b) Preparation of Catalyst Component The above description is similar to that of Production Example 1 of the first associated invention.

(iii) Polymerization of Propylene (Production of Propylene Polymer A)

After substituting the inside of a stirrer-equipped 200L autoclave was well substituted with propylene, 45 kg of dehydrated liquid propylene was introduced. Then, 500 ml (0.12 mol) of a hexane solution of triisobutyl aluminum and hydrogen (3NL) were introduced, and the internal temperature of the autoclave was raised up to 70° C.

Thereafter, the above solid catalyst component (1.7 g) was put into the autoclave under pressure of argon, polymerization was started, and polymerization reaction was performed for 3 hours.

Thereafter, 100 ml of ethanol was put into the autoclave, the reaction was stopped, and the residual gas component was purged, whereby 14.1 kg of polymer was obtained.

This polymer is 100 mol % in structural unit derived from propylene, i.e., a propylene homopolymer. This polymer meets the above requirement (a) of the third associated invention.

In addition, this polymer had the following properties: MFR (melt flow rate)=10 g/10 minutes; 99.7% of isotactic triad fraction; a melting point of 146° C. measured by the DSC technique (the temperature was raised at a rate of 10° C./minute from 30° C.). The polymer met the above requirements (d) and (e) of the third associated invention. Further, a content of position irregularity unit based on 2,1-insertion was 1.32%; a content of position irregularity based on 1,3-insertion was 0.08%; and the above requirement (b) of the third associated invention was met.

Hereinafter, the thus obtained polypropylene polymer is referred to as "polymer 1".

(iv) Measurement of Water Vapor Transmission Rate

The above obtained polymer 1 was molded into a film of 25 micron in thickness, and the water vapor transmission rate Y was measured in accordance with the method described in JIS K 7129 (this applies to the following production examples). The result was 10.5 (g/m²/24 hr).

In polymer 1, as described above, the melting point Tm was 146° C. From the above formula (1), Y should be in the range of $5.8 \leq Y \leq 11.8$. Y was in that range, and met the above requirement (c) of the third associated invention.

Production Example 2

Production of Propylene Polymer [A]; Propylene Homopolymerization

After a stirrer-equipped 200 L autoclave was thoroughly substituted with propylene, 45 kg of dehydrated liquid propylene was introduced. Then, 500 ml (0.12 mol) of a hexane solution of triisobutyl aluminum and hydrogen (3NL) were introduced, and the internal temperature of the autoclave was raised up to 40° C.

Thereafter, the above solid catalyst component (3.0 g) was put into the autoclave with pressure of argon, polymerization was started, and polymerization reaction was performed for 3 hours.

Thereafter, 100 ml of ethanol was put into the autoclave, the reaction was stopped, and the residual gas component was purged, whereby 4.4 kg of a polymer was obtained.

This polymer is 100 mol % in structural unit derived from propylene, i.e., a propylene homopolymer. This polymer meets the above requirement (a) of the third associated invention.

In addition, this polymer had the following properties: MFR=2; 99.8% of isotactic triad fraction; a melting point of 152° C. measured by the DSC technique (the temperature was raised at a rate of 10° C./minute from 30° C.). The polymer met the above requirements (d) and (e) of the third associated invention. Further, a content of position irregularity unit based on 2, 1-insertion was 0.89%; a content of position irregularity unit based on 1,3-insertion was 0.005%; and the above requirement (b) of the third associated invention was met.

Hereinafter, the thus obtained polypropylene polymer is referred to as "polymer 2".

Measurement of Water Vapor Transmission Rate

In addition, with respect to the polymer 2, when the water vapor transmission rate Y when the polymer is molded into a film was investigated as in the above polymer 1, the transparency was 9.5 (g/m²/24 hr).

In polymer 2, as described above, the melting point Tm was 152° C. Thus, from the above formula (1), Y should be in the range of $4.6 \leq Y \leq 9.8$. Y was in that range, and thus, met the above requirement (c) of the third associated invention.

Production Example 3

Production of Propylene Polymer [A] and Propylene/Ethylene Copolymerization)

After the inside of a stirrer-equipped 200 L autoclave was thoroughly substituted by propylene, 60 L of purified n-heptane was introduced. 500 ml of a hexane solution of triisobutyl aluminum (0.12 mol) was added, and the internal temperature of the autoclave was raised up to 70° C. Thereafter, the above solid catalyst component (9.0 g) was added; a mixture gas of propylene and ethylene (propylene:ethylene=97.5:2.5 at a ratio by weight) was introduced so that the pressure is 0.7 MPa; polymerization was started and polymerization reaction was performed for 3 hours under this condition.

Thereafter, 100 ml of ethanol was put into the autoclave, the reaction was stopped, and the residual gas component was purged, whereby 9.3 kg of polymer was obtained.

In this polymer, the content of the structural unit derived from propylene was 97.0 mol %, and the content of the structural unit derived from ethylene was 3.0 mol %. These values met the above requirement (a) of the third associated invention.

In addition, this polymer had the following properties: MFR=14; ethylene content=2.0% by weight; 99.2% of isotactic triad fraction; a melting point of 141° C. measured by the DSC technique (the temperature was raised at a rate of 10° C./minute from 30° C.). The polymer met the above requirements (d) and (e) of the third associated invention. Further, the content of position irregularity unit based on 2,1-insertion was 1.06%; the content of position irregularity unit based on 1,3-insertion was 0.16%; and the above requirement (b) of the third associated invention was met.

Hereinafter, the thus obtained polypropylene polymer is referred to as "polymer 3".

In addition, with respect to the polymer 3, when the water vapor transmission rate Y after molding into a film was investigated as in the above polymers 1 and 2, the rate was 12.0 (g/m²/24 hr).

In polymer 3, as described above, the melting point Tm was 141° C. Thus, from the above formula (1), Y should be in the range of $6.8 \leq Y \leq 13.5$. Y was in that range, and thus, met the above requirement (c) of the third associated invention.

Production Example 4

Production of Propylene Polymer [A] and Propylene/1-Butene Copolymerization

After the inside of a stirrer-equipped 200 L autoclave was thoroughly substituted by propylene, 60 L of purified n-heptane was introduced. 500 ml of a hexane solution of triisobutyl aluminum (0.12 mol) was added, and the internal temperature of the autoclave was raised up to 70° C. Thereafter, the above solid catalyst component (9.0 g) was added; a mixture gas of propylene and 1-butene (propylene:1-butene=90:10 ratio by weight) was introduced so that the pressure is 0.6 MPa; polymerization was started; and polymerization reaction was performed for 3 hours under this condition.

Thereafter, 100 ml of ethanol was put into the autoclave, the reaction was stopped, and the residual gas component was purged, whereby 8.6 kg of a polymer was obtained.

In this polymer, the content of the structural unit derived from propylene 95.4 mol %, and the content of the structural unit derived from 1-butene was 4.6 mol %. These values met the above requirement (a) of the third associated invention.

In addition, this polymer had the following properties: MFR=6; 1-butene content=6.0% by weight; a melting point of 142° C. measured by the DSC technique (the temperature was raised at a rate of 10° C./minute from 30° C.); 99.3% of isotactic triad fraction. The polymer meets the above requirements (d) and (e) of the third associated invention. Further, a content of position irregularity unit based on 2,1-insertion was 1.23%; a content of position irregularity unit based on 1,3-insertion was 0.09%; and the above requirement (b) of the third associated invention was met.

Hereinafter, the thus obtained polypropylene polymer is referred to as "polymer 4".

In addition, with respect to the polymer 4, when the water vapor transmission rate Y when the polymer is molded into a film was investigated as in the above polymers 1 to 3, the transparency was 11.5 (g/m²/24 hr).

In polymer 4, as described above, the melting point Tm was 142° C. Thus, from the above formula (1), Y should be in the range of $6.6 \leq Y \leq 13.1$. Y was in that range, and thus, met the above requirement (c) of the third associated invention.

Production Example 5

Production of Propylene Polymer [B] and Propylene Homopolymerization

After the inside of a stirrer-equipped 200 L autoclave thoroughly well substituted by propylene, 60 L of purified n-heptane was introduced, and diethyl aluminum chloride (45 g) and 11.5 g of a titanium trichloride catalyst available from Marubeni Solvay Co., Ltd. was introduced under a propylene atmosphere. Further, while the hydrogen concentration of a gas phase part was maintained at 7.0 vol %, propylene was introduced in the autoclave at the autoclave internal temperature of 60° C. over 4 hours at a rate of 9 kg/hour.

After stopping propylene introduction, the reaction was further continued for 1 hour; 100 ml of butanol was added to the reaction mixture to stop reaction, and the residual gas component was purged, whereby 26 kg of polymer was obtained. The thus obtained polymer is referred to as "polymer 5".

This polymer is 100 mol % in structural unit derived from propylene, that is, is a propylene homopolymer. This polymer met the above requirement (a) of the third associated invention.

This polymer had the following properties: MFR=7; a melting point of 165° C.; 97.6% of isotactic triad fraction; 0% of position irregularity unit based on 2,1-insertion; 0% of position irregularity unit based on 1,3-insertion.

That is, this polymer did not meet the above requirement (b) of the third associated invention.

With respect to polymer 5, as in the above polymers 1 to 4, when the water vapor transmission rate Y after molded into a film was investigated, the result was 7.8 (g/m²/24 hr).

In polymer 5, as described above, the melting point Tm was 165° C., and thus, Y should be in the range of $2.0 \leq Y \leq 5.6$. However, Y was not in that range.

That is, polymer 5 did not meet the above requirement (c) of the third associated invention.

Production Example 6

Production of Propylene Polymer [B] and Propylene/Ethylene Copolymerization

After the inside of a stirrer-equipped 200 L autoclave was thoroughly substituted by propylene, 60 L of purified n-heptane was introduced, then diethylaluminumchloride (40 g) and 7.5 g of a titanium trichloride catalyst available from Marubeni Solvay Co., Ltd. was introduced under a propylene atmosphere. Further, while the hydrogen concentration of a gas phase part was maintained at 7.0 vol %, a mixture gas of propylene and ethylene (propylene:ethylene=97.5:2.5 at ratio by weight) was introduced so that the pressure is 0.7 MPa at 60° C.

After stopping mixture gas introduction, reaction was further continued for 1 hour; 100 ml of butanol was added to the reaction mixture to stop the reaction was; and the residual gas component was purged, whereby 32 kg of a polymer was obtained. The thus obtained polymer is referred to as "polymer 6".

This polymer had 96.1 mol % of structural unit derived from propylene, and 3.9 mol % of structural unit derived from ethylene. This polymer met the above requirement (a) of the third associated invention.

This polymer 6 had the following properties: MFR=12; a melting point of 146° C.; 96% of isotactic triad fraction; 0% of position irregularity unit based on 2,1-insertion; 0% of position irregularity unit based on 1,3-insertion.

That is, this polymer 6 did not meet the above requirement (b) of the third associated invention.

The water vapor transmission rate Y after molding into a film was 15.0 (g/m²/24 hr).

In polymer 6, the melting point Tm was 146° C., and thus, Y should be in the range of $5.8 \leq Y \leq 11.8$. However, Y was not in that range.

That is, polymer 6 did not meet the above requirement (c) of the third associated invention.

The results of the above production examples 1 to 6 are shown in Table 5.

TABLE 5

|  |  | category of propylene polymer | | | | | |
| --- | --- | --- | --- | --- | --- | --- | --- |
|  |  | polymer 1 (propylene polymer [A]) | polymer 2 (propylene polymer [A]) | polymer 3 (propylene polymer [A]) | polymer 4 (propylene polymer [A]) | polymer 5 (propylene polymer [B]) | polymer 6 (propylene polymer [B]) |
| production example |  | production example 1 | production example 2 | production example 3 | production example 4 | production example 5 | production example 6 |
| composition of polymer | propylene (mol %) | 100 | 100 | 97 | 95.4 | 100 | 96.1 |
|  | ethylene (mol %) | — | — | 3 | — | — | 3.9 |
|  | 1-butene (mol %) | — | — | — | 4.6 | — | — |
| content of position irregularity unit (%) | [2, 1] insertion | 1.32 | 0.89 | 1.06 | 1.23 | 0 | 0 |
|  | [1, 3] insertion | 0.08 | 0.005 | 0.16 | 0.09 | 0 | 0 |
| melting point Tm (° C.) |  | 146 | 152 | 141 | 142 | 165 | 146 |
| water vapor transmission rate (g/m$^2$/24 hr) |  | 10.5 | 9.5 | 12 | 11.5 | 7.8 | 8.3 |
| mm fraction (%) |  | 99.7 | 99.8 | 99.2 | 99.3 | 97.6 | 97 |
| MFR (g/10 minutes) |  | 10 | 2 | 14 | 6 | 7 | 12 |

In the table, "—" in the "ethylene" and "1-butene" section indicates that a polymer has been produced without using "ethylene" or "1-butene".

As shown by the data in Table 5, polymers 1 to 4 meet the above requirement (a) to (c) of the third associated invention, and are equivalent to the above propylene polymer [A]. In addition, polymers 1 to 4 meets the above requirements (d) and (e) of the third associated invention.

On the other hand, polymers 5 and 6 meet the above requirement (a) of the third associated invention, but fail to meet the above requirements (b) and (c). That is, polymers 5 and 6 are equivalent to the above propylene polymer [B].

A description will be given with respect to Examples in which a polypropylene resin composition and polypropylene resin expanded particles were produced by using a variety of propylene polymers (polymers 1 to 6) obtained by the above production examples 1 to 6, and further, a molded article was produced by using the polypropylene resin expanded particles.

Example 31

Polymer 1 (propylene polymer [A]) obtained in Production Example 1 and polymer 5 (polypropylene polymer [B]) obtained in Production Example 5 were mixed at 90:10 (ratio by weight). Then, two antioxidants (0.05% by weight of trade name "Yoshinox BHT" available from Yoshitomi Pharmaceuticals Co., Ltd. and 0.10% by weight of trade name "Irganox 1010" available from Ciba Geigy Co., Ltd.) were added to this mixture, and the resultant polymer was extruded in a strand shape of 1 mm in size by a single screw extruder machine of 65 mm in size. Then, the extruded polymer was cooled in a water tank; and was cut into 2 mm in length, whereby a fine-granule pellet of a polypropylene resin composition was obtained.

When DSC measurement was performed for the thus obtained polypropylene resin composition, one endothermic peak was exhibited, and the peak temperature was 153° C.

Next, by using this polypropylene resin composition as a base resin, polypropylene resin expanded particles were fabricated as follows.

First, 1000 g of a pellet shaped polypropylene resin composition was put into a 5 L autoclave together with 2500 g of water, 200 g of calcium tertiary phosphate, 0.2 g of sodium dodecylbenzenesulfonate. Further, 120 g of isobutane as the above blowing agent was added, and the temperature was raised up to 140° C. over 60 minutes. Thereafter, the reaction mixture was maintained at this temperature for 30 minutes.

Thereafter, while supplying nitrogen gas into the autoclave so as to maintain the pressure at 2.3 MPa, a valve at the bottom part of the autoclave was opened. Then the contents were discharged into an atmosphere of air.

By the above operation, polypropylene resin expanded particles were obtained.

In addition, after drying the polypropylene resin particles, the bulk density was measured, the result was 42 g/L. In addition, the average foam size of the polypropylene resin expanded particles were 250 micron in its average size, which were very uniform.

The average size of the foam of the above polypropylene resin expanded particles indicates an average value of the size by selecting 50 foams at random by a micro graph (or an image obtained by picturing the sectional plane on a screen) obtained by observing with a microscope a sectional plane of the expanded particles cut so as to pass a substantial center part of the expanded particles.

Next, by using the above polypropylene resin expanded particles, a molded article was fabricated as follows.

First, the above obtained polypropylene resin expanded particles were sequentially charged under compression into an aluminum mold from a hopper by using compressed air. Then, heating and molding were carried out by introducing a steam of 0.30 MPa (gauge pressure) into the chamber of the mold, and a molded article was obtained.

This molded article had 0.060 g/cm$^3$ of density, a dimension of 300 mm vertical, 300 mm horizontal, and 50 mm in thickness. The molded article had little voids on the surface, having superior surface appearance free of irregularities. In addition, when the degree of fusion of a cross section was measured by breaking the article at the center of it, the result was 90%.

With respect to the above degree of fusion, after the molded article was broken, the number of particle breaks and the number of inter-particle breaks on its sectional plane were visually counted, and the counted breaks were expressed by a ratio of the number of particle breaks with respect to a total number of both of them.

In addition, a test specimen of a dimension of 50 mm vertical, 50 mm horizontal, and 25 mm in thickness was prepared from another molded article molded under the same molding condition. Then, a compression test was carried out in conformance with JIS K6767. The stress during 50% compression was 7.5 kg/cm$^2$. Further, using a test specimen of the same size, when a permanent set after compression was measured by the method described in JIS K6767, the result was 11%.

These results were shown in Table 6 below.

Examples 32 to 37 and Comparative Examples 31 and 32

Next, a composition of the polypropylene resin composition used as a base resin of propylene resin expanded particles was changed, and polypropylene resin expanded particles and a molded article were fabricated in the same manner as in Example 31.

As a base resin, there was used a polypropylene resin composition in which the polymers 1 to 6 obtained in the production examples 1 to 6 were prepared at the compositions described in Table 6.

Then, the polypropylene resin expanded particles and molded article were fabricated by using the above polypropylene resin composition, and evaluation of these was performed in the same manner as in Example 31.

The results are shown in Tables 6 and 7.

As shown by the data in Tables 6 and 7, in Examples 31 to 37 according to the present invention, it was found that foams of polypropylene resin expanded particles is very uniform; a molded article using them is high in degree of fusion; and further, the surface appearance is excellent. In addition, with respect to mechanical properties, the compression strength was high, and the permanent set after compression strain was small.

In contrast, in the case where the above polymer 1 obtained by Production Example 1 was used independently, the surface appearance of a molded article molded by using the obtained polypropylene resin expanded particles was poor (Comparative Example 31). In addition, in the case where the above polymer 5 obtained by Production Example 5 was used independently, the obtained polypropylene resin expanded particles were large in deviation of the size of foams (Comparative Example 32). Further, the molded article molded by using the polypropylene resin expanded particles were low in internal degree of fusion, and further, the surface appearance of the molded article was poor. Furthermore, the mechanical properties were insufficient (Comparative Example 32).

Now, Examples of the fourth associated invention will be described here.

TABLE 6

| | Example | | | | | | |
|---|---|---|---|---|---|---|---|
| | Example 31 | Example 32 | Example 33 | Example 34 | Example 35 | Example 36 | Example 37 |
| composition (ratio by weight) | polymer1/ polymer5 = 90/10 | polymer1/ polymer5 = 50/50 | polymer1/ polymer5 = 10/90 | polymer2/ polymer5 = 95/5 | polymer3/ polymer5 = 30/70 | polymer4/ polymer5 = 50/50 | polymer2/ polymer6 = 90/10 |
| melting point (° C.) of resin composition | 153 | 158 | 161 | 157 | 159 | 156 | 156 |
| foaming temperature (° C.) | 140 | 145 | 150 | 145 | 150 | 145 | 146 |
| bulk density of expanded particle (g/L) | 42 | 45 | 47 | 40 | 45 | 45 | 45 |
| condition of foam | average size 280 μm; highly uniform | average size 220 μm; highly uniform | average size 250 μm; highly uniform | average size 300 μm; highly uniform | average size 250 μm; highly uniform | average size 220 μm; highly uniform | average size 250 μm; highly uniform |
| density of expanded article (g/L) | 60 | 60 | 60 | 60 | 60 | 60 | 60 |
| steam pressure for molding (MPa) | 0.3 | 0.3 | 0.35 | 0.3 | 0.35 | 0.35 | 0.35 |
| degree of fusion (%) | 90 | 80 | 90 | 80 | 90 | 95 | 85 |
| appearance of molded article | ○ | ○ | ○ | ○ | ○ | ○ | ○ |
| compression test (kg/cm$^2$) | 7.5 | 8.3 | 9.1 | 8.4 | 8.8 | 8.5 | 12 |
| permanent set after compression (%) | 11 | 12 | 13 | 12 | 13 | 12 | 11 |

TABLE 7

| | Comparative Example 31 | Comparative Example 32 |
|---|---|---|
| composition (ratio by weight) | polymer1 = 100 | polymer5 = 100 |
| melting point (° C.) of resin composition | 146 | 165 |
| foaming temperature (° C.) | 135 | 150 |
| bulk density of expanded particle (g/L) | 45 | 46 |
| condition of foam | average size 210 μm; uniform | average size 170 μm; widely varied |
| density of expanded article (g/L) | 60 | 60 |
| steam pressure for molding (MPa) | 0.3 | 0.3 |
| degree of fusion (%) | 90 | 40 |
| appearance of the molded article | x~Δ | x |
| compression test (kg/cm$^2$) | 7.3 | 4.5 |
| permanent set after compression (%) | 11 | 16 |

[Production 1 of Propylene Polymer]

First, propylene polymers [A] and [B] constituting a polypropylene resin composition were synthesized by any of the methods shown in the following Production Examples 1 to 6.

Production Example 1

(i) Synthesis of [dimethylsilylenebis{1,1'-(2-methyl-4phenyl-4-hydroazulenyl)}zirconium dichloride]

All of the following reactions were performed in an inert gas atmosphere, and solvents were dried and purified before using in such reactions.
(a) Synthesis of racemic/meso mixture
(b) Separation of racemic body (ii) Synthesis of Catalyst (a) Treatment of Catalyst Carrier
(b) Preparation of Catalyst Component The above description is similar to that of Production Example 1 of the first associated invention.

(iii) Polymerization of Propylene (Production of Propylene Polymer A)

After a stirrer-equipped 200 L autoclave of was thoroughly substituted with propylene, 45 kg of dehydrated liquid propylene was introduced. Then, 500 mL (0.12 mol) of a hexane solution of triisobutyl aluminum and hydrogen (3NL) were introduced, and the internal temperature of the autoclave was raised up to 70° C.

Thereafter, the above solid catalyst component (1.7 g) was put into the autoclave with pressure of argon, polymerization was started, and polymerization reaction was carried out for 3 hours.

Thereafter, 100 mL of ethanol was put into the autoclave, the reaction was stopped, and the residual gas component was purged, whereby 14.1 kg of a polymer was obtained.

This polymer is 100 mol % in structural obtained from propylene, i.e., a propylene homopolymer. This polymer meets the above requirement (a) of the fourth associated invention.

In addition, this polymer had the following properties: MFR (melt flow rate)=10 g/10 minutes; 99.7% of isotactic triad fraction; a melting point of 146° C. measured by the DSC technique (the temperature was raised at a rate of 10° C./minute from 30° C.). The polymer met the above requirements (d) and (e) of the fourth associated invention. Further, a content of position irregularity unit based on 2,1-insertion was 1.32%; a content of position irregularity based on 1,3-insertion was 0.08%; and the above requirement (b) of the fourth associated invention was met.

Hereinafter, the thus obtained polypropylene polymer is referred to as "polymer 1".

(iv) Measurement of Water Vapor Transmission Rate

The above obtained polymer 1 was molded in a film of 25 micron in thickness, and the water vapor transmission rate Y was measured in accordance with the method described in JIS K 7129 (this applies to the following production examples). The result was 10.5 (g/m$^2$/24 hr).

In polymer 1, as described above, the melting point Tm was 146° C. From the above formula (1), Y should be in the range of $5.8 \leq Y \leq 11.8$. Y was in that range, meeting the above requirement (c) of the fourth associated invention.

Production Example 2

Production of Propylene Polymer [A] and Propylene Homopolymerization

After a stirrer-equipped 200 L autoclave was thoroughly substituted with propylene, 45 kg of dehydrated liquid propylene was introduced. Then, 500 mL (0.12 mol) of a hexane solution of triisobutyl aluminum and hydrogen (3NL) were introduced, and the internal temperature of the autoclave was raised up to 40° C.

Thereafter, the above solid catalyst component (3.0 g) was pressed-in with argon, polymerization was started, and polymerization reaction was performed for 3 hours.

Thereafter, 100 mL of ethanol was put into the autoclave, the reaction was stopped, and the residual gas component was purged, whereby 4.4 kg of a polymer was obtained.

This polymer is 100 mol % in structural obtained from propylene, i.e., a propylene homopolymer. This polymer meets the above requirement (a) of the fourth associated invention.

In addition, this polymer had the following properties: MFR=2; 99.8% of isotactic triad fraction; a melting point of 152° C. measured by the DSC technique (the temperature was raised at a rate of 10° C./minute from 30° C.). The polymer met the above requirements (d) and (e) of the fourth associated invention. Further, a content of position irregularity unit based on 2,1-insertion was 0.89%; a content of position irregularity based on 1,3-insertion was 0.005%; and the above requirement (b) of the fourth associated invention was met.

Hereinafter, the thus obtained polypropylene polymer is referred to as "polymer 2".

In addition, with respect to the polymer 2, when the water vapor transmission rate Y when the polymer is molded in film was investigated as in the above polymer 1, the rate Y was 9.5 (g/m$^2$/24 hr).

In polymer 2, as described above, the melting point Tm was 152° C. Thus, from the above formula (1), Y should be in the range of $4.6 \leq Y \leq 9.8$. Y was in that range, and thus, met the above requirement (c) of the fourth associated invention.

Production Example 3

Production of Propylene Polymer [A] and Propylene/Ethylene Copolymerization

After the inside of a stirrer-equipped 200 L autoclave was thoroughly substituted with propylene, 60 L of purified n-heptane was introduced. 500 mL (0.12 mol) of a hexane solution of triisobutyl aluminum was added, and the internal temperature of the autoclave was raised up to 70° C. Thereafter, the solid catalyst component (9.0 g) was added; a gas mixture of propylene and ethylene (propylene:ethylene-97.5:2.5 ratio by weight) was introduced so that the pressure becomes 0.7 MPa; and polymerization reaction was performed for 3 hours under this condition.

Thereafter, 100 mL of ethanol was put into the autoclave, the reaction was stopped, and the residual gas component was purged, whereby 9.3 kg of a polymer was obtained.

In this polymer, the content of the structural unit derived from propylene was 97.0 mol %, and the content of the structural unit derived from ethylene was 3.0 mol %. This value met the above requirement (a) of the fourth associated invention.

In addition, this polymer had the following properties: MFR=14; 99.2% of isotactic triad fraction; a melting point of 141° C. measured by the DSC technique (the temperature was raised at a rate of 10° C./minute from 30° C.). The polymer met the above requirements (d) and (e) of the fourth associated invention. Further, a content of position irregularity unit based on 2,1-insertion was 1.06%; a content of position irregularity unit based on 1,3-insertion was 0.16%; and the above requirement (b) of the fourth associated invention was met.

Hereinafter, the thus obtained polypropylene polymer is referred to as "polymer 3".

In addition, with respect to the polymer 3, when the water vapor transmission rate Y when the polymer is molded in film was investigated as in the above polymers 1 and 2, the rate Y was 12.0 (g/m$^2$/24 hr).

In polymer 3, as described above, the melting point Tm was 141° C. Thus, from the above formula (1), Y should be in the range of 6.8≦Y≦13.5. Y was in that range, and thus, met the above requirement (c) of the fourth associated invention.

Production Example 4

Production of Propylene Polymer [A] and Propylene/1-Butene Copolymerization

After the inside of a stirrer-equipped 200 L autoclave was thoroughly substituted with propylene, 60 L of purified n-heptane was introduced. 500 mL (0.12 mol) of a hexane solution of triisobutyl aluminum was added, and the internal temperature of the autoclave was raised up to 70° C. Thereafter, the solid catalyst component (9.0 g) was added; a gas mixture of propylene and 1-butene (propylene:1-butene 90:10 ratio by weight) was introduced so that the pressure becomes 0.6 MPa; polymerization was started; and polymerization reaction was performed for 3 hours under this condition.

Thereafter, 100 mL of ethanol was put into the autoclave, the reaction was stopped, and the residual gas component was purged, whereby 8.6 kg of a polymer was obtained.

In this polymer, the content of the structural unit derived from propylene was 95.4 mol %, and the content of the structural unit derived from ethylene was 4.6 mol %. This value met the above requirement (a) of the fourth associated invention.

In addition, this polymer had the following properties: MFR=6; a melting point of 142° C. measured by the DSC technique (the temperature was raised at a rate of 10° C./minute from 30° C.); 99.3% of isotactic triad fraction. Thereby the polymer met the above requirements (d) and (e) of the fourth associated invention. Further, a content of position irregularity unit based on 2,1-insertion was 1.23%; a content of position irregularity unit based on 1,3-insertion was 0.09%; and the above requirement (b) of the fourth associated invention was met.

Hereinafter, the thus obtained polypropylene polymer is referred to as "polymer 4".

In addition, with respect to the polymer 4, when the water vapor transmission rate Y when the polymer is molded in film was investigated as in the above polymers 1 to 3, the rate Y was 11.5 (g/m$^2$/24 hr).

In polymer 4, as described above, the melting point Tm was 142° C. Thus, from the above formula (1), Y should be in the range of 6.6≦Y≦13.1. Y was in that range, and thus, met the above requirement (c) of the fourth associated invention.

Production Example 5

Production of Propylene Polymer [B] and Propylene Homopolymerization

After the inside of the stirrer-equipped 200 L autoclave was thoroughly substituted with propylene, 60 L of purified n-heptane was introduced, and diethyl aluminum chloride (45 g) and 11.5 g of a titanium trichloride catalyst available from Marubeni Solvay Co., Ltd. was introduced under a propylene atmosphere. Further, while the hydrogen concentration of a gas phase part was maintained at 7.0% by volume, propylene was introduced in the autoclave at the autoclave internal temperature of 60° C. over 4 hours at a rate of 9 kg/hour.

After propylene introduction was stopped, reaction was further continued for 1 hour; 100 mL of butanol was added to the autoclave; the reaction was stopped; and the residual gas was purged, whereby 26 kg of a polymer was obtained. The thus obtained polymer is referred to as "polymer 5".

This polymer is 100 mol % in structural unit derived from propylene, that is, is a propylene homopolymer. This polymer met the above requirement (a) of the fourth associated invention.

This polymer had the following properties: MFR=7; a melting point of 165° C.; 97.6% of isotactic triad fraction; 0% of position irregularity unit based on 2,1-insertion; 0% of position irregularity unit based on 1,3-insertion.

That is, this polymer did not meet the above requirement (b) of the fourth associated invention. Hereinafter, the polymer obtained here is defined as "polymer 5".

With respect to polymer 5, as in the above polymers 1 to 4, when the water vapor transmission rate Y after molded in film was investigated, the result was 7.8 (g/m$^2$/24 hr). In polymer 5, as described above, the melting point Tm was 165° C., and thus, Y should be in the range of 2.0≦Y≦5.6. However, Y was not in that range.

That is, polymer 5 did not meet the above requirement (c) of the fourth associated invention.

Production Example 6

Production of Propylene Polymer [B] and Propylene/Ethylene Copolymerization

After the inside of the stirrer-equipped 200 L autoclave was thoroughly substituted with propylene, 60 L of purified n-heptane was introduced, and diethyl aluminum chloride (40 g) and 7.5 g of a titanium trichloride catalyst available from Marubeni Solvay Co., Ltd. was introduced under a propylene atmosphere. Further, while the hydrogen concentration of a gas phase part was maintained at 7.0% by volume, a gas mixture of propylene and ethylene (propylene:ethylene=97.5:2.5 at ratio by weight) was introduced at the autoclave internal temperature of 60° C. so that the pressure becomes 0.7 MPa.

After the gas mixture introduction was stopped, reaction was further continued for 1 hour; 100 mL of butanol was added to the autoclave; the reaction was stopped; and the residual gas was purged, whereby 32 kg of a polymer was obtained. The thus obtained polymer is referred to as "polymer 6".

This polymer had 96.4 mol % of structural unit derived from propylene, and 3.9 mol % of structural unit derived from ethylene. This polymer met the above requirement (a) of the fourth associated invention.

This polymer 6 had the following properties: MFR=12; a melting point of 146° C.; 97.0% of isotactic triad fraction; 0% of position irregularity unit based on 2,1-insertion; 0% of position irregularity unit based on 1,3-insertion.

That is, this polymer 6 did not meet the above requirement (b) of the fourth associated invention.

The water vapor transmission rate Y after molded in film was investigated as in the above polymers 1 to 5, and the rate Y was 15.0 (g/m²/24 hr). In polymer 6, the melting point Tm was 146° C., and thus, Y should be in the range of $5.8 \leq Y \leq 11.8$. However, Y was not in that range.

That is, polymer 6 did not meet the above requirement (c) of the fourth associated invention.

The results of the above production examples 1 to 6 are shown in Table 8.

a melting point was defined with a peak temperature on an endothermic curve obtained by rising a temperature to 220° C. at a rate of 10° C./minute again.

Example 41

By using a single screw extruder of 65 mm in internal diameter, polymer 1 obtained in Production Example 1 and polymer 5 obtained in Production Example 5 were mixed at a weight ratio of 90:10; then two antioxidants (0.05% by weight of trade name "Yoshinox BHT" available from Yoshitomi Pharmaceuticals, Co., Ltd.) and 0.10% by weight trade name "Irganox 1010" available from Ciba Geigy Co., Ltd.) were added for kneading. Meanwhile linear low density polyethylene (LLDPE) with density of 0.920 g/cm³ and a melting point of 121° C. was kneaded by using a single screw extruder of 30 mm in internal diameter.

Next, from a die having a die orifice of 1.5 mm in size, the above kneaded polymer 1 and 5 was applied as a material for

TABLE 8

| | | category of propylene polymer | | | | | |
|---|---|---|---|---|---|---|---|
| | | polymer 1 propylene polymer [A] | polymer 2 propylene polymer [A] | polymer 3 propylene polymer [A] | polymer 4 propylene polymer [A] | polymer 5 propylene polymer [B] | polymer 6 propylene polymer [B] |
| production example | | production example 1 | production example 2 | production example 3 | production example 4 | production example 5 | production example 6 |
| composition of polymer | propylene (mol %) | 100.0 | 100.0 | 97.0 | 95.4 | 100.0 | 96.4 |
| | ethylene (mol %) | — | — | 3.0 | — | — | 3.6 |
| | 1-butene (mol %) | — | — | — | 4.6 | — | — |
| content of position irregularity unit (%) | [2, 1] insertion | 1.32 | 0.89 | 1.06 | 1.23 | 0 | 0 |
| | [1, 3] insertion | 0.08 | 0.005 | 0.16 | 0.09 | 0 | 0 |
| melting point Tm (° C.) | | 146 | 152 | 141 | 142 | 165 | 146 |
| water vapor transmission rate (g/m²/24 hr) | | 10.5 | 9.5 | 12.0 | 11.5 | 7.8 | 15.0 |
| [mm] fraction (%) | | 99.7 | 99.8 | 99.2 | 99.3 | 97.6 | 97.0 |
| MFR (g/10 minutes) | | 10 | 2 | 14 | 6 | 7 | 12 |

In the table, "—" in the "ethylene" and "1-butene" section indicates that a polymer has been produced without using "ethylene" or "1-butene".

As shown by the date in Table 8, polymers 1 to 4 meet the above requirement (a) to (c) of the fourth associated invention, and are equivalent to the above propylene polymer [A]. In addition, polymers 1 to 4 further meet the above requirements (d) and (e) of the fourth associated invention.

On the other hand, polymers 5 and 6 meet the above requirement (a) of the fourth associated invention, but fails to meet the above requirements (b) and (c). That is, polymers 5 and 6 are equivalent to the above propylene polymer [B].

A description will be given with respect to Examples in which a polypropylene resin composition and polypropylene resin expanded particles were produced by using various propylene polymers (polymers 1 to 6) obtained by the above production examples 1 to 6, and further, a molded article was produced by using the polypropylene resin expanded particles.

It should be noted that, in each of the examples below, a melting point was determined as follows:

<Melting Point>; By using a differential scanning calorimeter (DSC), the temperature of 3 mg to 5 mg of sample consisting of a propylene polymer obtained in accordance with each of the above described production examples 1 to 6 or a resin of a coat layer written in Tables 9 and 10 to be described later, was raised up to 220° C. from 30° C. at a rate of 10° C./minute. Then, the temperature was lowered to 30° C. at a rate of 10° C./minute, and further, a core layer, the linear low density polyethylene was applied as a coat layer, and these layers were extruded in a strand shape.

Further, this strand was cooled through a water tank; the cooled strand was cut so that the weight of one piece is 1.0 mg, and a fine granule pellet was obtained as resin particles. When these resin particles were observed by a phase contrast microscope, the structure of them was such that a core layer was coated by a coat layer with thickness of 30 micron (refer to FIG. 1 of the first associated invention).

When DSC measurement of the thus obtained fine granule pellet was performed a portion obtained from a propylene polymer exhibits one endothermic peak, and its peak temperature was 153° C.

Next, in order to obtain the above resin particles as expanded particles, 1000 g of the above fine granule, pellet was put into a 5 L autoclave together with 2500 g of water, 36 g of calcium tertiary phosphate, and 40 g of sodium dodecylbenzenesulfonate (2% water solution). Further, 180 g of isobutane was added, the temperature was raised up to 140° C. over 60 minutes, and the reaction mixture was maintained at this temperature for 30 minutes.

Then, while supplying nitrogen gas into the autoclave so as to maintain the pressure at 2.3 MPa, a valve at the bottom part of the autoclave was opened. Then contents were discharged into an atmosphere of air, and foaming was carried out.

After drying the expanded particles obtained by the above operation, the bulk density was measured, the result was 45 g/L. In addition, the average size of the foam of the particles was 270 micron, which was very uniform.

The average size of the foam of the above polypropylene resin expanded particles indicates an average value of the size by selecting 50 foams at random on a micro graph (or an image obtained by picturing the sectional plane on a screen) obtained by observing with a microscope a sectional plane of the expanded particles cut so as to pass a substantial center part of the expanded particles in random.

Next, the above obtained propylene resin expanded particles were sequentially charged under compression into an aluminum mold from a hopper by using compressed air. Thereafter, heating and molding were carried out by introducing a steam of 0.16 MPa (gauge pressure) into the chamber of the mold, and a molded article was obtained.

The molded article had 60 kg/m³ of density, a dimension of 300 mm vertical, 300 mm horizontal, and 50 mm in thickness. The molded article had little voids on the surface having superior surface appearance free of irregularities. In addition, the degree of fusion was 90%, and shrinking percentage of the mold dimensions was 1.6%.

In addition, after a test specimen of a dimension of 50 mm vertical, 50 mm horizontal, and 25 mm in thickness was prepared from another molded article molded under the same molding condition, when a compression test was carried out in conformance with JIS K7220, the stress during 50% compression was 0.73 MPa. Further, using a testing specimen of the same size, when a permanent set after compression was measured in accordance with the method described in JIS K6767, the result was 11%.

In addition, a test piece of a dimension of 200 mm vertical, 30 mm horizontal, and 12.5 mm in thickness was prepared from another molded article molded under the same molding condition. This test specimen was cut, the number of particle breaks and the number of inter-particle breaks on its sectional plane were visually measured, and a rate (%) of particle breaks with respect to a total number of both of these breaks was defined as the degree of fusion.

Further, the degree of dimensional change after heating at 110° C. was measured in conformance with JIS K6767, and was judged based on the following criteria (heat resistance test)

◯: The degree of dimensional change after heating was lower than 3%.

Δ: The degree of dimensional change after heating was 3% to 6%.

X: The degree of dimensional change after heating exceeds 6%. The result is shown in Table 9 below.

Examples 42 to 50 and Comparative Examples 41 and 42

Polypropylene resin expanded particles and a molded article thereof were fabricated in the same manner as in Example 41 except that polymers 1 to 6 described in Table 8 were prepared by compositions shown in Tables 9 to 11, and a resin forming a coat layer is used as those described in Tables 9 to 11. The results are as shown in Tables 9 to 11.

TABLE 9

| | | | Example | | | | | |
|---|---|---|---|---|---|---|---|---|
| | | | Example 41 | Example 42 | Example 43 | Example 44 | Example 45 | Example 46 |
| poly-propylene resin expanded particle | core layer | composition (ratio by weight) | polymer1/ polymer5 = 90/10 | polymer1/ polymer5 = 50/50 | polymer1/ polymer5 = 10/90 | polymer1/ polymer5 = 10/90 | polymer2/ polymer5 = 95/5 | polymer3/ polymer5 = 30/70 |
| | | melting point (° C.) of composite | 153 | 158 | 161 | 161 | 96.4 | 159 |
| | coat layer | resin for coat layer | LLDPE | LLDPE | LLDPE | HIPS | LLDPE | LLDPE |
| | | density (g/cm³) | 0.92 | 0.92 | 0.92 | 1.05 | 0.92 | 0.92 |
| | | melting point (° C.) | 121 | 121 | 121 | none | 121 | 121 |
| | | thickness of coat layer (μ) | 30 | 30 | 60 | 30 | 30 | 30 |
| | weight of composite particle per particle (mg) | | 1 | 1 | 1 | 1 | 1 | 1 |
| | foaming temperature (° C.) | | 140 | 145 | 150 | 150 | 145 | 150 |
| | average bulk density of expanded particle (g/L) | | 45 | 45 | 45 | 45 | 45 | 45 |
| | average size of foam (μ) | | 270 | 250 | 240 | 240 | 280 | 270 |
| | condition of foam | | highly uniform | highly uniform | highly uniform | highly uniform | highly uniform | highly uniform |
| expanded molded article | steam pressure for molding (MPa) | | 0.16 | 0.17 | 0.19 | 0.17 | 0.17 | 0.19 |
| | density of molded article (kg/m³) | | 60 | 60 | 60 | 60 | 60 | 60 |
| | appearance of molded article | | ◯ | ◯ | ◯ | ◯ | ◯ | ◯ |
| | mold-to-part shrinkage (%) | | 1.6 | 1.7 | 1.8 | 1.8 | 1.7 | 1.8 |
| | degree of fusion (%) | | 90 | 90 | 90 | 90 | 90 | 90 |
| | compression test (MPa) | | 0.73 | 0.86 | 0.91 | 0.92 | 0.84 | 0.87 |
| | permanent set after compression (%) | | 11 | 11 | 12 | 12 | 11 | 11 |
| | heat resistance test | | ◯ | ◯ | ◯ | ◯ | ◯ | ◯ |

LLDPE: Linear Low Density Polyethylene [density: 0.920 g/cm³ and melting point 121° C.]
HIPS: HIPA grade name "HT60" available from A and M Polystyrene Co., Ltd.

TABLE 10

|  | Example 47 | Example 48 | Comparative Example 41 | Comparative Example 42 |
|---|---|---|---|---|
| polypropylene resin expanded particle | | | | |
| core layer | | | | |
| composition (ratio by weight) | polymer4/polymer5 = 50/50 | polymer2/polymer6 = 90/10 | polymer1 = 100 | polymer5 = 100 |
| melting point (° C.) of composite | 156 | 156 | 146 | 165 |
| coat layer | | | | |
| resin for coat layer | LLDPE | LLDPE | LLDPE | LLDPE |
| density (g/cm³) | 0.92 | 0.92 | 0.92 | 0.92 |
| melting point (° C.) | 121 | 121 | 121 | 121 |
| thickness of coat layer (μ) | 30 | 30 | 30 | 30 |
| weight of composite particle per particle (mg) | 1 | 1 | 1 | 1 |
| foaming temperature (° C.) | 145 | 145 | 135 | 150 |
| average bulk density of expanded particle (g/L) | 45 | 45 | 45 | 45 |
| average size of foam (μ) | 260 | 280 | 210 | 170 |
| condition of foam expanded molded article | highly uniform | highly uniform | highly uniform | highly uniform |
| steam pressure for molding (MPa) | 0.16 | 0.16 | 0.16 | 0.16 |
| density of molded article (kg/m³) | 60 | 60 | 60 | 60 |
| appearance of molded article | ○ | ○ | ○ | ○ |
| mold-to-part shrinkage (%) | 1.8 | 1.8 | 2 | 2 |
| degree of fusion (%) | 90 | 90 | 90 | 40 |
| compression test (MPa) | 0.83 | 0.84 | 0.68 | 0.41 |
| permanent set after compression (%) | 11 | 12 | 12 | 17 |
| heat resistance test | ○ | ○ | Δ | ○ |

LLDPE: Linear Low Density Polyethylene [density: 0.920 g/cm³ and melting point 121° C.]

TABLE 11

|  | Example 49 | Example 50 |
|---|---|---|
| polypropylene resin expanded particle | | |
| core layer | | |
| composition (ratio by weight) | polymer1/polymer5 = 90/10 | polymer1/polymer5 = 90/10 |
| melting point (° C.) of composite | 153 | 153 |
| coat layer | | |
| resin for coat layer | composition A | LLDPE2 |
| thickness of coat layer (μ) | 30 | 30 |
| weight of composite particle per particle (mg) | 1 | 1 |
| foaming temperature (° C.) | 140 | 140 |
| average bulk density of expanded particle (g/L) | 45 | 45 |
| average size of foam (μ) | 270 | 270 |
| condition of foam expanded molded article | highly uniform | highly uniform |
| steam pressure for molding (MPa) | 0.18 | 0.12 |
| density of molded article (kg/m³) | 60 | 60 |
| appearance of molded article | ○ | ○ |
| mold-to-part shrinkage (%) | 1.6 | 1.6 |
| degree of fusion (%) | 90 | 90 |
| compression test (MPa) | 0.72 | 0.69 |
| permanent set after compression (%) | 11 | 11 |
| heat resistance test | ○ | ○ | composition A:
(1) Linear low density polyethylene (density 0.920 and melting point 120° C.) [100 parts by weight]
(2) "Polymer1" obtained in Production Example 1 [10 parts by weight]
(3) "Polymer5" obtained in Production Example 5 [10 parts by weight]
LLDPE2: Linear Low Density Polyethylene (density 0.907 and melting point 100° C.)

As shown by the data in Tables 9 to 11, in the case of using, as a material of the above core layer, only a resin obtained from the above Production Examples 1 and 5 (Comparative Examples 541 to 42), a molded article that was molded by the obtained polypropylene resin expanded particles was inferior in heat resistance (Comparative Example 41) and in surface appearance (Comparative Example 42).

As to polypropylene resin expanded particles obtained from the above Comparative Example 42, the size of the foams were not uniform. In addition, the molded article molded by using the polypropylene resin particles was poor in surface appearance and insufficient in the mechanical properties.

In contrast, in Examples 41 to 50 according to the present invention, it was found that the size of the foams of polypropylene resin expanded particles were very uniform; the degree of fusion of the molded article using the particles was high; and further, the surface appearance was excellent. Further, with respect to the mechanical properties, the compression strength was high, the compression set was small, and further, heat resistance was excellent.

Now, Examples of the fifth associated invention will be described here.

[Production 1 of Propylene Polymer]

First, propylene polymers as the base resin were synthesized by any of the methods shown in the following Production Examples 1 to 4.

Production Example 1

(i) Synthesis of [dimethylsilylenebis{1,1'-(2-methyl-4phenyl-4-hydroazulenyl)}zirconium dichloride]

All of the following reactions were performed in an inert gas atmosphere, and solvents were dried and purified before using in such reactions.
(a) Synthesis of racemic/meso mixture
(b) Separation of racemic isomer (ii) Synthesis of Catalyst (a) Treatment of Catalyst Carrier
(b) Preparation of Catalyst Component
The above description is similar to that of Production Example 1 of the first associated invention.

(iii) Polymerization of Propylene

After substituting the inside of a stirrer-equipped 200 L autoclave with propylene, 45 kg of dehydrated liquid propylene was added. Then, 500 mL (0.12 mol) of hexane solution of triisobutyl aluminum and hydrogen (3NL) were added, and the internal temperature of the autoclave was raised up to 70° C.

Thereafter, the above solid catalyst component (1.7 g) was put into the autoclave with pressure of argon, polymerization was started, and polymerization reaction was performed for 3 hours.

Thereafter, 100 mL of ethanol was put into the autoclave, the reaction was stopped, and the residual gas component was purged, whereby 14.1 kg of a polymer was obtained.

This polymer is 100 mol % in structural unit derived from propylene, i.e., is a propylene homopolymer. This polymer meets the above requirement (a) of the fifth associated invention.

In addition, this polymer had the following properties: MFR (melt flow rate)=10 g/10 minutes; 99.7% of isotactic triad fraction; a melting point of 146° C. measured by the DSC technique (the temperature was raised at a rate of 10° C./minute from 30° C.). The polymer met the above requirements (d) and (e) of the fifth associated invention. Further, a content of position irregularity unit based on 2,1-insertion was 1.32%; a content of position irregularity based on 1,3-insertion was 0.08%; and the above requirement (b) of the fifth associated invention was met.

Hereinafter, the thus obtained polymer is referred to as "polymer 1".

(iv) Measurement of Water Vapor Transmission Rate

The above obtained polymer 1 was molded into a film of 25 micron in thickness, and the water vapor transmission rate Y was measured in accordance with the method described in JIS K 7129 (this applies to the following production examples). The result was 10.5 (g/m²/24 hr).

In this polymer 1, as described above, the melting point Tm was 146° C. From the above formula (1), Y should be in the range of $5.8 \leq Y \leq 11.8$. Y was in that range, and met the above requirement (c) of the fifth associated invention.

Production Example 2

Propylene Homopolymerization

After the inside of a stirrer-equipped 200 L autoclave was fully substituted with propylene, 45 kg of dehydrated liquid propylene was added. Then, 500 mL (0.12 mol) of a hexane solution of triisobutyl aluminum and hydrogen (3NL) were added, and the internal temperature of the autoclave was raised up to 40° C.

Thereafter, the above solid catalyst component (3.0 g) was put into the autoclave with a pressure of argon, polymerization was started, and polymerization reaction was performed for 3 hours.

Thereafter, 100 mL of ethanol was put into the autoclave the reaction was stopped, and the residual gas component was purged, whereby 4.4 kg of a polymer was obtained.

This polymer is 100 mol % in structural unit derived from propylene, i.e., a propylene homopolymer. This polymer meets the above requirement (a) of the fifth associated invention.

In addition, this polymer had the following properties: MFR=2; 99.8% of isotactic triad fraction; a melting point of 152° C. measured by the DSC technique (the temperature was raised at a rate of 10° C./minute from 30° C.). The polymer met the above requirements (d) and (e) of the fifth associated invention. Further, a content of position irregularity unit based on 2,1-insertion was 0.89%; a content of position irregularity based on 1,3-insertion was 0.005%; and the above requirement (b) of the fifth associated invention was met.

Hereinafter, the thus obtained polypropylene polymer is referred to as "polymer 2".

In addition, with respect to the polymer 2, when the water vapor transmission rate Y when the polymer is molded into a film was investigated as in the above polymer 1, the rate was 9.5 (g/m²/24 hr).

In polymer 2, as described above, the melting point Tm was 152° C. Thus, from the above formula (1), Y should be in the range of $4.6 \leq Y \leq 9.8$. Y was in that range, and thus, met the above requirement (c) of the fifth associated invention.

Production Example 3

Propylene/Ethylene Copolymerization

After the inside of a stirrer-equipped 200 L autoclave was thoroughly substituted with propylene, 60 L of purified n-heptane was added. 500 mL (0.12 mol) of a hexane solution of triisobutyl aluminum was added, and the internal temperature of the autoclave was raised up to 70° C. Thereafter, the solid catalyst component (9.0 g) was added; a mixture gas of propylene and ethylene (propylene:ethylene=97.5:2.5 at a ratio by weight) was added so that the pressure is 0.7 MPa; polymerization was started; and polymerization reaction was performed for 3 hours under this condition.

Thereafter, 100 mL of ethanol was put into the autoclave, the reaction was stopped, and the residual gas component was purged, whereby 9.3 kg of a polymer was obtained.

In this polymer, the content of the structural unit derived from propylene was 97.0 mol %, and the content of the structural unit derived from ethylene was 3.0 mol %. This value met the above requirement (a) of the fifth associated invention.

In addition, this polymer had the following properties: MFR=14 g/10 minutes; 99.2% of isotactic triad fraction; a melting point of 141° C. measured by the DSC technique (the temperature was raised at a rate of 10° C./minute from 30° C.). The polymer met the above requirements (d) and (e) of the fifth associated invention. Further, a content of position irregularity unit based on 2,1-insertion was 1.06%; a content of position irregularity based on 1,3-insertion was 0.16%; and the above requirement (b) of the fifth associated invention was met.

Hereinafter, the thus obtained polymer is referred to as "polymer 3".

In addition, with respect to the polymer 3, when the water vapor transmission rate Y when the polymer is molded into a film was investigated as in the above polymers 1 and 2, the rate was 12.0 (g/m$^2$/24 hr).

In polymer 3, as described above, the melting point Tm was 141° C. Thus, from the above formula (1), Y should be in the range of $6.8 \leq Y \leq 13.5$. Y was in that range, and thus, met the above requirement (c) of the fifth associated invention.

Production Example 4

Propylene/1-Butene Copolymerization

After the inside of a stirrer-equipped 200 L autoclave was thoroughly substituted with propylene, 60 L of purified n-heptane was added. 500 mL (0.12 mol) of a hexane solution of triisobutyl aluminum was added, and the internal temperature of the autoclave was raised up to 70° C. Thereafter, the solid catalyst component (9.0 g) was added; a mixture gas of propylene and 1-butene (propylene:1-butene 90:10 at a ratio by weight) was added so that the pressure is 0.6 MPa; polymerization was started; and polymerization reaction was performed for 3 hours under this condition.

Thereafter, 100 mL of ethanol was put into the autoclave, the reaction was stopped, and the residual gas component was purged, whereby 8.6 kg of a polymer was obtained.

In this polymer, the content of the structural unit derived from propylene was 95.4 mol %, and the content of the structural unit derived from butene was 4.6 mol %. This value met the above requirement (a) of the fifth associated invention.

In addition, this polymer had the following properties: MFR=6 g/10 minutes; a melting point of 142° C. measured by the DSC technique (the temperature was raised at a rate of 10° C./minute from 30° C.); 99.3% of isotactic triad fraction. The polymer met the above requirements (d) and (e) of the fifth associated invention. Further, a content of position irregularity unit based on 2,1-insertion was 1.23%; a content of position irregularity based on 1,3-insertion was 0.09%; and the above requirement of the fifth associated invention (b) was met.

Hereinafter, the thus obtained polypropylene is referred to as "polymer 4".

In addition, with respect to the polymer 4, when the water vapor transmission rate Y when the polymer is molded into a film was investigated as in the above polymers 1 to 3, the rate was 11.5 (g/m$^2$/24 hr).

In polymer 4, as described above, the melting point Tm was 142° C. Thus, from the above formula (1), Y should be in the range of $6.6 \leq Y \leq 13.1$. Y was in that range, and thus, met the above requirement (c) of the fifth associated invention.

Production Example 5

After the inside of a stirrer-equipped 200 L autoclave was thoroughly substituted with propylene, 60 L of purified n-heptane was added, and diethyl aluminum chloride (45 g) and 11.5 g of a titanium trichloride catalyst available from Marubeni Solvay Co., Ltd. was added under a propylene atmosphere. Further, while a hydrogen concentration of a gas phase part was maintained to be 7.0% by volume, propylene was added in the autoclave at the autoclave internal temperature of 65° C. for 4 hours at a rate of 9 kg/hour.

After propylene introduction was stopped, reaction was further continued for 1 hour; 100 mL of butanol was added to the reaction mixture to stop reaction; and the residual gas content was purged, whereby 30 kg of a polymer was obtained.

This polymer is 100 mol % in structural unit derived from propylene, that is, is a propylene homopolymer. This polymer met the above requirement (a) of the fifth associated invention.

This polymer had the following properties: MFR=10 g/10 minutes; a melting point of 160° C. measured by DSC technique (the temperature was raised at a rate of 10° C./minute from 30° C.); 97.0% of isotactic triad fraction.

In addition, this polymer had 0% of position irregularity unit based on 2,1-insertion and 0% of position irregularity unit based on 1,3-insertion.

That is, this polymer did not meet the above requirement (b) of the fifth associated invention.

Hereinafter, the thus obtained polymer is referred to as "polymer 5".

With respect to polymer 5, as in the above polymers 1 to 4, when the water vapor transmission rate Y after molded into a film was investigated, the result was 10.0 (g/m$^2$/24 hr).

In polymer 5, as described above, the melting point Tm was 160° C., and thus, Y should be in the range of $3.0 \leq Y \leq 7.2$. However, Y was not in that range.

That is, polymer 5 did not meet the above requirement (c) of the fifth associated invention.

Production Example 6

After the inside of a stirrer-equipped 200 L autoclave was thoroughly substituted with propylene, 60 L of purified n-heptane was added, and diethyl aluminum chloride (40 g) and 7.5 g of a titanium trichloride catalyst available from Marubeni Solvay Co., Ltd. was added under a propylene atmosphere. Further, while the hydrogen concentration of a gas phase part was maintained at 7.0% by volume, a mixture gas of propylene and ethylene (propylene:ethylene=97.5:2.5 in ratio by weight) was added in the autoclave at 60° C. so that the pressure is 0.7 MPa.

After mixture gas introduction was stopped, reaction was further continued for 1 hour; 100 mL of butanol was added to the reaction mixture to stop reaction; and the residual gas component was purged, whereby 32 kg of a polymer was obtained.

This polymer had the following properties: MFR=12 g/10 minutes; a melting point of 146° C. measured by DSC technique (the temperature was raised at a rate of 10° C./minute from 30° C.; and 96.0% of isotactic triad fraction.

In addition, this polymer had 0% of position irregularity unit based on 2,1-insertion and 0% of position irregularity unit based on 1,3-insertion. That is, this polymer 6 did not meet the above requirement (b) of the fifth associated invention.

Hereinafter, the thus obtained polymer is referred to as "polymer 6".

With respect to the polymer 6, when the water vapor transmission rate Y after molded into film was investigated in the same manner as in the above polymers 1 to 5, the result was 15.0 (g/m$^2$/24 hr).

In polymer 6, the melting point Tm was 146° C., and thus, Y should be in the range of $5.8 \leq Y \leq 11.8$. However, Y was not in that range.

That is, polymer 6 did not meet the above requirement (c) of the fifth associated invention.

The results of the above production examples 1 to 6 are shown in Table 12.

Thereafter, while supplying nitrogen gas into the autoclave so as to maintain the pressure at 2.3 MPa, a valve at the bottom part of the autoclave was opened. Then the contents were discharged into an atmosphere of air.

TABLE 12

| | | category of propylene polymer | | | | | |
|---|---|---|---|---|---|---|---|
| | | polymer 1 | polymer 2 | polymer 3 | polymer 4 | polymer 5 | polymer 6 |
| production example | | production example 1 | production example 2 | production example 3 | production example 4 | production example 5 | production example 6 |
| composition of polymer | propylene (mol %) | 100.0 | 100.0 | 97.0 | 95.4 | 100.0 | 96.4 |
| | ethylene (mol %) | — | — | 3.0 | — | — | 3.6 |
| | 1-butene (mol %) | — | — | — | 4.6 | — | — |
| content of position | [2, 1] insertion | 1.32 | 0.89 | 1.06 | 1.23 | 0 | 0 |
| irregularity unit (%) | [1, 3] insertion | 0.08 | 0.005 | 0.16 | 0.09 | 0 | 0 |
| melting point Tm (° C.) | | 146 | 152 | 141 | 142 | 160 | 146 |
| water vapor transmission rate (g/m$^2$/24 hr) | | 10.5 | 9.5 | 12.0 | 11.5 | 10.0 | 15.0 |
| [mm] fraction (%) | | 99.7 | 99.8 | 99.2 | 99.3 | 97.0 | 96.0 |
| MFR (g/10 minutes) | | 10 | 2 | 14 | 6 | 10 | 12 |

In the table, "—" in the "ethylene" and "1-butene" section indicates that a polymer has been produced without using "ethylene" or "1-butene".

As shown by the data in Table 12, polymers 1 to 4 meet the above requirement (a) to (c) of the fifth associated invention, and are equivalent to the propylene polymer as the above base resin. In addition, polymers 1 to 4 meet the above requirements (d) and (e) of the fifth associated invention.

On the other hand, polymers 5 and 6 meet the above requirement (a) of the fifth associated invention, but fails to meet the above requirements (b) and (c) of the fifth associated invention.

A description will be given with respect to Examples 51 to 56 in which a shock absorber was produced by using the polymers 1 to 6 obtained by the above production examples 1 to 6.

Example 51

Figure 2:
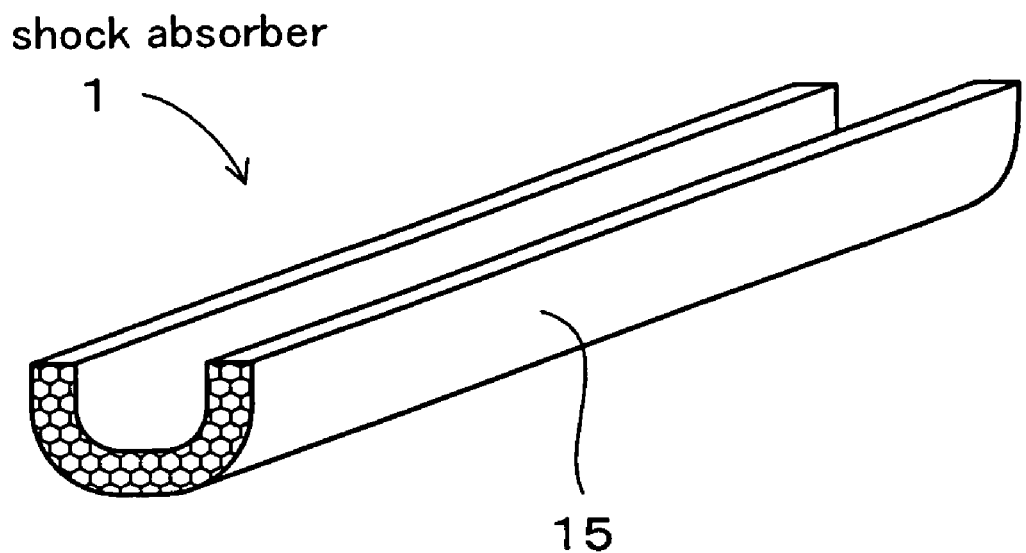
FIG. 2 is an illustrative view showing an entirety of a shock absorber according to Example 51 of the fifth associated invention.
Figure 3:
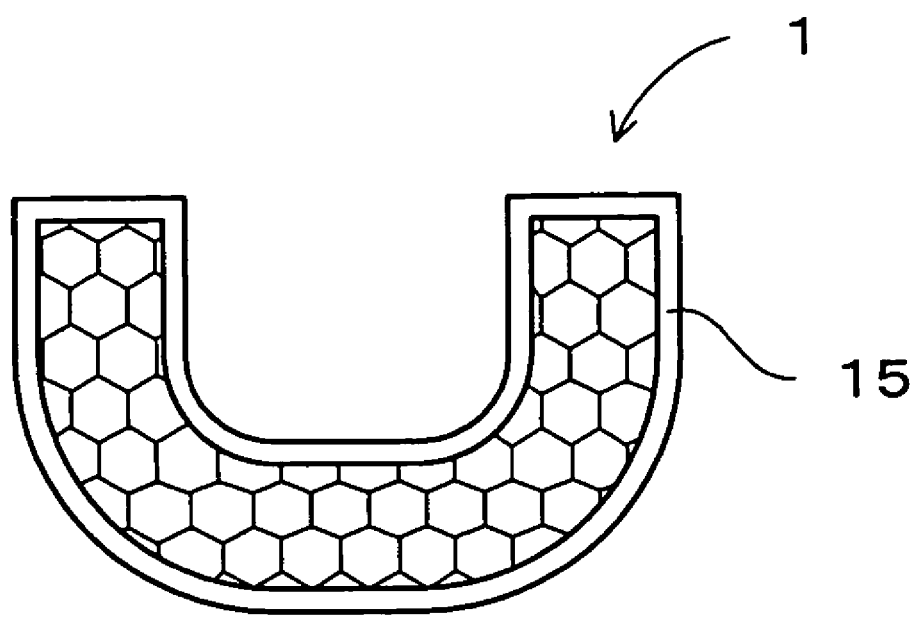
FIG. 3 is an illustrative cross section of the shock absorber according to Example 51 of the fifth associated invention.

As shown in FIGS. 2 and 3, the shock absorber 1 of this Example is molded for a core material of an automobile bumper so that the sectional view is in a substantially U shaped on a plane vertical to its longitudinal direction.

In addition, the shock absorber 1 has a skin layer 15 with high density so as to cover its surface.

Now, a production method of the shock absorber 1 will be described here.

First, expanded particles which is a raw material for the shock absorber are produced as follows.

Two antioxidants (0.05% by weight of trade name "Yoshinox BHT" available from Yoshitomi Pharmaceuticals Co., Ltd. and 0.10% by weight of trade name "Irganox 1010" available from Ciba Geigy Co., Ltd.) were added to the propylene homopolymer (polymer 1) serving as a base resin obtained in Production Example 1, and the mixture was extruded into the form of strands of 1 mm in diameter using a 65 mm single screw extruder. Then, the extruded polymer was cooled in water; and was cut into pellets having length of 2 mm, whereby a fine-granule pellet of a polypropylene resin composition was obtained.

1000 g of this pellet was put into a 5 L autoclave together with 2500 g of water, 200 g of calcium tertiary phosphate, 0.2 g of sodium dodecylbenzenesulfonate. Further, 85 g of isobutane was added, and the temperature was raised up to 135° C. over 60 minutes. Thereafter, the reaction mixture was maintained at this temperature for 30 minutes.

In addition, after drying the expanded particles obtained by the above operation, the bulk density was measured, and the result was 48 g/L. In addition, the average size of the foams of the polypropylene resin expanded particles were 310 micron were very uniform.

The average size of the foam of the above expanded particles indicates an average value of the size by selecting 50 foams at random on a micro graph (or an image obtained by projecting the sectional plane on a screen) obtained by observing with a microscope a sectional plane of the expanded particles cut so as to pass a substantial center part of the expanded particles in random.

Next, the shock absorber 1 shown in FIGS. 2 and 3 was fabricated by molding the above obtained expanded particles.

Specifically, after the above described expanded particles were charged into a cavity of an aluminum mold, heating and molding were carried out by introducing a steam of 0.28 MPa (gauge pressure) into the chamber of the mold, whereby the shock absorber 1 shown in FIG. 2 was obtained.

At this time, at a portion at which the above expanded particles come into contact with the above mold, the expanded particles are partially melted, thereby fusing them each other. As shown in FIG. 3, the skin layer 15 with a density which is higher than its inside was formed on the surface of the shock absorber 1.

The shock absorber 1 was 60 g/L of density of its inside (a portion other than the skin layer), was less in void on the surface, was free of irregularities, and was excellent in surface appearance.

In addition, when the shock absorber 1 was broken at the center part, and the degree of fusion of its section was measured, the result was 80%.

By cutting the above shock absorber, and then, visually counting the number of particle breaks on its section and the number of inter-particle breaks, the above degree of fusion was expressed at a rate of particle breaks with respect to a total number of both of them.

Figure 4:
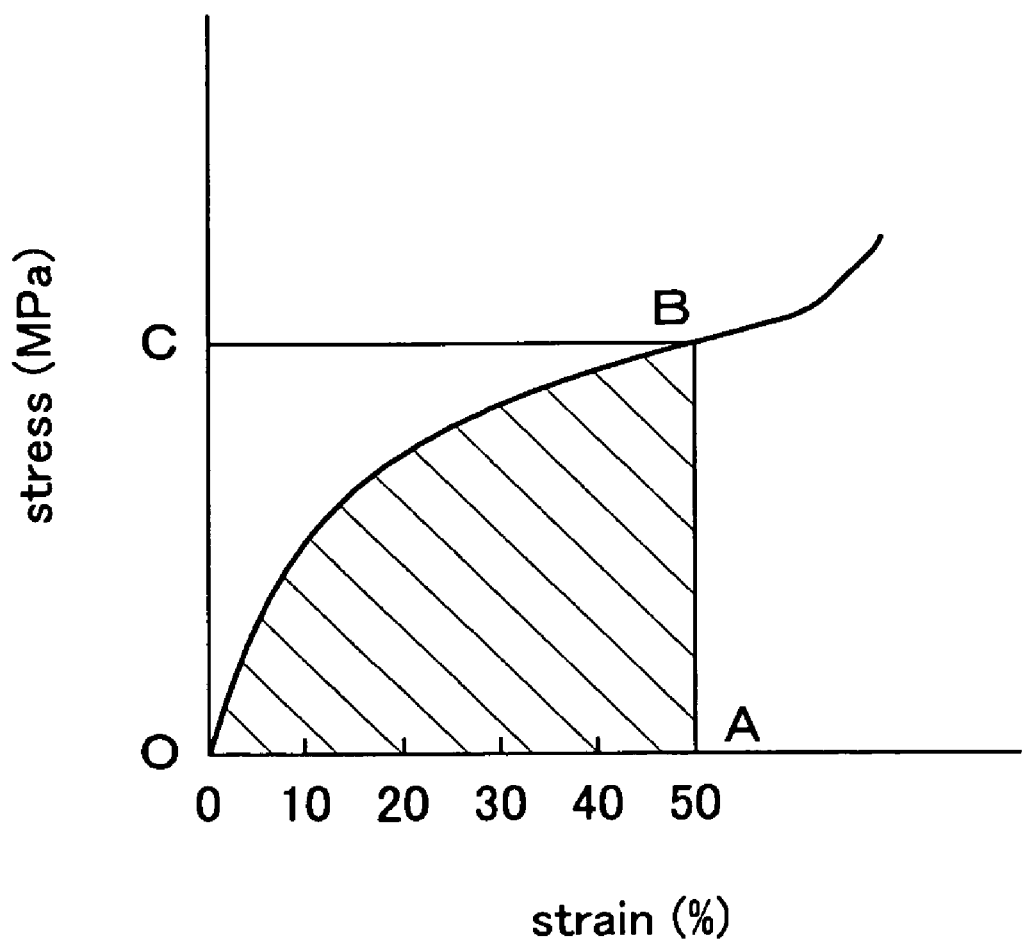
FIG. 4 is an illustrative view illustrating a stress-strain curve of the shock absorber according to Example 51 of the fifth associated invention.

A test specimen of a dimension of 50 mm vertical, 50 mm horizontal, and 25 mm in thickness was prepared from an internal portion (a portion other than the skin layer) of another shock absorber 1 molded under the same molding condition, and compression test was carried out in conformance with JIS K6767. Based on the thus obtained result, a stress-strain curve was obtained (one example of which is shown in FIG. 4). From this diagram, the stress at 50% compression was 0.73 MPa in this Example.

In addition, energy-absorbing efficiency (%) was obtained by the following formula.

Energy-absorbing efficiency (%)={(area of $OAB$)/(area of $OABC$)}×100

That is, for the energy-absorbing efficiency (%), in the stress-strain curve as shown in FIG. 4, a value obtained by dividing an area at a portion enclosed by the line connecting points O, A, and B (area of a portion shaded in the figure) by an area of a figure whose points O, A, B, and C are defined as vertexes in shown in percentage.

Further, by using a test specimen of the same size, when a permanent set after compression was measured by the method described in JIS K6767, the result was 11%.

The result was shown in Table 13 described later. The molding steam pressure in Table 13 means a steam pressure at which a molded article (shock absorber) having 80% of fusion is obtained.

Examples 52 to 54 and Comparative Examples 51 and 52

The above Examples and Comparative Examples were carried out in the same manner as in Example 51 except that polymers described in Table 13 (the above polymers 2 to 6) were used as a base resin.

The result is shown in Table 13 below.

In contrast, in the case where the propylene polymers (polymers 1 to 4) obtained in accordance with production examples 1 to 4 each was used as a base resin (in Examples 51 to 54), the size of foams of the obtained expanded particles were very uniform, and the shock absorbers using these particles exhibited sufficient fusion at a low molding steam pressure.

Further, the shock absorbers of Examples 51 to 54 were high in energy-absorbing efficiency and compression stress, and were small in permanent set after compression.

Thus, the shock absorbers of Examples 51 to 54 can be used as an excellent core material for an automobile's bumper.

In addition, as shown in FIGS. 2 and 3, the shock absorbers 1 of Examples 51 to 54 each have a skin layer 15. These shock absorbers 1 can be used as a automobile bumper or the like.

Example 55

This Example shows an example of producing a shock-absorbing article where a skin material is provided on the surface of the shock absorber.

Figure 5:
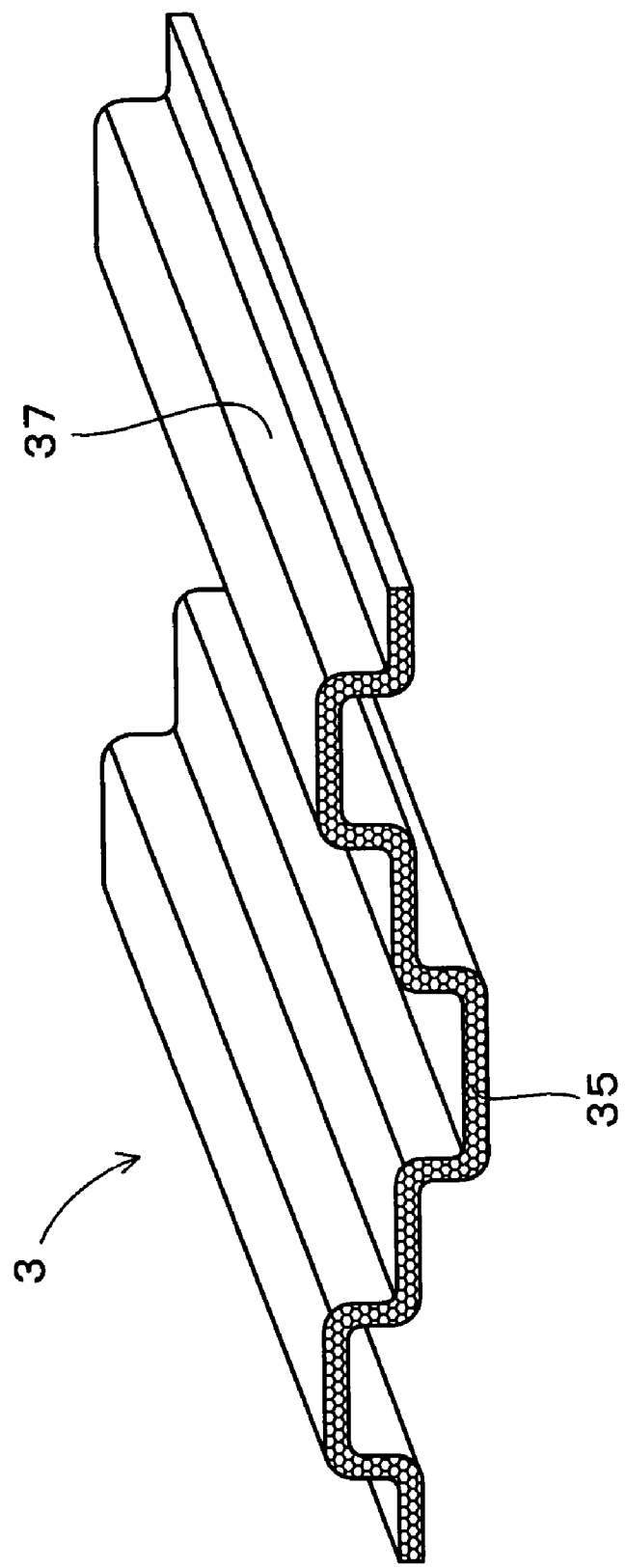
FIG. 5 is an illustrative view showing an entirety of the shock-absorbing article according to Example 55 of the fifth associated invention.
Figure 6:
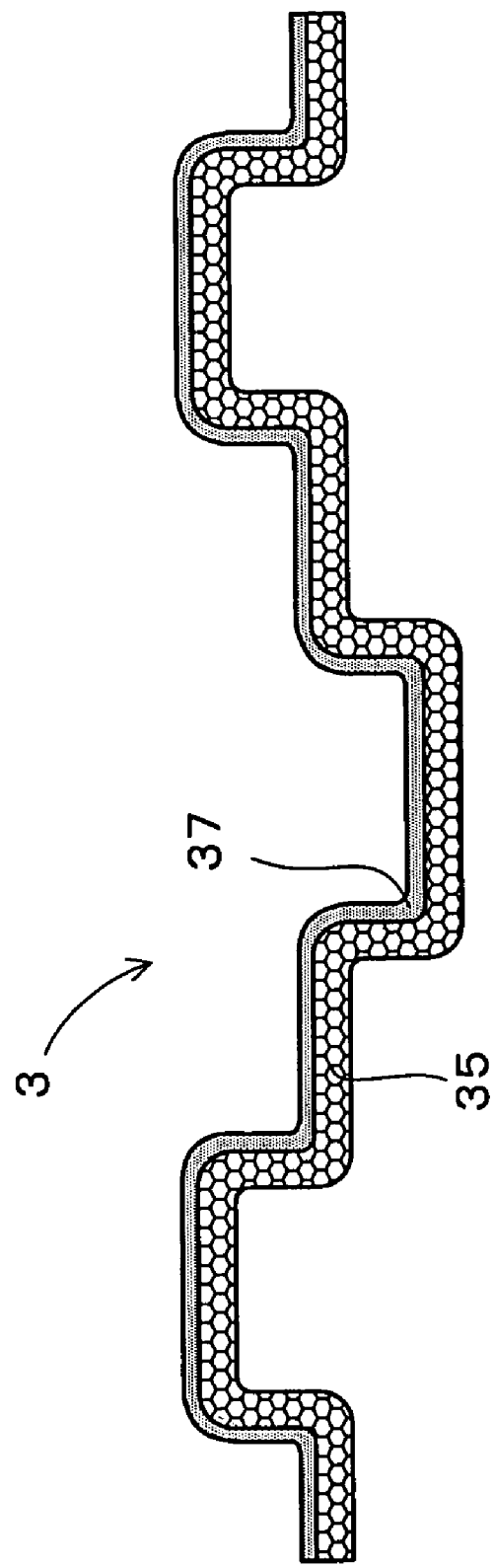
FIG. 6 is an illustrative cross section of the shock-absorbing article according to Example 55 of the fifth associated invention.

The shock-absorbing article of this Example is an automobile's dashboard, as shown in FIGS. 5 and 6.

In addition, as shown in FIGS. 5 and 6, the shock-absorbing article 3 has a skin material 37 so as to cover a surface on one side of the shock absorber 35 molded in a plurality of uneven shapes. In this shock-absorbing article 3,

TABLE 13

|  |  | Example | | | | | |
| --- | --- | --- | --- | --- | --- | --- | --- |
|  |  | Example 51 | Example 52 | Example 53 | Example 54 | Comparative Example 51 | Comparative Example 52 |
| expanded particle | base resin | polymer1 | polymer2 | polymer3 | polymer4 | polymer5 | polymer6 |
|  | expanding temperature (° C.) | 135 | 141 | 130 | 130 | 150 | 135 |
|  | bulk density (g/L) | 48 | 48 | 48 | 48 | 48 | 48 |
|  | average size of foam (µ) | 310 | 280 | 300 | 300 | 200 | 180 |
|  | condition of foam | highly uniform | highly uniform | highly uniform | highly uniform | widely varied | widely varied |
| shock absorber | steam pressure for molding (MPa) | 0.28 | 0.30 | 0.26 | 0.26 | 0.40 | 0.35 |
|  | density (g/L) | 60 | 60 | 60 | 60 | 60 | 60 |
|  | compression stress (MPa) | 0.73 | 0.81 | 0.69 | 0.76 | 0.52 | 0.43 |
|  | energy-absorbing efficiency (%) | 73.1 | 74.9 | 71.5 | 72.9 | 67.3 | 61.6 |
|  | permanent set after compression (%) | 11 | 12 | 9 | 10 | 16 | 15 |

As shown by the data in Table 13, in the case where the polymers 5 and 6 which do not meet the above requirements (b) and (c) of the fifth associated invention, the polymers being obtained by the above production examples 5 and 6, were used as a base resin (in Comparative Examples 51 and 52), the obtained expanded particles had foams with wide distribution in the size. Thus, a high molding steam pressure was required to obtain a shock absorber with sufficient degree of fusion from these expanded particles.

In addition, with respect to these shock absorbers, the energy-absorbing efficiency was low, the performance at the shock absorber was not satisfactory, and further, the permanent set after compression was large.

the shock absorber 35 is made of expanded propylene particles, and the skin material 37 is made of a polyolefin elastomer sheet.

Now, a method of producing the shock-absorbing article of this Example will be described here.

First, expanded particles similar to that of Example 51 were prepared. A fabrication method of the expanded particles is identical to those of Production Example 1 and Example 51 described above.

Next, a skin material was mounted on one side of the mold, and expanded particles were charged.

Next, of a middle mold mounted to two molds which constitute a molding tool, in the shock-absorbing article shown in FIG. 6, a sheet for forming a skin material is disposed in a mold (a recessed tool) forming the side of the skin material 37, and mold clamping was performed. Further, expanded particles were charged in the above molding tool.

Thereafter, the resultant expanded particles were heated and molded by introducing a steam of 0.28 MPa in gauge pressure into the chamber of the mold, and the shock-absorbing articles 3 shown in FIGS. 5 and 6 were obtained.

The obtained shock-absorbing article 3 was 60 g/L of density of the shock absorber 35, was small in surface clearance, was free of irregularities, and was excellent in surface appearance.

As shown in FIGS. 5 and 6, the shock-absorbing article 3 has a skin material 37 so as to cover a surface on one side of the shock absorber 35 which is similar to that of Example 51.

Thus, in the above shock-absorbing article 3, there is provided advantageous effect that the above shock absorber 35 absorbs shock energy, as described above; and the skin material 37 provided on the surface of the above shock absorber 35 improves the strength of the shock-absorbing article 3, and beautifies the surface of the shock-absorbing article 3.

Now, Examples of the sixth associated invention will be described here.

[Production 1 of Propylene Polymer]

First, propylene polymers [A] and [B] were synthesized by any of the methods shown in the following Production Examples 1 to 6.

Production Example 1

(i) Synthesis of [dimethylsilylenebis{1,1'-(2-methyl-4-phenyl-4-hydroazulenyl)}zirconium dichloride]

All of the following reactions were performed in an inert gas atmosphere, and solvents were dried and purified before using in such reactions.
(a) Synthesis of racemic/meso mixture
(b) Separation of racemic isomer (ii) Synthesis of Catalyst (a) Treatment of Catalyst Carrier
(b) Preparation of Catalyst Component The above description is similar to that of Production Example 1 of the first associated invention.

(iii) Polymerization of Propylene

After a stirrer-equipped 200 L autoclave was thoroughly substituted with propylene, 45 kg of dehydrated liquid propylene was added. Then, 500 mL (0.12 mol) of hexane solution of triisobutyl aluminum and hydrogen (3NL) were added, and the internal temperature of the autoclave was raised up to 70° C.

Thereafter, the above solid catalyst component (1.7 g) was put into the autoclave with pressure of argon, polymerization was started, and polymerization reaction was carried out for 3 hours.

Thereafter, 100 mL of ethanol was put into the autoclave, the reaction was stopped, and the residual gas component was purged, whereby 14.1 kg of a polymer was obtained.

This polymer is 100 mol % in structural unit derived from propylene, i.e., is a propylene homopolymer. This polymer meets the above requirement (a) of the sixth associated invention.

In addition, this polymer had the following properties: MFR (melt flow rate)=10 g/10 minutes; 99.7% of isotactic triad fraction; the melting point of 146° C. measured by the DSC technique (the temperature was raised at a rate of 10° C./minute from 30° C.). The polymer met the above requirements (d) and (e) of the sixth associated invention. Further, a content of position irregularity unit based on 2,1-insertion was 1.32%; the content of position irregularity unit based on 1,3-insertion was 0.08%; and the above requirement (b) of the sixth associated invention was met.

Hereinafter, the obtained polypropylene polymer is referred to as "polymer 1".

(iv) Measurement of Water Vapor Transmission Rate

The above obtained polymer 1 was molded into a film of 25 micron in thickness, and the water vapor transmission rate Y was measured in accordance with the method described in JIS K 7129 (this applies to the following production examples). The result was 10.5 (g/m$^2$/24 hr).

With respect to this polymer 1, as described above, the melting point Tm was 146° C. From the above formula (1), Y should be in the range of $5.8 \leq Y \leq 11.8$. Y was in that range, and met the above requirement (c) of the sixth associated invention.

Production Example 2

Propylene Homopolymerization

After the inside of a stirrer-equipped 200 L autoclave was thoroughly substituted with propylene, 45 kg of dehydrated liquid propylene was added. Then, 500 mL (0.12 mol) of a hexane solution of triisobutyl aluminum and hydrogen (3NL) were added, and the internal temperature of the autoclave was raised up to 40° C.

Thereafter, the above solid catalyst component (3.0 g) was put into the autoclave with pressure of argon, polymerization was started, and polymerization reaction was carried out for 3 hours.

Thereafter, 100 mL of ethanol was put into the autoclave, the reaction was stopped, and the residual gas component was purged, whereby 4.4 kg of a polymer was obtained.

This polymer is 100 mol % in structural unit derived from propylene, i.e., a propylene homopolymer. This polymer meets the above requirement (a) of the sixth associated invention.

In addition, this polymer had the following properties: MFR=2 g/10 minutes; 99.8% of isotactic triad fraction; melting point of 152° C. measured by the DSC technique (the temperature was raised at a rate of 10° C./minute from 30° C.). The polymer met the above requirements (d) and (e) of the sixth associated invention. Further, a content of position irregularity unit based on 2,1-insertion was 0.89%; a content of position irregularity unit based on 1,3-insertion was 0.005%; and the above requirement (b) of the sixth associated invention was met.

Hereinafter, the thus obtained polypropylene polymer is referred to as "polymer 2".

In addition, with respect to the polymer 2, when the water vapor transmission rate Y after molding into a film was investigated as in the above polymer 1, the result was 9.5 (g/m$^2$/24 hr).

In polymer 2, as described above, the melting point Tm was 152° C. Thus, from the above formula (1), Y should be in the range of 4.6≦Y≦9.8. Y was in that range, and thus, met the above requirement (c) of the sixth associated invention.

Production Example 3

Propylene/Ethylene Copolymerization

After the inside of a stirrer-equipped 200 L autoclave of 200 L was thoroughly substituted with propylene, 60 L of purified n-heptane was added. 500 mL (0.12 mol) of a hexane solution of triisobutyl aluminum was added, and the internal temperature of the autoclave was raised up to 70° C. Thereafter, the solid catalyst component (9.0 g) was added; a mixture gas of propylene and ethylene (propylene:ethylene=97.5:2.5 ratio by weight) was added so that the pressure is 0.7 MPa; polymerization was started; and polymerization reaction was performed for 3 hours under this condition.

Thereafter, 100 mL of ethanol was put into the autoclave, the reaction was stopped, and the residual gas component was purged, whereby 9.3 kg of a polymer was obtained.

In this polymer, the content of the structural unit derived from propylene was 97.0 mol %, and the content of the structural unit derived from ethylene was 3.0 mol %. These values met the above requirement (a) of the sixth associated invention.

In addition, this polymer had the following properties: MFR=14 g/10 minutes; 99.2% of isotactic triad fraction; a melting point of 141° C. measured by the DSC technique (a temperature was raised at a rate of 10° C./minute from 30° C.). The polymer met the above requirements (d) and (e) of the sixth associated invention. Further, a content of position irregularity unit based on 2,1-insertion was 1.06%; a content of position irregularity unit based on 1,3-insertion was 0.16%; and the above requirement (b) of the sixth associated invention was met.

Hereinafter, the thus obtained polypropylene polymer is referred to as "polymer 3".

In addition, with respect to the polymer 3, when the water vapor transmission rate Y when the polymer is molded in film was investigated as in the above polymers 1 and 2, the result was 12.0 (g/m²/24 hr).

In polymer 3, as described above, the melting point Tm was 141° C. Thus, from the above formula (1), Y should be in the range of 6.8≦Y≦13.5. Y was in that range, and thus, met the above requirement (c) of the sixth associated invention.

Production Example 4

Propylene/1-Butene Copolymerization

After the inside of a stirrer-equipped 200 L autoclave was thoroughly substituted with propylene, 60 L of purified n-heptane was added. 500 mL (0.12 mol) of hexane solution of triisobutyl aluminum was added, and the internal temperature of the autoclave was raised up to 70° C. Thereafter, the solid catalyst component (9.0 g) was added; a mixture gas of propylene and 1-butene (propylene:1-butene=90:10 ratio by weight) was added so that the pressure is 0.6 MPa; polymerization was started; and polymerization reaction was performed for 3 hours under this condition.

Thereafter, 100 mL of ethanol was put into the autoclave, the reaction was stopped, and the residual gas component was purged, whereby 8.6 kg of a polymer was obtained.

In this polymer, the content of structural unit derived from propylene was 95.4 mol %, and the content of the structural unit derived from ethylene was 4.6 mol %. This value met the above requirement (a) of the sixth associated invention.

In addition, this polymer had the following properties: MFR=6 g/10 minutes; a melting point of 142° C. measured by the DSC technique (the temperature was raised at a rate of 10° C./minute from 30° C.); 99.3% of isotactic triad fraction. The polymer met the above requirements (d) and (e) of the sixth associated invention. Further, a content of position irregularity unit based on 2,1-insertion was 1.23%; a content of position irregularity unit based on 1,3-insertion was 0.09%; and the above requirement (b) of the sixth associated invention was met.

Hereinafter, the thus obtained polypropylene is referred to as "polymer 4".

In addition, with respect to the polymer 4, when the water vapor transmission rate Y after molding into a film was investigated as in the above polymers 1 to 3, the result was 11.5 (g/m²/24 hr).

In polymer 3, as described above, the melting point Tm was 142° C. Thus, from the above formula (1), Y should be in the range of 6.6≦Y≦13.1. Y was in that range, and thus, met the above requirement (c) of the sixth associated invention.

Production Example 5

Production of Propylene Polymer [B] and Propylene Homopolymerization

After the inside of the stirrer-equipped 200 L autoclave was thoroughly substituted with propylene, 60 L of purified n-heptane was added, and diethyl aluminum chloride (45 g) and 11.5 g of a titanium trichloride catalyst available from Marubeni Solvay Co., Ltd. was added under a propylene atmosphere. Further, while the hydrogen concentration of a gas phase part was maintained at 7.0% by volume, propylene was added in the autoclave at the autoclave internal temperature of 65° C. over 4 hours at a velocity of 9 kg/hour.

After propylene introduction was stopped, reaction was further continued for 1 hour; 100 mL of butanol was added to the reaction mixture; the reaction was stopped; and the residual gas was purged, whereby 30 kg of polymer was obtained.

This polymer is 100 mol % in structural unit derived from propylene, that is, is a propylene homopolymer. This polymer met the above requirement (a) of the sixth associated invention.

This polymer had the following properties: MFR=7 g/10 minutes; a melting point of 165° C. measured by the DSC technique; (the temperature was raised at a rate of 10° C./minute from 30° C.); 97.6% of isotactic triad fraction.

In addition, this polymer had 0% of position irregularity unit based on 2,1-insertion and 0% of position irregularity unit based on 1,3-insertion.

That is, this polymer did not meet the above requirement (b) of the sixth associated invention.

Hereinafter, the thus obtained polymer is referred to as "polymer 5".

With respect to polymer 5, as in the above polymers 1 to 4, when the water vapor transmission rate Y after molding into a film was investigated, the result was 7.8 (g/m²/24 hr). In polymer 5, as described above, the melting point Tm was 165° C., and thus, Y should be in the range of 2.0≦Y≦5.6 from the above formula (1). However, Y was not in that range.

That is, polymer 5 did not meet the above requirement (c) of the sixth associated invention.

Production Example 6

Production of Propylene Polymer [B] and Propylene/Ethylene Copolymerization

After the inside of the stirrer-equipped 200 L autoclave was thoroughly substituted with propylene, 60 L of purified n-heptane was added, and diethyl aluminum chloride (40 g) and 7.5 g of a titanium trichloride catalyst available from Marubeni Solvay Co., Ltd. was added under a propylene atmosphere. Further, while the hydrogen concentration of a gas phase part was maintained at 7.0% by volume, a mixture gas of propylene and ethylene (propylene:ethylene=97.5:2.5 at ratio by weight) was added at the autoclave internal temperature of 60° C. so that the pressure is 0.7 MPa.

After mixture gas introduction was stopped, reaction was further continued for 1 hour; 100 mL of butanol was added to the reaction mixture; reaction was stopped; and the residual gas was purged, whereby 32 kg of polymer was obtained.

In this polymer the content of the structural unit obtained from propylene was 96.4% mol, and the content of the structural unit derived from ethylene was 3.6 mol %. This value meets the above requirement (a) of the sixth associated invention.

This polymer had the following properties: MFR=12 g/10 minutes; a melting point of 146° C. measured by the DSC technique (the temperature was raised at a rate of 10° C./minute from 30° C.); 96.0% of isotactic triad fraction.

In addition, this polymer had 0% of position irregularity unit based on 2,1-insertion and 0% of position irregularity unit based on 1,3-insertion. That is, this polymer did not meet the above requirement (b) of the sixth associated invention.

Hereinafter, the thus obtained polymer is referred to as "polymer 6".

With respect to the above polymer 6, when the water vapor transmission rate Y after molding into a film was investigated in the same manner as in the above polymers 1 to 5, the result was 15.0 (g/m²/24 hr).

In polymer 6, the melting point Tm was 146° C., and thus, Y should be in the range of $5.8 \leq Y \leq 11.8$ from the above formula (1). However, Y was not in that range.

That is, polymer 6 did not meet the above requirement (c) of the sixth associated invention.

The results of the above production examples 1 to 6 are shown in Table 14.

As shown by the data in Table 14, polymers 1 to 4 meet the above requirements (a) to (c) of the sixth associated invention, and are equivalent to the above propylene polymer [A]. In addition, polymers 1 to 4 meet the above requirements (d) and (e) of the sixth associated invention.

On the other hand, polymers 5 and 6 meet the above requirement (a) of the sixth associated invention, but fail to meet the above requirements (b) and (c). That is, polymers 5 and 6 are equivalent to the above propylene polymer [B].

Now, a description will be given with respect to Examples 61 to 66 in which shock absorbers are produced by using the polymers 1 to 6 obtained by the above described Production Example 1 to 6.

Example 61

As shown in FIGS. 2 and 3 shown in the fifth associated invention, the shock absorber 1 of this Example is molded for a core material of an automobile's bumper so that the sectional view is in a substantially U shaped on a plane vertical to its longitudinal direction. In addition, the shock absorber 1 has a skin layer 15 with high density so as to cover its surface.

Now, a production method of the shock absorber 1 will be described here.

First, expanded particles which are a raw material of a shock absorber are produced as follows.

The above polymer 1 (equivalent to propylene polymer [A]) obtained by Production Example 1 is mixed with the above polymer 5 (equivalent to propylene polymer [B]) obtained by Production Example 5 in 90:10 (ratio by weight), and two antioxidants (0.05% by weight of trade name "Yoshinox BHT" available from Yoshitomi Pharmaceuticals Co., Ltd. and 0.10% by weight of trade name "Irganox 1010" available from Ciba Geigy Co., Ltd.) were added to this mixture, the added mixture was extruded into the form of strands of 1 mm in diameter using a 65 mm single screw extruder. Then, after cooling in water, the strands were cut into pellets having length of 2 mm.

When DSC measurement of the thus obtained pellet was performed, one endothermic peak was exhibited, and the peak temperature was 153° C.

1000 g of a pellet was put into a 5 L autoclave of together with 2500 g of water, 200 g of calcium tertiary phosphate, 0.2 g of sodium dodecylbenzenesulfonate. Further, 85 g of isobutane was added, and the temperature was raised up to

TABLE 14

| | | category of propylene polymer | | | | | |
|---|---|---|---|---|---|---|---|
| | | polymer 1 (propylene polymer [A]) | polymer 2 (propylene polymer [A]) | polymer 3 (propylene polymer [A]) | polymer 4 (propylene polymer [A]) | polymer 5 (propylene polymer [B]) | polymer 6 (propylene polymer [B]) |
| production example | | production example 1 | production example 2 | production example 3 | production example 4 | production example 5 | production example 6 |
| composition of polymer | propylene (mol %) | 100.0 | 100.0 | 97.0 | 95.4 | 100.0 | 96.4 |
| | ethylene (mol %) | — | — | 3.0 | — | — | 3.6 |
| | 1-butene (mol %) | — | — | — | 4.6 | — | — |
| content of position irregularity unit (%) | [2, 1] insertion | 1.32 | 0.89 | 1.06 | 1.23 | 0 | 0 |
| | [1, 3] insertion | 0.08 | 0.005 | 0.16 | 0.09 | 0 | 0 |
| melting point Tm (° C.) | | 146 | 152 | 141 | 142 | 165 | 146 |
| water vapor transmission rate (g/m²/24 hr) | | 10.5 | 9.5 | 12.0 | 11.5 | 7.8 | 15.0 |
| [mm] fraction (%) | | 99.7 | 99.8 | 99.2 | 99.3 | 97.6 | 96.0 |
| MFR (g/10 minutes) | | 10 | 2 | 14 | 6 | 7 | 12 |

In the table, "—" in the "ethylene" and "1-butene" section indicates that a polymer has been produced without using "ethylene" or "1-butene".

140° C. over 60 minutes. Thereafter, the reaction mixture was maintained at this temperature for 30 minutes.

Thereafter, while supplying nitrogen gas into the autoclave so as to maintain the pressure at 2.3 MPa, a valve at the bottom part of the autoclave was opened. Then, the contents were discharged into an atmosphere of air.

After drying the expanded particles obtained by the above operation, the bulk density was measured, the result was 42 g/L. In addition, the average size of the foam of the particles was 250 micron, which was very uniform.

The average size of the foam of the above expanded particles indicates an average value of the size by selecting 50 foam at random on a micrograph (or an image obtained by picturing the sectional plane on a screen) obtained by observing with a microscope a sectional plane of the expanded particles cut so as to pass a substantial center part of the expanded particles selected at random.

Next, the shock absorber 1 was fabricated by molding the above obtained expanded particles.

Specifically, after the above described expanded particles were charged into a cavity of an aluminum mold, heating and molding were carried out by introducing a steam of 0.30 MPa (gauge pressure) into the chamber of the mold, whereby the shock absorber 1 shown in FIG. 2 was obtained.

At this time, at a portion at which the above expanded particles come into contact with the above mold, the expanded particles are partially melted, thereby fusing them each other. As shown in FIGS. 2 and 3, the skin layer 15 with a density which is higher than that of its inside was formed on the surface of the shock absorber 1.

The shock absorber 1 had 0.06 g/cm³ of density of its inside (a portion other than the skin layer), and had little voids on the surface having superior surface appearance free of irregularities.

In addition, when the shock absorber 1 was broken at the center part, and the degree of fusion of its section was measured, the measurement was 90%.

By cutting the above shock absorber, and then, visually counting the number of particle breaks on its section and the number of inter-particle breaks, the above degree of fusion was expressed at a rate of the number of particle breaks with respect to a total number of both of them.

In addition, a test specimen of a dimension of 50 mm vertical, 50 mm horizontal, and 25 mm in thickness was prepared from an internal portion (a portion other than the skin layer) of another shock absorber 1 molded under the same molding condition, and compression test was carried out in conformance with JIS K6767. Based on the thus obtained result, a stress-strain curve was obtained (one example of which is shown in FIG. 4). From this diagram, the stress at 50% compression was 0.75 MPa in this Example.

In addition, energy-absorbing efficiency (%) was obtained by the following formula.

Energy-absorbing efficiency (%)=1(area of $OAB$)/(area of $OABC$)56×100

That is, for the energy-absorbing efficiency (%), in the stress-strain curve as shown in FIG. 4, a value obtained by dividing an area at a portion enclosed by the line connecting points O, A, and B (area of a portion shaded in the figure) by an area of a figure whose points O, A, B, and C are defined as vertexes is shown in percentage.

Further, by using a test specimen of the same size, when a permanent set after compression was measured by the method described in JIS K6767, the measurement was 11%.

The result was shown in Table 15 described later. The molding steam pressure in Table 15 means a steam pressure at which a molded article (shock absorber) having 80% of fusion is obtained.

Examples 62 to 67 and Comparative Examples 61 and 62

Testing was carried out in the same manner as in Example 61 except that base resins described in Table 15 were used. The results are shown in Table 15 and Table 16 below.

TABLE 15

| | | Example | | | | | | |
|---|---|---|---|---|---|---|---|---|
| | | Example 61 | Example 62 | Example 63 | Example 64 | Example 65 | Example 66 | Example 67 |
| expanded particle | composition of base resin | polymer1/polymer5 = 90/10 | polymer1/polymer5 = 50/50 | polymer1/polymer5 = 10/90 | polymer2/polymer5 = 95/5 | polymer3/polymer5 = 30/70 | polymer4/polymer5 = 50/50 | polymer2/polymer6 = 90/10 |
| | melting point of base resin | 153 | 158 | 161 | 157 | 159 | 156 | 156 |
| | expanding temperature (° C.) | 140 | 145 | 150 | 145 | 150 | 145 | 146 |
| | bulk density (g/L) | 42 | 45 | 47 | 40 | 45 | 45 | 45 |
| | average size of foam (μ) | 250 | 220 | 250 | 300 | 250 | 220 | 250 |
| | condition of foam | highly uniform | highly uniform | highly uniform | highly uniform | highly uniform | highly uniform | highly uniform |
| shock absorber | steam pressure for molding (MPa) | 0.30 | 0.30 | 0.35 | 0.30 | 0.35 | 0.35 | 0.35 |
| | density (g/cm³) | 0.06 | 0.06 | 0.06 | 0.06 | 0.06 | 0.06 | 0.06 |
| | compression stress (MPa) | 0.75 | 0.83 | 0.91 | 0.84 | 0.88 | 0.85 | 0.81 |
| | energy-absorbing efficiency (%) | 74.2 | 75.1 | 76.4 | 75.7 | 76.1 | 75.8 | 74.9 |
| | permanent set after compression (%) | 11 | 12 | 13 | 12 | 13 | 12 | 11 |

TABLE 16

|  | Example | |
| --- | --- | --- |
|  | Comparative Example 61 | Comparative Example 62 |
| expanded particle |  |  |
| composition of base resin | polymer1 (only) | polymer5 (only) |
| melting point of base resin | 146 | 165 |
| expanding temperature (° C.) | 135 | 150 |
| bulk density (g/L) | 48 | 48 |
| average size of foam (μ) | 310 | 200 |
| condition of foam | uniform | widely varied |
| shock absorber |  |  |
| steam pressure for molding (MPa) | 0.28 | 0.40 |
| density (g/L) | 60 | 60 |
| compression stress (MPa) | 0.73 | 0.52 |
| energy-absorbing efficiency (%) | 73.1 | 67.3 |
| permanent set after compression (%) | 11 | 16 |

As shown by the data in Table 15, in the case where polymers 1 to 4 equivalent to the above propylene polymer [A] and polymers 5 and 6 equivalent to the propylene polymer [B] were used as abase resin (Examples 61 to 67), the foam of the obtained expanded particles is very uniform in size, and a shock absorber using them exhibited sufficient fusion at a low molding steam pressure.

Further, the shock absorbers of Examples 61 to 67 were high in energy-absorbing efficiency and compression stress, and were small in permanent set after compression.

Thus, the shock absorbers of Examples 61 to 67 can be used as an excellent core material for an automobile's bumper.

In addition, as shown in FIGS. 2 and 3 shown in the fifth associated invention, the shock absorbers 1 of Examples 61 to 67 each have a skin layer 15. These shock absorbers 1 can be used as an automobile's bumper or the like.

In contrast, as shown by the data in Table 16, in the case where polymer 1 equivalent to the above propylene polymer [A] was used independently as a base resin (Comparative Example 61), the obtained expanded particles are not sufficient in uniformity of foam in size, and energy-absorbing efficiency of the shock-absorbing article was not sufficient.

In addition, in the case where polymer 5 equivalent to the above propylene polymer [B] was used as a base resin (Comparative Example 62), the obtained expanded particles are great in deviation of foam in size. A high molding steam pressure was required in order to obtain the shock absorber exhibiting the satisfactory degree of fusion by using these expanded particles. In addition, the shock absorber of Comparative Example 62 was low in energy-absorbing efficiency, was unsatisfactory in performance of the shock absorber, and further, was great in permanent set after compression.

Example 68

This Example shows an example of producing a shock-absorbing article where a skin material is provided on the surface of the shock absorber.

The shock-absorbing article of this Example is an automobile's dashboard, as shown in FIGS. 5 and 6 shown in the sixth associated invention.

In addition, as shown in FIGS. 5 and 6, the shock-absorbing article 3 has a skin material 37 so as to cover a surface on one side of the shock absorber 35 molded in a plurality of uneven shapes. In this shock absorber 3, the shock absorber 35 is made of expanded polypropylene, and the skin material 37 is made of a polyolefin elastomer sheet.

Now, a production method of a shock-absorbing article of this Example will be described here.

First, expanded particles similar to those of Example 61 described above were prepared. The production method of the expanded particles is similar to that of Example 61 described above. That is, as a base resin, the expanded particles in this Example contains polymer 1 which is the above propylene polymer [A] and polymer 5 which is the above propylene polymer [B].

Next, of a middle mold mounted to two dies which constitute a mold, in the shock-absorbing article shown in FIG. 6, a sheet for forming a skin material is disposed in a die (a recessed die) forming the side of the skin material 37, and mold clamping was performed. Further, expanded particles were charged in the above mold.

Thereafter, heating and molding were carried out by introducing a steam of 0.30 MPa (gauge pressure) into the chamber of the mold, and the shock absorbers 3 shown in FIGS. 5 and 6 were obtained.

The obtained shock absorber 3 had 0.06 g/cm$^3$ of density of the shock absorber 35 of its inside, and had little voids of the surface having superior surface appearance free of irregularities.

As shown in FIGS. 5 and 6, the shock absorber 3 has a skin material 37 so as to cover a surface on one side of the shock absorber 35 which is similar to that of Example 61.

Thus, in the above shock-absorbing article 3, there is provided advantageous effect that the above shock absorber 35 absorbs shock energy, as described above; and the skin material 37 provided on the surface of the above shock absorber 35 improves the strength of the shock-absorbing article 3, and cleans the surface of the shock-absorbing article 3.

Now, examples of the seventh associated invention will be described here.

[Production of Base Resin]

First, a propylene polymer serving as a base resin was synthesized by the following methods shown in Production Examples 1 to 4.

Production Example 1

(i) Synthesis of [dimethylsilylenebis{1,1'-(2-methyl-4-phenyl-4-hydroazulenyl)}zirconium dichloride]

All of the following reactions were performed in an inert gas atmosphere, and solvents were dried and purified before using in such reactions.
(a) Synthesis of racemic/meso mixture
(b) Separation of racemic isomer (ii) Synthesis of Catalyst (a) Treatment of Catalyst Carrier
(b) Preparation of Catalyst Component The above description is similar to that of Production Example 1 of the first associated invention.

(iii) Polymerization of Propylene (Production of Propylene Polymer A)

After a stirrer-equipped 200 L autoclave was thoroughly substituted with propylene, 45 kg of dehydrated liquid propylene was added. Then, 500 mL (0.12 mol) of a hexane solution of triisobutyl aluminum and hydrogen (3NL) were added, and the internal temperature of the autoclave was raised up to 70° C.

Thereafter, the above solid catalyst component (1.7 g) was put into the autoclave with pressure of argon, polymerization was started, and polymerization reaction was carried out for 3 hours.

Thereafter, 100 mL of ethanol was put into the autoclave, the reaction was stopped, and the residual gas component was purged, whereby 14.1 kg of a polymer was obtained.

This polymer is 100 mol % in structural unit derived from propylene, i.e., a propylene homopolymer. This polymer meets the above requirement (a) of the seventh associated invention concerning the above propylene polymer.

In addition, this polymer had the following properties: MFR (melt flow rate)=10 g/10 minutes; 99.7% of isotactic triad fraction; a melting point of 146° C. measured by the DSC technique (the temperature was raised at a rate of 10° C./minute from 30° C.). The polymer met the above requirements (e) and (f) of the seventh associated invention. Further, the content of position irregularity unit based on 2,1-insertion was 1.32%; the content of position irregularity based on 1,3-insertion was 0.08%; and the above requirement (b) of the seventh associated invention was met.

Hereinafter, the thus obtained polypropylene polymer is referred to as "polymer 1".

(iv) Measurement of Water Vapor Transmission Rate

The above obtained polymer 1 was molded in a film of 25 micron in thickness, and the water vapor transmission rate A was measured in accordance with the method described in JIS K 7129 (this applies to the following production examples). The result was 10.5 (g/m²/24 hr).

In polymer 1, as described above, the melting point Tm was 146° C. From the above formula (1), A should be in the range of $5.8 \leq A \leq 11.8$. A is in that range, and meets the above requirement (c) of the seventh associated invention.

Production Example 2

Propylene/Ethylene Copolimerization

After the inside of a stirrer-equipped 200 L autoclave was thoroughly substituted with propylene, 60 L of purified n-heptane was added. Then, 500 mL (0.12 mol) of a hexane solution of triisobutyl aluminum was added, and the internal temperature of the autoclave was raised up to 70° C. Thereafter, the above solid catalyst component (9.0 g) was added; a gas mixture of propylene and ethylene (propylene: ethylene=97.5:2.5, weight ratio) was added so that the pressure becomes 0.7 MPa; polymerization was started; and polymerization reaction was performed for 3 hours.

Thereafter, 100 mL of ethanol was put into the autoclave, the reaction was stopped, and the residual gas component was purged, whereby 9.3 kg of a polymer was obtained.

In this polymer, the structural unit derived from propylene exists to be 97.0 mol %, and the structural unit derived from ethylene exists to be 3.0 mol %. This polymer meets the above requirement (a) of the seventh associated invention.

In addition, this polymer had the following properties: MFR=14 g/10 minutes; 99.2% of isotactic triad fraction; a melting point of 141° C. measured by the DSC technique (the temperature was raised at a rate of 10° C./minute from 30° C.). The polymer meets the above requirements (e) and (f) of the seventh associated invention. Further, a content of position irregularity unit based on 2,1-insertion was 1.06%; and a content of position irregularity based on 1,3-insertion was 0.16%, which meets the above requirement (b) of the seventh associated invention. Hereinafter, the thus obtained polypropylene polymer is referred to as "polymer 2".

In addition, with respect to the polymer 2, the water vapor transmission rate A obtained after the polymer was molded in film in the same manner as in the above polymer 1 was 12.0 (g/m²/24 hr).

In this polymer 2, as described above, the melting point Tm is 141° C. Thus, from the above formula (1), A should be in the range of $6.8 \leq A \leq 13.5$. A is in that range, and thus, meets the above requirement (c) of the seventh associated invention.

Production Example 3

Propylene/1-Butene Copolymerization

After the inside of a stirrer-equipped 200 L autoclave was thoroughly substituted with propylene, 60 L of purified n-heptane was added. 500 mL (0.12 mol) of a hexane solution of triisobutyl aluminum was added, and the internal temperature of the autoclave was raised up to 70° C. Thereafter, the solid catalyst component (9.0 g) was added; a gas mixture of propylene and ethylene (propylene:1-butene=90:10) was added so that the pressure is 0.6 MPa; polymerization was started; and polymerization reaction was performed for 3 hours under this condition.

Thereafter, 100 mL of ethanol was put into the autoclave, the reaction was stopped, and the residual gas component was purged, whereby 8.6 kg of a polymer was obtained.

In this polymer, the content of the structural unit derived from propylene was 95.4 mol %, and the content of the structural unit derived from 1-butene was 4.6 mol %. This value meets the above requirement (a) of the seventh associated invention.

In addition, this polymer had the following properties: MFR=6 g/10 minutes; a melting point of 142° C. measured by the DSC technique (the temperature was raised at a rate of 10° C./minute from 30° C.); 99.3% of an isotactic triad fraction. The polymer meets the above requirements (e) and (f) of the seventh associated invention for propylene polymer. Further, a content of position irregularity unit based on 2,1-insertion was 1.23%; and a content of position irregularity based on 1,3-insertion was 0.09%, which meets the above requirement (b) of the seventh associated invention. Hereinafter, the thus obtained polypropylene polymer is referred to as "polymer 3".

In addition, with respect to the polymer 3, when the water vapor transmission rate A when the polymer was molded in film was investigated as in the above polymers 1 and 2, the rate A was 11.5 (g/m²/24 hr).

In polymer 3, as described above, the melting point Tm is 142° C. Thus, from the above formula (1), A should be in the range of $6.6 \leq A \leq 13.1$. A is in that range, and thus, meets the above requirement (c) of the seventh associated invention.

Production Example 4

Production of Propylene Polymer and Propylene Homopolymerization

After the inside of a stirrer-equipped 200 L autoclave was thoroughly substituted with propylene, 60 L of purified n-heptane was added. 45 g of diethyl aluminum chloride and 11.5 g of titanium trichloride were added under a propylene atmosphere. Further, while the hydrogen concentration of a gas phase part is maintained at 7.0% by volume, propylene was added into an autoclave at the autoclave internal temperature of 65° C. over 4 hours at a rate of 9 kg/hour.

After introduction of the mixed gas was stopped, reaction was further continued for 1 hour, 100 mL of butanol was added to the autoclave to stop the reaction, and the residual gas component was purged, whereby 30 kg of a polymer was obtained. Hereinafter, the thus obtained polymer was referred to as "polymer 4".

This polymer 4 contains a structural unit derived from propylene by 100 mol %, that is, is obtained as a propylene homopolymer. This polymer meets the above requirement (a) of the seventh associated invention for the propylene polymer.

In addition, the polymer 4 had the following properties: 7 g/10 minutes at MFR; melting point of 160° C. measured by the DSC technique (the temperature was raised at a rate of 10° C./minute to 30° C.); and 97.0% of an isotactic triad fraction.

The polymer 4 had 0% of position irregularity unit based on 2,1-insertion and 0% of position irregularity unit based on 1,3-insertion. That is, the polymer 4 does not meet the requirement (b) of the seventh associated invention concerning the above propylene polymer.

In addition, with respect to the polymer 4, when the water vapor transmission rate A when the polymer was molded in film was investigated as in the above polymers 1 to 3, the rate was 10.0 (g/m$^2$/24 hr).

In polymer 4, as described above, the melting point Tm is 160° C. Thus, from the above formula (1), A should be in the range of $3.0 \leq A \leq 7.2$. Y is not in that range, and thus, does not meet the above requirement (c) of the seventh associated invention.

Production Example 5

Production of Propylene Polymer and Propylene/Ethylene Copolymerization

After the inside of the stirrer-equipped 200 L autoclave was thoroughly substituted with propylene, 60 L of purified n-heptane was added, and diethyl aluminum chloride (40 g) and 7.5 g of a titanium trichloride catalyst available from Marubeni Solvay Co., Ltd. was added under a propylene atmosphere. Further, while the hydrogen concentration of a gas phase part was maintained at 7.0% by volume, a gas mixture of propylene and ethylene (propylene:ethylene=97.5:2.5 ratio by weight) was added in the autoclave at internal temperature of 60° C. so that the pressure is 0.7 MPa.

After introduction of the mixed gas was stopped, reaction was further continued for 1 hour; 100 mL of butanol was added to the autoclave; the reaction was stopped; and the residual gas was purged, whereby 32 kg of a polymer was obtained. Hereinafter, the thus obtained polymer is referred to as "polymer 5".

In this polymer 5, the content of the structural unit derived from propylene was 96.4 mol %, and the content of the structural unit derived from ethylene was 3.6 mol %. These values meet the above requirement (a) of the seventh associated invention for a propylene polymer.

This polymer had the following properties: MFR=12 g/10 minutes; a melting point of 146° C. measured by the DSC technique (the temperature was raised at a rate of 10° C./minute from 30° C.); and 96.0% of isotactic triad fraction.

In addition, the polymer 5 had 0% of position irregularity unit based on 2,1-insertion and 0% of position irregularity unit based on 1,3-insertion.

That is, this polymer 5 did not meet the above requirement (b) of the seventh associated invention.

With respect to polymer 5, as in the above polymers 1 to 4, when the water vapor transmission rate A after molded in film was investigated, the result was 15.0 (g/m$^2$/24 hr). In polymer 5, as described above, the melting point Tm is 146° C., and thus, A should be in the range of $5.8 \leq A \leq 11.8$. However, A is not in that range.

That is, polymer 5 does not meet the above requirement (c) of the seventh associated invention.

Production Example 6

Production of Propylene Polymer and Propylene/1-Butene Copolymerization

After the inside of the stirrer-equipped 200 L autoclave was thoroughly substituted with propylene, 60 L of purified n-heptane was added, and 45 g of diethyl aluminum chloride and 15.0 g of a titanium trichloride catalyst available from Marubeni Solvay Co., Ltd. was added under a propylene atmosphere. Further, while the hydrogen concentration of a gas phase part was maintained at 7.0% by volume, a gas mixture of propylene and 1-butene (propylene:1-butene=90: 10 at ratio by weight) was added at the autoclave internal temperature of 60° C. so that the pressure is 0.6 MPa.

After the gas mixture introduction was stopped, reaction was further continued for 1 hour; 100 mL of butanol was added to the autoclave; the reaction was stopped; and the residual gas was purged, whereby 24 kg of a polymer was obtained. The thus obtained polymer is referred to as "polymer 6".

This polymer 6 had 96.9 mol % of structural unit derived from propylene and 3.1 mol % of structural unit derived from 1-butene. This polymer meets the above requirement (a) of the seventh associated invention for propylene polymer.

In addition, the polymer 6 had the following properties: 8 g/10 minutes at an MFR; a melting point of 150° C. measured by the DSC technique (the temperature was raised at a rate of 10° C./minute from 30° C.); and 95.4% of isotactic triad fraction.

The polymer 6 had 0% of position irregularity unit based on 2,1-insertion and 0% of position irregularity unit based on 1,3-insertion. That is, the polymer 6 does not meet the requirement (b) of the seventh associated invention concerning the propylene polymer.

In addition, as in the polymers 1 to 5, the water vapor transmission rate A when the polymer 6 was molded in film was investigated, and the measurement was 16.2 (g/m$^2$/24 hr).

In the polymer 6, the melting point Tm is 150° C., and thus, from the above formula (1), the degree of vapor penetrability A should be in the range of $5.0 \leq A \leq 10.5$. However, A is not in that range.

That is, the polymer 6 did not meet the above requirement (c) of the seventh associated invention.

[Production of Expanded particles]

Now, a description will be given with respect to Examples in which expanded particles are produced by using the above polymers 1 to 6 obtained by Production Examples 1 to 6.

Example 71

Two antioxidants (0.05% by weight of trade name "Yoshinox BHT" available from Yoshitomi Co., Ltd. and 0.10% by weight of trade name "Irganox 1010" available from Ciba Geigy) were added to polymer 1 obtained in Production Example 1; the added polymer was extruded in a strand manner of 1 mm in size by means of a 65 mm single screw extruder. Then, the extruded polymer was cooled in a water tank, and was cut in length of 2 mm, whereby a fine granule pellet was obtained.

1000 g of this pellet was put into a 5 L autoclave together with 2500 g of water, 200 g of calcium tertiary phosphate and 0.2 g of sodium dodecylbenzenesulfonate. Further, 130 g of isobutane was added, the temperature was raised up to 137° C. over 60 minutes, and the reaction mixture was maintained at this temperature for 30 minutes.

Thereafter, while supplying nitrogen gas into the autoclave so to maintain the pressure at 2.3 MPa, a valve at the bottom part of the autoclave was opened. Then, the contents were discharged into an atmosphere of air.

After drying the expanded particles obtained by the above operation, when the bulk density was measured, the measurement was 21 g/L. In addition, foam of the expanded particles was 310 micron on average in size, which was very uniform. Hereinafter, the expanded particle is referred to as "expanded particle A".

With respect to the average size of the foam of the above expanded particles, 50 foams were selected at random on a micro graph obtained by observing with a microscope a sectional view of expanded particles cut so as to pass the substantial center part of the expanded particles selected at random (or picture of this sectional plane on a screen), and an average value of these size is indicated.

Example 72

By using polymer 1 obtained by Production Example 1, expanded particles were fabricated in the same manner as in the above Example 71 except that a foaming temperature was set at 135° C. and an added amount of isobutane was set at 118 g.

The bulk density of the expanded particles was 48 g/L. In addition foam of the expanded particles was 280 micron on average in size, which was very uniform. Hereinafter, this expanded particle was referred to as "expanded particle B".

Example 73

By using polymer 2 obtained by Production Example 2, expanded particles were fabricated in the same manner as in the above Example 71 except that a foaming temperature was set at 130° C. and an added amount of isobutane was set at 118 g.

The bulk density of the expanded particles was 48 g/L. In addition foam of the expanded particles was 300 micron on average in size, which was very uniform. Hereinafter, this expanded particle was referred to as "expanded particle C".

Example 74

By using polymer 3 obtained by Production Example 3, expanded particles were fabricated in the same manner as in the above Example 71 except that a foaming temperature was set at 132° C. and an added amount of isobutane was set at 120 g.

The bulk density of the expanded particles was 22 g/L. In addition, foam of the expanded particles was 300 micron on average in size, which was very uniform. Hereinafter, this expanded particle was referred to as "expanded particle D".

Comparative Example 71

By using polymer 4 obtained by Production Example 4, expanded particles were fabricated in the same manner as in the above Example 71 except that a foaming temperature was set at 150° C.

The bulk density of the expanded particles was 22 g/L. In addition foam of the expanded particles was 200 micron on average in size, which was large in deviation. Hereinafter, this expanded particle was referred to as "expanded particle E".

Comparative Example 72

By using polymer 5 obtained by Production Example 5, expanded particles were fabricated in the same manner as in the above Example 71 except that a foaming temperature was set at 135° C.

The bulk density of the expanded particles was 21 g/L. In addition foam of the expanded particles was 180 micron on average in size, which was large in deviation. Hereinafter, this expanded particle was referred to as "expanded particle F".

Comparative Example 73

Expanded particles were fabricated in the same manner as in the above Comparative Example 72 except that an added amount of isobutane was set at 118 g.

The bulk density of the expanded particles was 48 g/L. In addition, foam of the expanded particles was 200 micron on average in size, which was large in deviation. Hereinafter, this expanded particle was referred to as "expanded particle G".

Comparative Example 74

By using polymer 6 obtained in Production Example 6, expanded particles were fabricated in the same manner as in the above Example 71 except that a foaming temperature was set at 140° C.

The bulk density of the expanded particles was 22 g/L. Hereinafter, this expanded particle was referred to as "expanded particle H".

The above results are shown in Table 17 and Table 18.

TABLE 17

| | Example | | | |
|---|---|---|---|---|
| | Example 71 | Example 72 | Example 73 | Example 74 |
| category of expanded particle | expanded particle A | expanded particle B | expanded particle C | expanded particle D |
| base resin | | | | |
| base resin (production example) | polymer 1 (production example 1) | polymer 1 (production example 1) | polymer 2 (production example 2) | polymer 3 (production example 3) |
| MFR (g/10 minutes) | 10 | 10 | 14 | 6 |
| comonomer | — | — | ethylene | 1-butene |
| contents of comonomer (mol %) | — | — | 3.0 | 4.6 |
| melting point (° C.) | 146 | 146 | 141 | 142 |

TABLE 17-continued

| | Example 71 | Example 72 | Example 73 | Example 74 |
|---|---|---|---|---|
| water vapor transmission rate (g/m²/24 hr) | 10.5 | 10.5 | 12.0 | 11.5 |
| [mm] fraction (%) | 99.7 | 99.7 | 99.2 | 99.3 |
| [2, 1] insertion (%) | 1.32 | 1.32 | 1.06 | 1.23 |
| [1, 3] insertion (%) | 0.08 | 0.08 | 0.16 | 0.09 |
| expanded particle | | | | |
| foaming temperature (° C.) | 137 | 135 | 130 | 132 |
| bulk density (g/L) | 21 | 48 | 48 | 22 |
| average size of foam (μ) | 310 | 280 | 300 | 300 |
| condition of foam | highly uniform | highly uniform | highly uniform | highly uniform |

In the table, "—" of "comonomer" and "content of comonomer" section means polymerisation is conducted without adjunction of comonomer.

TABLE 18

| | Comparative Example 71 | Comparative Example 72 | Comparative Example 73 | Comparative Example 74 |
|---|---|---|---|---|
| category of expanded particle base resin | expanded particle E | expanded particle F | expanded particle G | expanded particle H |
| base resin (production example) | polymer 4 (production example 4) | polymer 5 (production example 5) | polymer 5 (production example 5) | polymer 6 (production example 6) |
| MFR (g/10 minutes) | 7 | 12 | 12 | 8 |
| comonomer | — | ethylene | ethylene | 1-butene |
| contents of comonomer (mol %) | — | 3.6 | 3.6 | 3.1 |
| melting point (° C.) | 160 | 146 | 146 | 150 |
| water vapor transmission rate (g/m²/24 hr) | 10.0 | 15.0 | 15.0 | 16.2 |
| [mm] fraction (%) | 97.0 | 96.0 | 96.0 | 95.4 |
| [2, 1] insertion (%) | 0 | 0 | 0 | 0 |
| [1, 3] insertion (%) | 0 | 0 | 0 | 0 |
| expanded particle | | | | |
| foaming temperature (° C.) | 150 | 135 | 135 | 140 |
| bulk density (g/L) | 22 | 21 | 48 | 22 |
| average size of foam (μ) | 200 | 180 | 200 | 180 |
| condition of foam | widely varied | widely varied | widely varied | widely varied |

In the table, "—" of "comonomer" and "content of comonomer" section means polymerisation is conducted without adjunction of comonomer.

(Production of Polypropylene Resin Expanded Molded Article)

Now, a polypropylene resin expanded molded article was fabricated by using the above expanded particles A to H obtained by the above described Examples 71 to 74 and Comparative Examples 71 to 74.

Example 75

After the expanded particle A obtained by Example 71 was sequentially charged under compression into an aluminum mold from a hopper by using compressed air with the compression ratio being defined as 24%, heating and molding were carried out by introducing a steam of 0.28 MPa (gauge pressure) into the chamber of the mold. Then, a polypropylene resin expanded molded article of 0.028 g/cm³ of density was fabricated.

In addition, from this polypropylene resin expanded molded article, a test specimen of a dimension of 290 mm vertical, 290 mm horizontal, and 10 mm in thickness was prepared, and the degree of moisture permeability was measured in conformance with ASTM E96.

In addition, from another molded element molded in the same molding condition, a test specimen of a dimension of 50 mm vertical, 50 mm horizontal, and 25 mm in thickness was prepared, a compression test was carried out in conformance with JIS K7220, and the stress during 50% compression was measured.

Further, from another molded element molded in the same molding condition, a test specimen of a dimension of 200 mm vertical, 30 mm horizontal, and 12.5 mm in thickness was prepared, a heat resistance test was performed in conformance with JIS K6767. Furthermore, the degree of dimensional change after heating at 110° C. was measured, and the heat resistance was judged in accordance with the following criteria.

○: The degree of dimensional change after heating is lower than 3%.

Δ: The degree of dimensional change after heating is 3% to 6%.

X: The degree of dimensional change after heating exceeds 6%.

The above result is shown in Table 19.

Examples 76 to 86 and Comparative Examples 73 to 86

Types of, and molding conditions for, expanded particles are changed as shown in Tables 19 to 22 described later, and then, a polypropylene resin expanded molded article was fabricated in the same manner as in Example 75 described above.

In addition, a test specimen was fabricated from these propylene resin expanded molded articles in the same manner as in Example 75 described above, the degree of moisture permeability was measured, and further, a compression test and a heat resistance test were performed.

The results are shown in Tables 19 to 22.

The molding steam pressure in Tables 19 to 22 described above means a steam pressure at which a molded article with degree of fusion of 80% is provided.

With respect the degree of fusion, a test specimen fabricated from a molded article was divided into two sections, the number of particle breaks and the number of inter-particle breaks on its sectional plane were visually measured, and a rate (%) of particle breaks with respect to a total number of both of them was represented.

TABLE 19

| | | Example | | | | | |
|---|---|---|---|---|---|---|---|
| | | Example 75 | Example 76 | Example 77 | Example 78 | Example 79 | Example 80 |
| molding condition | category of expanded particle | expanded particle A | expanded particle A | expanded particle A | expanded particle B | expanded particle B | expanded particle B |
| | compression ratio (%) | 24 | 48 | 75 | 13 | 21 | 35 |
| evaluation result | steam pressure for molding (MPa) | 0.28 | 0.28 | 0.28 | 0.28 | 0.28 | 0.28 |
| | density of molded article (g/cm$^3$) | 0.028 | 0.035 | 0.040 | 0.056 | 0.060 | 0.070 |
| | moisture permeability (g/m$^2$/hr) | 0.054 | 0.041 | 0.035 | 0.033 | 0.032 | 0.030 |
| | compression test (MPa) | 0.28 | 0.40 | 0.43 | 0.60 | 0.73 | 0.95 |
| | heat resistance test | ○ | ○ | ○ | ○ | ○ | ○ |

TABLE 20

| | | Example | | | | | |
|---|---|---|---|---|---|---|---|
| | | Example 81 | Example 82 | Example 83 | Example 84 | Example 85 | Example 86 |
| molding condition | category of expanded particle | expanded particle C | expanded particle C | expanded particle C | expanded particle D | expanded particle D | expanded particle D |
| | compression ratio (%) | 13 | 21 | 35 | 20 | 48 | 70 |
| evaluation result | steam pressure for molding (MPa) | 0.26 | 0.26 | 0.26 | 0.26 | 0.26 | 0.26 |
| | density of molded article (g/cm$^3$) | 0.056 | 0.060 | 0.070 | 0.028 | 0.035 | 0.040 |
| | moisture permeability (g/m$^2$/hr) | 0.033 | 0.031 | 0.029 | 0.053 | 0.041 | 0.035 |
| | compression test (MPa) | 0.57 | 0.69 | 0.90 | 0.29 | 0.42 | 0.45 |
| | heat resistance test | ○ | ○ | ○ | ○ | ○ | ○ |

TABLE 21

| | | Comparative Example 75 | Comparative Example 76 | Comparative Example 77 | Comparative Example 78 | Comparative Example 79 | Comparative Example 80 |
|---|---|---|---|---|---|---|---|
| molding condition | category of expanded particle | expanded particle E | expanded particle E | expanded particle E | expanded particle F | expanded particle F | expanded particle F |
| | compression ratio (%) | 20 | 48 | 70 | 24 | 48 | 75 |
| evaluation result | steam pressure for molding (MPa) | 0.40 | 0.40 | 0.40 | 0.35 | 0.35 | 0.35 |
| | density of molded article (g/cm$^3$) | 0.028 | 0.035 | 0.040 | 0.028 | 0.035 | 0.040 |
| | moisture permeability (g/m$^2$/hr) | 0.059 | 0.049 | 0.042 | 0.059 | 0.051 | 0.045 |
| | compression test (MPa) | 0.24 | 0.33 | 0.36 | 0.23 | 0.31 | 0.34 |
| | heat resistance test | Δ | Δ | Δ | Δ | Δ | Δ |

TABLE 22

| | | Comparative Example 81 | Comparative Example 82 | Comparative Example 83 | Comparative Example 84 | Comparative Example 85 | Comparative Example 86 |
|---|---|---|---|---|---|---|---|
| molding condition | category of expanded particle | expanded particle G | expanded particle G | expanded particle G | expanded particle H | expanded particle H | expanded particle H |
| | compression ratio (%) | 13 | 21 | 35 | 20 | 48 | 70 |
| evaluation result | steam pressure for molding (MPa) | 0.35 | 0.35 | 0.35 | 0.30 | 0.30 | 0.30 |
| | density of molded article (g/cm$^3$) | 0.056 | 0.060 | 0.070 | 0.028 | 0.035 | 0.040 |
| | moisture permeability (g/m$^2$/hr) | 0.051 | 0.051 | 0.050 | 0.059 | 0.048 | 0.043 |
| | compression test (MPa) | 0.48 | 0.59 | 0.76 | 0.27 | 0.37 | 0.40 |
| | heat resistance test | Δ | Δ | Δ | ○ | ○ | ○ |

As shown by the data in Tables 19 to 22, in the polypropylene resin expanded molded article obtained by Examples 75 to 86, a relationship between degree of moisture permeability Y (g/m²/hr) and density X (g/cm³) meets a relationship of the above formula (2), the degree of moisture permeability was low, and the moisture proofing properties were excellent. In addition, heat resistance and strength were excellent. Thus, this element was excellent as an architectural member or vehicle structural member and the like.

Further, in comparing the polypropylene resin expanded molded article of Examples 75 to 80 with those of Comparative Examples 75 to 77, these elements each contain a polypropylene homopolymer as a base resin. However, in the polypropylene resin expanded molded article of Comparative Examples 75 to 77, a relationship between the degree of moisture permeability Y (g/m²/hr) and density X (g/cm³) does not meet a relationship of the above formula (2). When Examples 75 to 80 were compared with Comparative Examples 75 to 77 in the substantially identical molding condition, the polypropylene resins of Examples 75 to 80 were excellent in heat resistance and strength. In addition, the degree of moisture permeability was lower, and the moisture proofing properties were more excellent as compared with Comparative Examples 75 to 77.

In comparing the polypropylene resin expanded molded articles of Examples 81 to 83 and those of Comparative Examples 78 to 83, these elements each contain a copolymer between propylene and ethylene as a base resin. However, in the polypropylene resin expanded molded articles of Comparative Examples 78 to 83, a relationship between the degree of moisture permeability Y (g/m²/hr) and density X (g/cm³) does not meet a relationship of the above Formula (2). In addition, when examples 81 to 83 are compared with Comparative Examples 78 to 83, respectively, in the substantially same molding condition, the polypropylene resin expanded molded articles of Examples 81 to 83 are excellent in heat resistance and strength, were lower in degree of moisture permeability, and are more excellent in moisture proofing properties, as compared with Comparative Examples 78 to 83.

In comparing the polypropylene resin expanded molded articles of Examples 84 to 86 and those of Comparative Examples 84 to 86, these elements each contain a copolymer of propylene and 1-butene. However, in the polypropylene resin expanded molded articles of Comparative Examples 84 to 86, the relationship between degree of moisture permeability Y (g/m²/hr) and density X (g/cm³) do not meet a relationship of the above formula (2). In addition, when Examples 84 to 86 are compared with Comparative Examples 84 to 86, respectively, in the substantially same molding condition, the polypropylene resin expanded molded articles of Examples 84 to 86 is excellent in heat resistance and strength, is low in degree of moisture permeability, and is excellent in moisture proofing properties, as compared with those of Comparative Examples 84 to 86.

The invention claimed is:

1. A polypropylene resin expanded particle comprising as a base resin a polypropylene polymer comprising:
   a structural unit containing 100 to 85 mole % derived from propylene and 0 to 15 mole % derived from ethylene and/or alpha-olefin having 4 to 20 carbons; and
   as measured by 13C-NMR, the content of position irregularity units formed by 2,1-insertions of propylene monomer units with respect to all propylene insertions is 0.5% to 2.0% and the content of the position irregularity units formed by 1,3-insertion of propylene monomer units with respect to all propylene insertions is 0.005% to 0.4%.

2. The polypropylene resin expanded particle according to claim 1, wherein the propylene polymer further comprises:
   an isotactic triad fraction of propylene unit chains, linked head-to-tail, of 97% or more as measured by 13C-NMR.

3. The polypropylene resin expanded particle as in claim 1, wherein the propylene polymer has a melt flow rate of 0.5 g/10 minutes to 100 g/10 minutes.

4. The polypropylene resin expanded particle according to claim 1, wherein the polypropylene resin expanded particle further comprises a blowing agent having a critical temperature represented by Formula (2):

$$-90 \leq Tc \leq 400 \qquad \text{Formula (2)}$$

wherein Tc is the critical temperature measured in ° C.

5. A molded article produced by the process comprising molding the polypropylene resin expanded particles according to claim 1 in a mold, wherein the molded article has a density of 0.008 g/cm³ to 0.5 g/cm³.

6. The molded article according to claim 5, wherein the molded article is a shock absorber.

7. The shock absorber according to claim 6, wherein a density of the shock absorber is 0.02 to 0.45 g/cm³.

8. The shock absorber according to claim 7, further comprising
   a skin layer disposed on a surface thereof,
   wherein the skin layer has a density greater than a density of an inner portion of the shock absorber.

9. The shock absorber according to claim 7, further comprising
   a skin material provided on a surface thereof,
   wherein the skin material is laminated on the surface thereof.

10. An automobile bumper comprising
    the shock absorber according to claim 7 as a core material.

11. An automobile bumper comprising the shock absorber according to claim 8 as a core material.

12. A molded article according to claim 5, comprising a crystalline structure in which a peak inherent to the base resin and a peak at higher temperature than that of the inherent peak appear as endothermic peaks on a first DSC curve obtained when 2 mg to 4 mg of test specimens cut out from the molded article are heated up to 200° C. at a rate of 10° C./minute by means of a differential scanning calorimeter.

13. A polypropylene resin expanded particle comprising:
    a core layer in an expanded state comprising the polypropylene resin expanded particle of claim 1; and
    a coat layer comprising a thermoplastic resin
    wherein the coat layer covers the core layer.

14. A polypropylene resin expanded particle according to claim 13, wherein the coat layer comprises
    an olefin polymer having a melting point that is less than the melting point of the polypropylene resin of the core layer, or an olefin polymer that exhibits substantially no melting point.

15. The polypropylene resin expanded particle according to claim 13, wherein the coat layer comprises
    a polypropylene resin identical to the polypropylene resin of the core layer blended in an amount of 1 to 100 parts by weight per 100 parts by weight of the thermoplastic resin.

16. The polypropylene resin expanded particle according to claim 13, wherein the polypropylene resin expanded particle further comprises a blowing agent having a critical temperature represented by Formula (2):

$$-90 \leq Tc \leq 400 \qquad \text{Formula (2)}$$

wherein Tc is the critical temperature measured in ° C.

17. A molded article produced by a process comprising molding the polypropylene resin expanded particles according to claim 13 in a mold, wherein the molded article has a density of 0.008 g/cm³ to 0.5 g/cm³.

18. The molded article according to claim 17, wherein the molded article is a shock absorber.

19. The shock absorber according to claim 18, wherein the density of the shock absorber is 0.02 to 0.45 g/cm³.

20. The shock absorber according to claim 19, further comprising
a skin layer disposed on a surface thereof,
wherein the skin layer has a density that is greater than the density of an inner portion of the shock absorber.

21. A shock absorber according to claim 20, wherein the skin material is laminated on the surface thereof.

22. An automobile bumper comprising the shock absorber according to claim 19 as a core material.

23. An automobile bumper comprising the shock absorber according to claim 20 as a core material.

24. A molded article according to claim 17, comprising a crystalline structure in which a peak inherent to the base resin and a peak at higher temperature than that of the inherent peak appear as endothermic peaks on a first DSC curve obtained when 2 mg to 4 mg of test specimens cut out from the molded article are heated up to 200° C. at a rate of 10° C./minute by means of a differential scanning calorimeter.

* * * * *

UNITED STATES PATENT AND TRADEMARK OFFICE
CERTIFICATE OF CORRECTION

PATENT NO. : 7,300,960 B2  Page 1 of 1
APPLICATION NO. : 10/507681
DATED : November 27, 2007
INVENTOR(S) : Toru Wada It is certified that error appears in the above-identified patent and that said Letters Patent is hereby corrected as shown below:

Column 4, line 17, the term "PPP[mm]" should read --PPP[mr]--.

Column 22, line 28, the word "abase" should be replaced with --a base--.

Column 49, line 57, the word "abase" should be replaced with --a base--.

Column 96, line 40, the number "541" should be replaced with --41--.

Column 103, lines 13 and 14, the symbol "O", appearing as a circle, each occurrence, should be replaced with --O--, the capital letter.

Column 112, lines 15 to 17, the formula to the right side of the = sign should appear as follows:

--{(area of OAB)/(area of OABC)} x 100--

Column 112, line 21, the symbol "O", appearing as a circle, should be replaced with --O--, the capital letter.

Signed and Sealed this

Twenty-ninth Day of April, 2008

JON W. DUDAS
*Director of the United States Patent and Trademark Office*